US011290664B2

(12) United States Patent
Matsui et al.

(10) Patent No.: US 11,290,664 B2
(45) Date of Patent: Mar. 29, 2022

(54) IMAGING APPARATUS AND METHOD, AND IMAGE PROCESSING APPARATUS AND METHOD

(71) Applicant: SONY CORPORATION, Tokyo (JP)

(72) Inventors: Akira Matsui, Kanagawa (JP); Yoshitaka Miyatani, Tokyo (JP); Kouji Yamamoto, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 43 days.

(21) Appl. No.: 16/754,509

(22) PCT Filed: Oct. 19, 2018

(86) PCT No.: PCT/JP2018/038948
§ 371 (c)(1),
(2) Date: Apr. 8, 2020

(87) PCT Pub. No.: WO2019/078340
PCT Pub. Date: Apr. 25, 2019

(65) Prior Publication Data

US 2020/0275038 A1 Aug. 27, 2020

(30) Foreign Application Priority Data

Oct. 19, 2017 (JP) ............................. JP2017-202891

(51) Int. Cl.
*H04N 5/345* (2011.01)
*H04N 5/369* (2011.01)
(Continued)

(52) U.S. Cl.
CPC ........... *H04N 5/3454* (2013.01); *H04N 5/225* (2013.01); *H04N 5/232* (2013.01);
(Continued)

(58) Field of Classification Search
CPC .... H04N 5/225; H04N 5/232; H04N 5/23235; H04N 5/345; H04N 5/3452;
(Continued)

(56) References Cited

U.S. PATENT DOCUMENTS

| | | | | |
|---|---|---|---|---|
| 10,488,535 B2 * | 11/2019 | Perlman | ............... | G02B 5/1842 |
| 2009/0095912 A1 * | 4/2009 | Slinger | ................. | G06T 1/0007 250/363.06 |

(Continued)

FOREIGN PATENT DOCUMENTS

| | | |
|---|---|---|
| JP | 2002-165136 A | 6/2002 |
| JP | 2016-510910 A | 4/2016 |

(Continued)

OTHER PUBLICATIONS

International Search Report dated Jan. 8, 2019 in PCT/JP2018/038948 filed Oct. 19, 2018, 1 page.

(Continued)

*Primary Examiner* — Nhan T Tran
*Assistant Examiner* — Chriss S Yoder, III
(74) *Attorney, Agent, or Firm* — Oblon, McClelland, Maier & Neustadt, L.L.P.

(57) ABSTRACT

The present technology relates to an imaging apparatus and method, and an image processing apparatus and method that make it possible to control the resolution of a detection image. A resolution is set, and a restoration matrix is set including coefficients used when a restored image is restored from output pixel values of a plurality of pixel output units, of an imaging element including the plurality of pixel output units that receives incident light entering without passing through either an imaging lens or a pinhole, and each outputs one detection signal indicating an output pixel value modulated by an incident angle of the incident light, depending on the resolution set. The present disclosure can be applied to,
(Continued)

for example, an imaging apparatus, an image processing apparatus, an information processing apparatus, an electronic device, a computer, a program, a storage medium, a system, and the like.

19 Claims, 51 Drawing Sheets

(51) Int. Cl.

| | |
|---|---|
| ***H04N 5/378*** | (2011.01) |
| ***H04N 5/232*** | (2006.01) |
| ***H04N 5/347*** | (2011.01) |
| ***H04N 5/225*** | (2006.01) |

(52) U.S. Cl.
CPC ......... *H04N 5/23235* (2013.01); *H04N 5/345* (2013.01); *H04N 5/347* (2013.01); *H04N 5/3452* (2013.01); *H04N 5/3456* (2013.01); *H04N 5/369* (2013.01); *H04N 5/378* (2013.01)

(58) Field of Classification Search
CPC .... H04N 5/3454; H04N 5/3456; H04N 5/347; H04N 5/369; H04N 5/378
See application file for complete search history.

(56) References Cited

U.S. PATENT DOCUMENTS

| | | | | |
|---|---|---|---|---|
| 2009/0279737 A1* | 11/2009 | Strens | G01T 1/295 | 382/103 |
| 2013/0038766 A1* | 2/2013 | Perlman | H04N 5/357 | 348/294 |
| 2014/0253781 A1* | 9/2014 | Gill | G02B 5/1871 | 348/335 |
| 2016/0126275 A1 | 5/2016 | Kurokawa | | |

FOREIGN PATENT DOCUMENTS

| | | |
|---|---|---|
| JP | 2016-92413 A | 5/2016 |
| WO | WO 2016/123529 A1 | 8/2016 |

OTHER PUBLICATIONS

M. Salman Asif, et al., "FlatCam: Replacing Lenses with Masks and Computation," 2015 IEEE International Conference on Computer Vision Workshop (ICCVW), 2015, 4 pages.

* cited by examiner

FIG. 27

| OPERATION MODE | CONDITION | EFFECT |
|---|---|---|
| ALL-PIXEL | — | · HIGH RESOLUTION |
| PIXEL ARBITRARY THINNING | · DIRECTIVITY OF READ PIXEL BECOMES EQUIVALENT TO DIRECTIVITY AT TIME OF ALL-PIXEL READING | · LOW POWER CONSUMPTION<br>· HIGH SPEED AND HIGH FRAME RATE<br>· SUFFICIENT FOV |
| PIXEL REGULARITY THINNING | | |
| AREA DRIVE | | |
| ADDITION | · DIRECTIVITY OF PIXEL AFTER ADDITION BECOMES EQUIVALENT TO DIRECTIVITY AT TIME OF ALL-PIXEL READING<br>· PIXELS TO BE ADDED TOGETHER HAVE SIMILAR DIRECTIVITIES AND ARE CLOSE TO EACH OTHER | · LOW POWER CONSUMPTION<br>· HIGH SPEED AND HIGH FRAME RATE<br>· SUFFICIENT FOV<br>· HIGH S/N |

FIG. 29
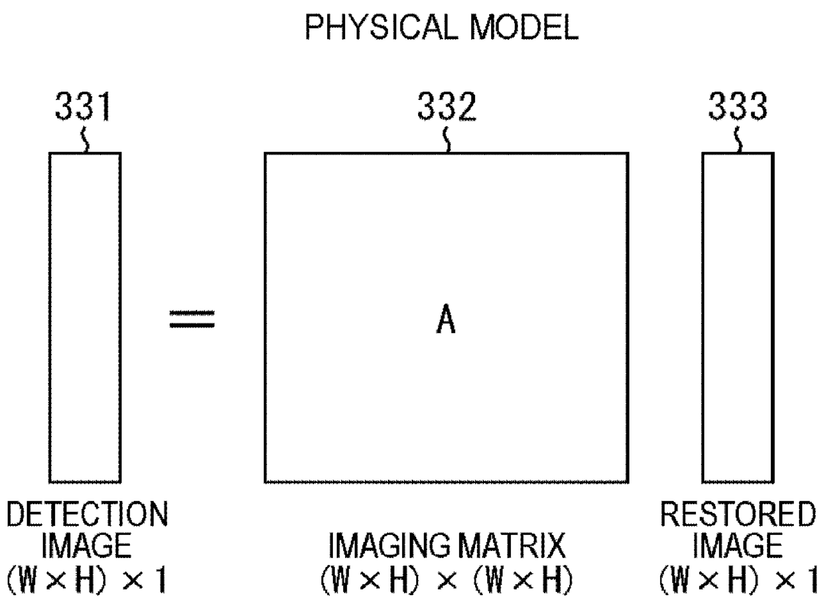
A
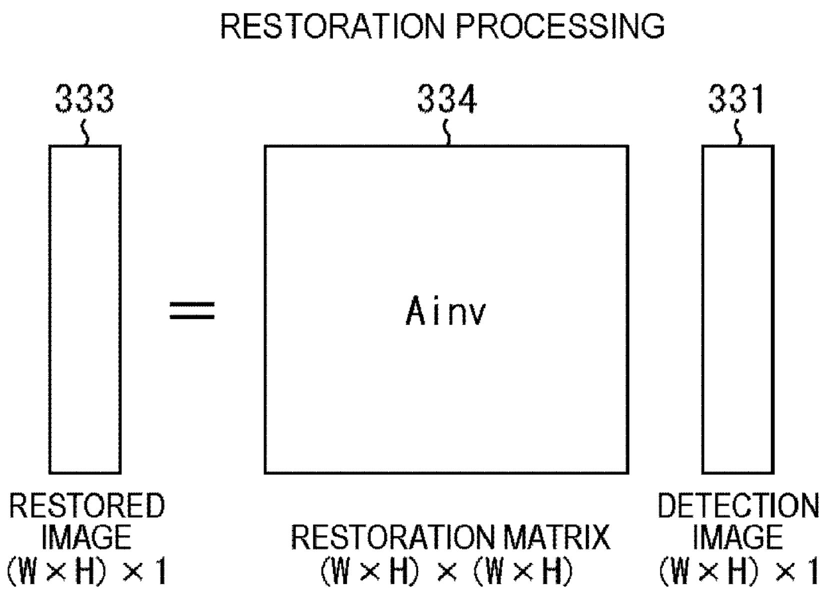
B

IMAGING APPARATUS AND METHOD, AND IMAGE PROCESSING APPARATUS AND METHOD

TECHNICAL FIELD

The present technology relates to an imaging apparatus and method, and an image processing apparatus and method, and more particularly, to an imaging apparatus and method, and an image processing apparatus and method enabled to control a resolution of a detection image.

BACKGROUND ART

Conventionally, an imaging element is generally used in combination with an imaging lens that focuses light on the imaging element. The imaging lens guides the light from a subject surface to each pixel of the imaging element to reproduce a light intensity distribution of the subject surface, whereby the imaging element can obtain a detection signal of a level corresponding to the light intensity distribution in each pixel, and can obtain a captured image of the subject as a whole.

However, in this case, the physical size becomes large. Thus, an imaging element has been devised that does not use an imaging lens (for example, see Patent Document 1, Patent Document 2, and Non-Patent Document 1).

CITATION LIST

Patent Document

Patent Document 1: International Publication No. 2016/123529

Patent Document 2: PCT Japanese Translation Patent Publication No. 2016-510910

Non-Patent Document

Non-Patent Document 1: M. Salman Asif and four others, "Flatcam: Replacing lenses with masks and computation", "2015 IEEE International Conference on Computer Vision Workshop (ICCVW)", 2015, pages 663-666

SUMMARY OF THE INVENTION

Problems to be Solved by the Invention

However, with the method described in Patent Document 1, only a detection image including information obtained from all pixels of the imaging element can be obtained, and it has not been possible to obtain a detection image having a desired resolution.

The present disclosure has been made in view of such a situation, and makes it possible to control a resolution of a detection image.

Solutions to Problems

An imaging apparatus according to one aspect of the present technology is an imaging apparatus including: an imaging element including a plurality of pixel output units that receives incident light entering without passing through either an imaging lens or a pinhole, and each outputs one detection signal indicating an output pixel value modulated by an incident angle of the incident light; and a read control unit that selectively reads the output pixel value of each of the pixel output units of the imaging element.

The read control unit can select some pixel unit outputs among the plurality of pixel output units of the imaging element, and read output pixel values of the pixel output units selected.

The read control unit can select some pixel output units at arbitrary positions among the plurality of pixel output units of the imaging element.

The read control unit can select the pixel output units such that, regarding an incident angle directivity of the output pixel value indicating a directivity with respect to an incident angle of incident light from a subject, a whole of the pixel output units selected has the incident angle directivity equivalent to an incident angle directivity of all pixel output units of the imaging element.

The read control unit can select some pixel output units in a positional relationship having a predetermined regularity among the plurality of pixel output units of the imaging element.

Regarding an incident angle directivity of the output pixel value indicating a directivity with respect to an incident angle of incident light from a subject, a whole of the some pixel output units of the imaging element in the positional relationship having the regularity selected by the read control unit can be made to have the incident angle directivity equivalent to an incident angle directivity of all pixel output units of the imaging element.

The read control unit can select a pixel output unit formed in one partial region of a region in which the plurality of pixel output units of the imaging element is formed.

Regarding an incident angle directivity of the output pixel value indicating a directivity with respect to an incident angle of incident light from a subject, a whole of pixel output units of the imaging element formed in the partial region selected by the read control unit can be made to have the incident angle directivity equivalent to an incident angle directivity of all pixel output units of the imaging element.

The read control unit can read the output pixel values from all pixel output units of the imaging element, and select some of the output pixel values read.

The read control unit can read output pixel values of all pixel output units of the imaging element, and add the read output pixel values together for each predetermined number.

The read control unit can add together output pixel values of pixel output units, the output pixel values having mutually similar incident angle directivities each indicating a directivity with respect to an incident angle of incident light from a subject.

The read control unit can add together output pixel values of pixel output units close to each other.

The plurality of pixel output units can have a configuration in which an incident angle directivity of the output pixel value indicating a directivity with respect to an incident angle of incident light from a subject is settable independently for each of the pixel output units.

The plurality of pixel output units can be made to have a configuration in which an incident angle directivity indicating a directivity with respect to an incident angle of incident light from a subject is settable independently for each of the pixel output units.

The plurality of pixel output units can be made to have a configuration in which an incident angle directivity of the output pixel value indicating a directivity with respect to an incident angle of incident light from a subject is settable independently for each of the pixel output units by making photo diodes (PDs) that contribute to output different from each other.

An imaging method according to one aspect of the present technology is an imaging method including: imaging a subject by an imaging element including a plurality of pixel output units that receives incident light entering without passing through either an imaging lens or a pinhole, and each outputs one detection signal indicating an output pixel value modulated by an incident angle of the incident light; and selectively reading the output pixel value of each of the pixel output units of the imaging element.

An image processing apparatus according to another aspect of the present technology is an image processing apparatus including: a resolution setting unit that sets a resolution; and a restoration matrix setting unit that sets a restoration matrix including coefficients used when a restored image is restored from output pixel values of a plurality of pixel output units, of an imaging element including the plurality of pixel output units that receives incident light entering without passing through either an imaging lens or a pinhole, and each outputs one detection signal indicating an output pixel value modulated by an incident angle of the incident light, depending on the resolution set by the resolution setting unit.

The resolution setting unit can set the resolution by selecting output pixel values of some of the pixel output units.

The resolution setting unit can set the resolution by adding the output pixel values of the pixel output units together for each predetermined number.

An image processing method according to the other aspect of the present technology is an image processing method including: setting a resolution; and setting a restoration matrix including coefficients used when a restored image is restored from output pixel values of a plurality of pixel output units, of an imaging element including the plurality of pixel output units that receives incident light entering without passing through either an imaging lens or a pinhole, and each outputs one detection signal indicating an output pixel value modulated by an incident angle of the incident light, depending on the resolution set.

In the imaging apparatus and method according to one aspect of the present technology, a subject is imaged by an imaging element including a plurality of pixel output units that receives incident light entering without passing through either an imaging lens or a pinhole, and each outputs one detection signal indicating an output pixel value modulated by an incident angle of the incident light, and an output pixel value of each of the pixel output units of the imaging element is selectively read.

In the image processing apparatus and method according to the other aspect of the present technology, a resolution is set, and a restoration matrix is set including coefficients used when a restored image is restored from output pixel values of a plurality of pixel output units, of an imaging element including the plurality of pixel output units that receives incident light entering without passing through either an imaging lens or a pinhole, and each outputs one detection signal indicating an output pixel value modulated by an incident angle of the incident light, depending on the resolution set.

Effects of the Invention

According to the present technology, a subject can be imaged, or an image can be processed. Furthermore, according to the present technology, a resolution of a detection image can be controlled.

BRIEF DESCRIPTION OF DRAWINGS

FIG. 27 is a diagram for comparing and explaining each method.

FIG. 29 is a diagram for explaining a restoration matrix.

MODE FOR CARRYING OUT THE INVENTION

The following is a description of a mode for carrying out the present disclosure (the mode will be hereinafter referred to as the embodiment). Note that, description will be made in the following order.

1. First embodiment (imaging apparatus)
2. Second embodiment (image processing apparatus)
3. Third embodiment (other configuration examples of imaging element, imaging apparatus, and image processing apparatus)
4. Others

1. First Embodiment

<Imaging Apparatus>

Figure 1:
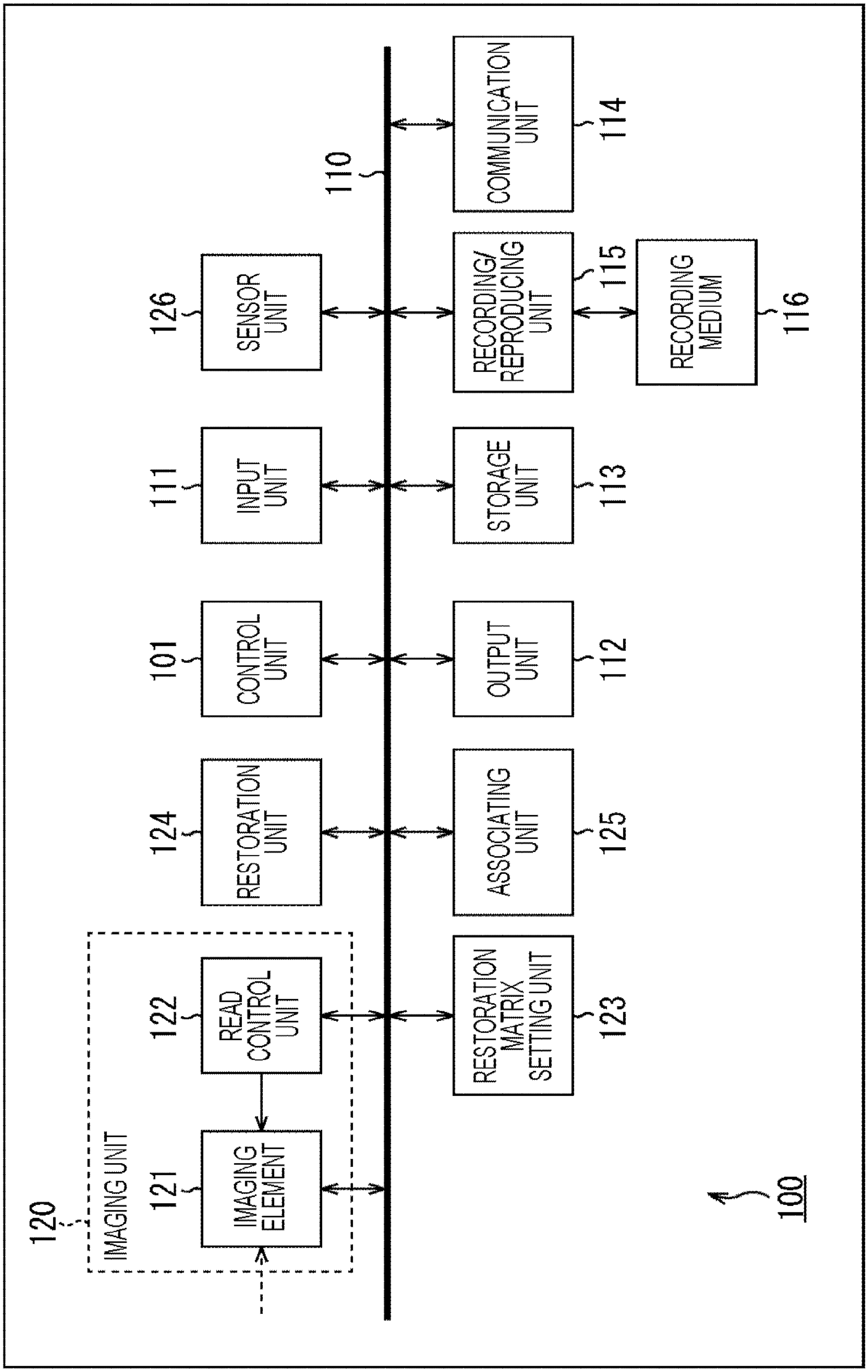
FIG. 1 is a block diagram illustrating a main configuration example of an imaging apparatus.

FIG. 1 is a diagram illustrating a main configuration example of an imaging apparatus that is an embodiment of an imaging apparatus or an image processing apparatus to which the present technology is applied. An imaging apparatus 100 illustrated in FIG. 1 is an apparatus that images a subject and obtains electronic data regarding a captured image of a subject.

As illustrated in FIG. 1, the imaging apparatus 100 includes a control unit 101, an input unit 111, an output unit 112, a storage unit 113, a communication unit 114, and a recording/reproducing unit 115. Furthermore, the imaging apparatus 100 includes an imaging element 121, a read control unit 122, a restoration matrix setting unit 123, a restoration unit 124, an associating unit 125, and a sensor unit 126. The processing units and the like are connected to each other via a bus 110, and can exchange information, commands, and the like with each other.

Note that, the imaging element 121 and the read control unit 122 may be integrated together as an imaging unit 120. The imaging unit 120 may be realized by any physical configuration. For example, the imaging unit 120 may be realized as a processor as a system large scale integration (LSI) or the like. Furthermore, the imaging unit 120 may be realized as, for example, a module using a plurality of processors, a unit using a plurality of modules and the like, or a set obtained by further adding other functions to a unit, and the like (in other words, a partial configuration of the apparatus). Furthermore, the imaging unit 120 may be realized as an apparatus.

The control unit 101 is configured to perform processing related to control of the processing units and the like in the imaging apparatus 100. For example, the control unit 101 includes a central processing unit (CPU), a read only memory (ROM), a random access memory (RAM), and the like, and performs the above-described processing by executing a program by using the CPU and the like.

The input unit 111 is configured to perform processing related to input of information. For example, the input unit 111 includes input devices such as an operation button, a dial, a switch, a touch panel, a remote controller, and a sensor, and an external input terminal. For example, the input unit 111 accepts an instruction (information corresponding to input operation) from the outside such as a user with these input devices. Furthermore, for example, the input unit 111 acquires arbitrary information (program, command, data, and the like) supplied from an external apparatus via the external input terminal. Furthermore, for example, the input unit 111 supplies the accepted information (acquired information) to other processing units and the like via the bus 110.

Note that, the sensor included in the input unit 111 may be any sensor as long as it can accept the instruction from the outside such as the user, for example, an acceleration sensor or the like. Furthermore, the input device included in the input unit 111 is arbitrary, and the number of them is also arbitrary. The input unit 111 may include a plurality of types of input devices. For example, the input unit 111 may include some of the examples described above, or may include the whole. Furthermore, the input unit 111 may include an input device other than the examples described above. Moreover, for example, the input unit 111 may acquire control information regarding the input unit 111

(input device or the like) supplied via the bus 110, and operate on the basis of the control information.

The output unit 112 is configured to perform processing related to output of information. For example, the output unit 112 includes an image display device such as a monitor, an image projection device such as a projector, a sound output device such as a speaker, an external output terminal, and the like. For example, the output unit 112 outputs information supplied from other processing units and the like via the bus 110 by using those output devices and the like. For example, the output unit 112 displays a captured image (restored image described later) on a monitor, projects a captured image (restored image described later) from a projector, outputs sound (for example, sound corresponding to an input operation, a processing result, or the like), or outputs arbitrary information (program, command, data, and the like) to the outside (another device).

Note that, the output device and the like included in the output unit 112 are arbitrary, and the number of them is also arbitrary. The output unit 112 may include a plurality of types of output devices and the like. For example, the output unit 112 may include some of the examples described above, or may include the whole. Furthermore, the output unit 112 may include an output device and the like other than the examples described above. Moreover, for example, the output unit 112 may acquire control information regarding the output unit 112 (output device or the like) supplied via the bus 110, and operate on the basis of the control information.

The storage unit 113 is configured to perform processing related to storage of information. For example, the storage unit 113 includes an arbitrary storage medium such as a hard disk or a semiconductor memory. For example, the storage unit 113 stores information (program, command, data, and the like) supplied from other processing units and the like via the bus 110 in the storage medium. Furthermore, the storage unit 113 may store arbitrary information (program, command, data, and the like) at the time of shipment. Furthermore, the storage unit 113 reads information stored in the storage medium at an arbitrary timing or in response to a request from other processing units and the like, and supplies the read information to the other processing units and the like via the bus 110.

Note that, the storage medium included in the storage unit 113 is arbitrary, and the number of them is also arbitrary. The storage unit 113 may include a plurality of types of storage media. For example, the storage unit 113 may include some of the examples of the storage medium described above, or may include the whole. Furthermore, the storage unit 113 may include a storage medium and the like other than the examples described above. Furthermore, for example, the storage unit 113 may acquire control information regarding the storage unit 113 supplied via the bus 110, and operate on the basis of the control information.

The communication unit 114 is configured to perform processing related to communication with other apparatuses. For example, the communication unit 114 includes a communication device that performs communication for exchanging information such as programs and data with an external apparatus via a predetermined communication medium (for example, an arbitrary network such as the Internet). For example, the communication unit 114 communicates with another apparatus, and supplies information (program, command, data, and the like) supplied from other processing units and the like via the bus 110 to the other apparatus that is a communication partner. Furthermore, for example, the communication unit 114 communicates with another apparatus, acquires information supplied from the other apparatus that is a communication partner, and supplies the information to the other processing units and the like via the bus 110.

The communication device included in the communication unit 114 may be any communication device. For example, the communication device may be a network interface. A communication method and a communication standard are arbitrary. For example, the communication unit 114 may be made to perform wired communication, wireless communication, or both. Furthermore, for example, the communication unit 114 may acquire control information regarding the communication unit 114 (communication device or the like) supplied via the bus 110, and operate on the basis of the control information.

The recording/reproducing unit 115 is configured to perform processing related to recording and reproduction of information using a recording medium 116 mounted to the recording/reproducing unit 115. For example, the recording/reproducing unit 115 reads information (program, command, data, and the like) recorded on the recording medium 116 mounted to the recording/reproducing unit 115, and supplies the information to other processing units and the like via the bus 110. Furthermore, for example, the recording/reproducing unit 115 acquires information supplied from the other processing units and the like via the bus 110, and writes (records) the information in the recording medium 116 mounted to the recording/reproducing unit 115. Note that, for example, the recording/reproducing unit 115 may acquire control information regarding the recording/reproducing unit 115 supplied via the bus 110, and operate on the basis of the control information.

Note that, the recording medium 116 may be any recording medium. For example, the recording medium may be a magnetic disk, an optical disk, a magneto-optical disk, a semiconductor memory, or the like.

The imaging element 121 is configured to perform processing related to imaging of a subject. For example, the imaging element 121 images the subject, and obtains data (electronic data) regarding the captured image. At that time, the imaging element 121 can image the subject without using an imaging lens, an optical filter such as a diffraction grating, and the like, or a pinhole or the like, and obtain data regarding the captured image. For example, the imaging element 121 images the subject and obtains data (detection signals and the like) that makes it possible to obtain data of the captured image by a predetermined calculation.

Note that, the captured image is an image that is configured by values of pixels on which a subject image is formed, and can be visually recognized by the user. On the other hand, an image (referred to as a detection image) configured by a detection signal that is a detection result of incident light in the pixel unit output of the imaging element 121 cannot be recognized as an image even when viewed by the user (that is, the subject cannot be visually recognized) since the subject image is not formed. That is, the detection image is an image different from the captured image. However, as described above, by performing the predetermined calculation on the data of the detection image, it is possible to restore the captured image, in other words, an image on which the subject image is formed and that can be recognized as an image when viewed by the user (that is, the subject can be visually recognized). This restored captured image is referred to as a restored image. That is, the detection image is an image different from the restored image.

Note that, an image constituting the restored image, and before synchronization processing, color separation processing, or the like (for example, demosaic processing or the like) is referred to as a Raw image. Similarly to the captured image, the Raw image is also an image that can be visually recognized by the user (that is, the subject can be visually recognized). In other words, the detection image is an image according to an arrangement of color filters, but is an image different from the Raw image.

However, in a case where the imaging element 121 has sensitivity only to invisible light, for example, infrared light, ultraviolet light, or the like, the restored image (Raw image or captured image) becomes an image that cannot be recognized as an image when viewed by the user (the subject cannot be visually recognized). However, since this depends on a wavelength range of detected light, the restored image can be an image in which the subject can be visually recognized, by converting the wavelength range to a visible light range. On the other hand, since the subject image is not formed, the detection image cannot be an image in which the subject can be visually recognized, only by converting the wavelength range. Thus, even in a case where the imaging element 121 has sensitivity only to the invisible light, the image obtained by performing the predetermined calculation on the detection image as described above is referred to as the restored image. Note that, in the following, the present technology will be described by using an example case where the imaging element 121 receives visible light basically, unless otherwise specified.

That is, the imaging element 121 can image a subject, and obtain data regarding the detection image. For example, the imaging element 121 can supply the data regarding the detection image to the restoration unit 124 via the read control unit 122, and cause the restored image to be generated. Furthermore, for example, the imaging element 121 can supply the data regarding the detection image to the associating unit 125 and the like via the read control unit 122, and cause metadata and the like to be associated. Of course, the imaging element 121 can supply the data regarding the detection image to an arbitrary processing unit or the like. Furthermore, for example, the imaging element 121 may acquire control information regarding the imaging element 121 supplied via the bus 110, and operate on the basis of the control information.

The read control unit 122 is configured to perform processing related to data read control from the imaging element 121, and control a resolution of the detection image. For example, the read control unit 122 controls reading of the detection image from the imaging element 121, and selectively reads the detection signal that is an output from each of the pixel output units of the imaging element 121.

For example, the read control unit 122 can read detection signals from all pixel output units of the imaging element 121 and select the detection signals of all pixel output units read, as detection signals to be included in the detection image.

For example, the read control unit 122 can select some pixel unit outputs among the plurality of pixel output units of the imaging element 121, and read detection signals from the pixel output units selected. Furthermore, for example, the read control unit 122 can read detection signals from all pixel output units of the imaging element 121, and select some of the read detection signals of the respective pixel output units, as detection signals to be included in the detection image.

For example, the read control unit 122 can select some pixel output units at an arbitrary position among the plurality of pixel output units of the imaging element 121. That is, for example, the read control unit 122 can select some pixel unit outputs at an arbitrary position among the plurality of pixel output units of the imaging element 121, and read detection signals from the pixel output units selected. Furthermore, for example, the read control unit 122 can read detection signals from all pixel output units of the imaging element 121, and select detection signals read from some pixel output units at an arbitrary position among the read detection signals of the respective pixel output units, as detection signals to be included in the detection image.

For example, the read control unit 122 can select some pixel output units in a positional relationship having a predetermined regularity among the plurality of pixel output units of the imaging element 121. That is, for example, the read control unit 122 can select some pixel unit outputs in the positional relationship having the predetermined regularity among the plurality of pixel output units of the imaging element 121, and read detection signals from the pixel output units selected. Furthermore, for example, the read control unit 122 can read detection signals from all pixel output units of the imaging element 121, and select detection signals read from some pixel output units in the positional relationship having the predetermined regularity among the read detection signals of the respective pixel output units, as detection signals to be included in the detection image.

For example, the read control unit 122 can select pixel output units formed in one partial region of a region in which the plurality of pixel output units of the imaging element 121 is formed. That is, for example, the read control unit 122 can select the pixel unit outputs formed in the above-described partial region, and read detection signals from the pixel output units selected. Furthermore, for example, the read control unit 122 can read detection signals from all pixel output units of the imaging element 121, and select detection signals read from the pixel output units formed in the above-described partial region among the read detection signals of the respective pixel output units, as detection signals to be included in the detection image.

For example, the read control unit 122 can read detection signals from all pixel output units of the imaging element 121, add the read detection signals of the respective pixel output units together for each predetermined number, and set a detection signal group after the addition as the detection image.

Selecting a detection signal to be adopted as the detection image also means selecting a non-adopted detection signal. That is, the read control unit 122 controls (sets) the resolution of the detection image by selecting detection signals (including a case where all detection signals are selected). For example, the read control unit 122 controls (sets) the resolution of the detection image by reading detection signals of all pixels from the imaging element 121, reading detection signals from the imaging element 121 by thinning out the detection signals, thinning out detection signals read from the imaging element 121, or adding detection signals read from the imaging element 121 together for each predetermined number.

The read control unit 122 supplies the read detection image (whose resolution is set) (in a case where thinning, addition, or the like is performed, the detection image after processing) via the bus 110 to other processing units and the like (for example, the restoration matrix setting unit 123, the restoration unit 124, the associating unit 125, and the like).

The restoration matrix setting unit 123 is configured to perform processing related to setting of a restoration matrix.

The detection image can be converted into the restored image by performing the predetermined calculation. Although details will be described later, the predetermined calculation is to multiply detection signals included in the detection image by predetermined coefficients and add them together. That is, the detection image can be converted into the restored image by performing a predetermined matrix operation. In this specification, a matrix including the above-described coefficients used for the matrix operation is referred to as a restoration matrix.

For example, the restoration matrix setting unit 123 sets a restoration matrix corresponding to the detection image whose resolution is set by the read control unit 122 (a restoration matrix used when the restored image is restored from the detection signals selectively read by the read control unit 122). That is, the restoration matrix corresponds to the resolution of the detection image to be processed. For example, the restoration matrix setting unit 123 supplies the set restoration matrix to other processing units and the like (for example, the restoration unit 124, the associating unit 125, and the like) via the bus 110.

Note that, in the predetermined matrix operation for converting the detection image into the restored image, the detection image may be converted into the restored image having an arbitrary resolution. In that case, the restoration matrix setting unit 123 is only required to set a restoration matrix having the number of rows and the number of columns depending on the resolution of the detection image and a target resolution of the restored image.

Note that, for example, the restoration matrix setting unit 123 may acquire control information regarding the restoration matrix setting unit 123 supplied via the bus 110, and operate on the basis of the control information.

The restoration unit 124 is configured to perform processing related to generation of the restored image. For example, the restoration unit 124 generates the restored image from data (detection signals and the like) regarding the detection image supplied from the imaging element 121 by performing the predetermined calculation. Furthermore, the restoration unit 124 supplies data (pixel values and the like) regarding the generated restored image to other processing units and the like via the bus 110.

Note that, in the imaging element 121, a detection image in which a plurality of color components is mixed is obtained by using color filters, for example, and a Raw image in which the plurality of color components is mixed may be obtained by performing the predetermined calculation on the detection image by the restoration unit 124. Then, the restoration unit 124 may supply the Raw image in which the plurality of color components is mixed as the restored image to other processing units and the like, or may perform synchronization processing, color separation processing, or the like (for example, demosaic processing or the like) on the Raw image, and supply the image subjected to the processing as the restored image to the other processing units and the like. Of course, in the imaging element 121, a monochrome detection image or a detection image for each color is obtained, and synchronization processing, color separation processing, or the like (for example, demosaic processing or the like) may be unnecessary.

Furthermore, the restoration unit 124 may perform, on the restored image, arbitrary image processing, for example, gamma correction (γ correction), white balance adjustment, or the like, and supply data regarding the restored image after image processing to other processing units and the like. Moreover, the restoration unit 124 may convert the format of data of the restored image, or compress the data with, for example, a predetermined compression method such as joint photographic experts group (JPEG), tagged image file format (TIFF), graphics interchange format (GIF), or the like, and supply the data after the conversion (compression) to the other processing units and the like.

Note that, for example, the restoration unit 124 may acquire control information regarding the restoration unit 124 supplied via the bus 110, and operate on the basis of the control information.

The associating unit 125 is configured to perform processing related to data association. For example, the associating unit 125 associates data (for example, coefficients and the like) used for the predetermined calculation for generating the restored image with data (detection signals and the like) regarding the detection image supplied from the imaging element 121 or the like.

Here, the term "associate" means that, for example, in processing of one information (data, command, program, and the like), the other information is made to be usable (linkable). That is, the pieces of information associated with each other may be combined into one file or the like, or may be individual pieces of information. For example, information B associated with information A may be transmitted on a transmission path different from that for the information A. Furthermore, for example, the information B associated with the information A may be recorded on a recording medium different from that for the information A (or another recording area of the same recording medium). Note that, this "association" may be for part of information, not the entire information. For example, an image and information corresponding to the image may be associated with each other in an arbitrary unit such as a plurality of frames, one frame, or a portion within a frame.

Furthermore, for example, the associating unit 125 supplies the associated data to other processing units and the like via the bus 110. Note that, for example, the associating unit 125 may acquire control information regarding the associating unit 125 supplied via the bus 110, and operate on the basis of the control information.

The sensor unit 126 is configured to perform processing related to detection. For example, the sensor unit 126 includes an arbitrary sensor, and detects a predetermined parameter. For example, the sensor unit 126 detects a parameter related to a peripheral state of the imaging apparatus 100, a parameter related to a state of the imaging apparatus 100, and the like. For example, the sensor unit 126 detects a parameter related to a state of the imaging element 121. Furthermore, for example, the sensor unit 126 supplies the detected information to other processing unit and the like via the bus 110. Note that, for example, the sensor unit 126 may acquire control information regarding the sensor unit 126 supplied via the bus 110, and operate on the basis of the control information.

<Imaging Element>

Next, the imaging element 121 will be described with reference to FIGS. 2 to 20.

<Pixel and Pixel Output Unit>

In this specification, the present technology will be described by using the term "pixel" (or "pixel output unit"). In this specification, the "pixel" (or "pixel output unit") refers to a division unit including at least one physical configuration capable of receiving light independently from other pixels, of a region (also referred to as a pixel region) in which physical configurations for receiving incident light of the imaging element 121 are formed. The physical configuration capable of receiving light is, for example, a photoelectric conversion element, and is, for example, a photodiode (photo diode (PD)). The number of physical configurations (for example, photodiodes) formed in one pixel is arbitrary, and may be singular or plural. The physical configuration's type, size, shape, and the like are also arbitrary.

Furthermore, in addition to the above-described "physical configuration capable of receiving light", the physical configuration of the "pixel" unit includes all physical configurations related to reception of incident light, for example, an on-chip lens, a light-shielding film, a color filter, a planarization film, an anti-reflection film, and the like. Moreover, a configuration such as a read circuit may be included. That is, the physical configuration of the pixel unit may be any configuration.

Furthermore, a detection signal read from the "pixel" (that is, the physical configuration of the pixel unit) may be referred to as a "detection signal of a pixel unit (or pixel output unit)" or the like. Moreover, the detection signal of the pixel unit (or pixel output unit) is also referred to as a "pixel unit detection signal (or pixel output unit detection signal)". Furthermore, the pixel unit detection signal is also referred to as "pixel output". Moreover, a value of the pixel output is also referred to as "output pixel value".

A value (output pixel value) of a detection signal of a pixel unit of the imaging element 121 can have an incident angle directivity indicating a directivity with respect to an incident angle of incident light from a subject, independently of the others. That is, each pixel unit (pixel output unit) of the imaging element 121 has a configuration in which the incident angle directivity of the output pixel value indicating the directivity with respect to the incident angle of the incident light from the subject is settable independently. For example, in the imaging element 121, output pixel values of at least two pixel units can respectively have different incident angle directivities indicating the directivity with respect to the incident angle of the incident light from the subject.

Note that, as described above, since the number of the "physical configurations capable of receiving light" included in the "pixel (or pixel output unit)" is arbitrary, the pixel unit detection signal may be a detection signal obtained by a single "physical configuration capable of receiving light", or may be a detection signal obtained by a plurality of the "physical configurations capable of receiving light".

Furthermore, a plurality of the pixel unit detection signals (output pixel values) can also be combined into one at an arbitrary stage. For example, output pixel values of a plurality of pixels may be added together in the analog signal state, or may be added together after being converted into digital signals.

Furthermore, after the detection signal is read from the imaging element 121, in other words, in the detection image, a plurality of detection signals can be combined into a single signal, or a single detection signal can be converted into a plurality of signals. That is, the resolution (number of data) of the detection image is variable.

By the way, in the following, for convenience of description, a description will be given assuming that the imaging element 121 includes a pixel region in which a plurality of pixels is arranged in a matrix (a pixel array is formed), unless otherwise specified. Note that, the arrangement pattern of pixels (or pixel output units) of the imaging element 121 is arbitrary, and is not limited to this example. For example, the pixels (or pixel output units) may be arranged in a honeycomb structure. Furthermore, for example, the pixels (or pixel output units) may be arranged in one row (or one column). That is, the imaging element 121 may be a line sensor.

Note that, the wavelength range in which the imaging element 121 (pixels thereof) has sensitivity is arbitrary. For example, the imaging element 121 (pixels thereof) may have sensitivity to visible light, may have sensitivity to invisible light such as infrared light or ultraviolet light, or may have sensitivity to both visible light and invisible light. For example, in a case where the imaging element detects far-infrared light that is invisible light, a thermograph (an image representing a heat distribution) can be generated by using a captured image obtained in the imaging element. However, in the case of an imaging element with an imaging lens, glass is difficult to transmit far-infrared light, so that an imaging lens including an expensive special material is required, and there is a possibility that manufacturing costs increase. Since the imaging element 121 can image a subject without using an imaging lens and the like and obtain data regarding the captured image, an increase in manufacturing costs can be suppressed by enabling the pixel to detect far-infrared light. That is, imaging of far-infrared light can be performed at lower cost (a thermograph can be obtained at lower cost). Note that, in a case where the imaging element 121 (pixels thereof) has sensitivity to invisible light, the restored image does not become an image in which the user can visually recognize the subject but becomes an image in which the user cannot visually recognize the subject. In other words, the restored image may be an image of visible light, or may be an image of invisible light (for example, (far) infrared light, ultraviolet light, or the like).

<Incident Angle Directivity>

The imaging element 121 includes a plurality of pixel output units that receives incident light entering without passing through either an imaging lens or a pinhole, and each outputs one detection signal indicating an output pixel value modulated by an incident angle of the incident light. For example, the imaging element 121 has a configuration for causing incident angle directivities each indicating the directivity with respect to the incident angle of the incident light from the subject of output pixel values of at least two pixel output units among the plurality of pixel output units to be different characteristics from each other. That is, in that case, the imaging element 121 can obtain detection signals for the plurality of pixel output units (a plurality of pixel output unit detection signals), and incident angle directivities each indicating the directivity with respect to the incident angle of the incident light from the subject of at least two pixel output unit detection signals among the plurality of pixel output unit detection signals are different from each other.

Here, "incident angle directivity" refers to a light-receiving sensitivity characteristic depending on an incident angle of incident light, in other words, detection sensitivity with respect to the incident angle of the incident light. For example, even when incident light has the same light intensity, the detection sensitivity may change depending on the incident angle. Such a deviation in detection sensitivity (including a case where there is no deviation) is referred to as "incident angle directivity".

For example, when incident light beams having the same light intensity as each other enter physical configurations of the two pixel output units at the same incident angle as each other, signal levels (detection signal levels) of detection signals of the pixel output units can be different values from each other. The imaging element 121 (each pixel output unit thereof) has a physical configuration having such a feature.

The incident angle directivity may be realized by any method. For example, the incident angle directivity may be realized by providing a light-shielding film, for example, in front (light incident side) of a photoelectric conversion element (photodiode or the like) of an imaging element having a basic structure similar to that of, for example, a general complementary metal oxide semiconductor (CMOS) image sensor or the like.

When imaging is performed only with a general imaging element including pixels having the same incident angle directivity as each other, light beams of substantially the same light intensity enter all pixels of the imaging element, and an image of the subject formed cannot be obtained. Thus, in general, an imaging lens or a pinhole is provided in front (light incident side) of the imaging element. For example, by providing the imaging lens, light from the subject surface can be formed as the image on the imaging surface of the imaging element. Thus, the imaging element can obtain a detection signal of a level corresponding to the image of the subject formed at each pixel (that is, a captured image of the subject formed can be obtained). However, in this case, the size is physically increased, and there has been a possibility that downsizing of the apparatus becomes difficult. Furthermore, in a case where the pinhole is provided, downsizing becomes possible as compared with the case where the imaging lens is provided, but the amount of light entering the imaging element is reduced, so that measures are essential such as increasing the exposure time or increasing the gain, and there has been a possibility that blurring is likely to occur in imaging of a high-speed subject, or natural color expression is lost.

On the other hand, the imaging element 121 has a configuration for causing incident angle directivities of output pixel values of at least two pixel output units among the plurality of pixel output units to be different characteristics from each other, for example. With such a configuration, for example, the imaging element 121 has incident angle directivity in which detection sensitivities of the respective pixels are different from each other. That is, the light-receiving sensitivity characteristic depending on the incident angle of incident light is different for each pixel. However, it is not necessary that the light-receiving sensitivity characteristics of all the pixels are completely different from each other, and some pixels may have the same light-receiving sensitivity characteristic, and some pixels may have different light-receiving sensitivity characteristics.

Figure 2:
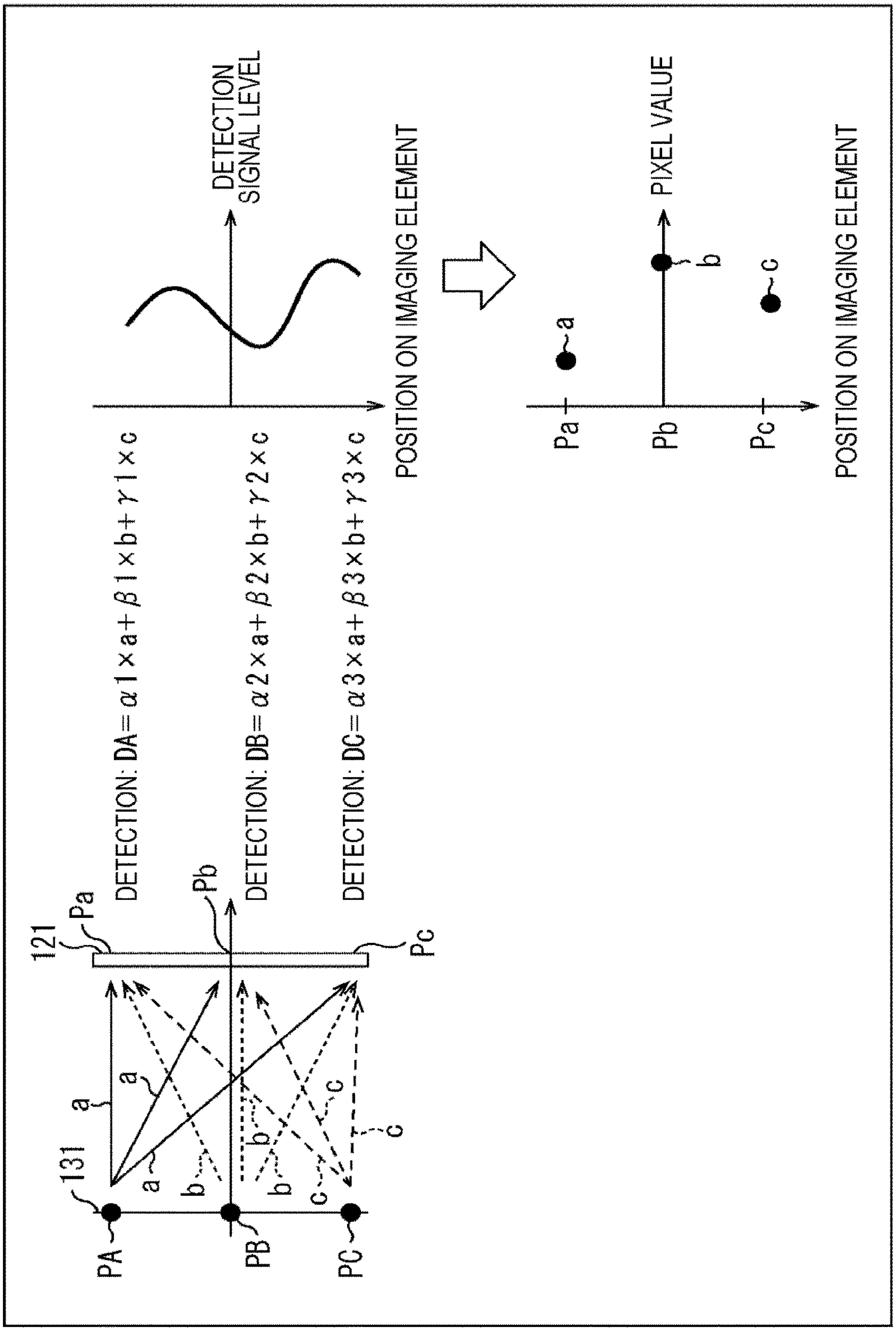
FIG. 2 is a diagram illustrating the principle of imaging in an imaging apparatus to which the technology according to the present disclosure is applied.

For example, in FIG. 2, in a case where it is assumed that a light source constituting a subject surface 131 is a point light source, in the imaging element 121, light beams having the same light intensity emitted from the same point light source are incident on all pixels, but incident at different incident angles on respective pixels. Then, since the pixels of the imaging element 121 respectively have incident angle directivities different from each other, the light beams having the same light intensity are detected with respective sensitivities different from each other. That is, a detection signal is detected having a different signal level for each pixel.

In more detail, the sensitivity characteristic depending on the incident angle of the incident light received at each pixel of the imaging element 121, in other words, the incident angle directivity depending on the incident angle at each pixel is expressed by a coefficient representing light-receiving sensitivity depending on the incident angle, and the signal level of the detection signal depending on the incident light in each pixel (also referred to as a detection signal level) is obtained by multiplication by a coefficient set corresponding to the light-receiving sensitivity depending on the incident angle of the incident light.

More specifically, as illustrated in the upper left part of FIG. 2, detection signal levels DA, DB, and DC at positions Pa, Pb, and Pc are expressed by the following equations (1) to (3), respectively.

$$DA=\alpha1\times a+\beta1\times b+\gamma1\times c \quad (1)$$

$$DB=\alpha2\times a+\beta2\times b+\gamma2\times c \quad (2)$$

$$DC=\alpha3\times a+\rho3\times b+\gamma3\times c \quad (3)$$

Here, α1 is a coefficient set depending on an incident angle of a light beam from a point light source PA on the subject surface 131 to be restored at the position Pa on the imaging element 121. Furthermore, β1 is a coefficient set depending on an incident angle of a light beam from a point light source PB on the subject surface 131 to be restored at the position Pa on the imaging element 121. Moreover, γ1 is a coefficient set depending on an incident angle of a light beam from a point light source PC on the subject surface 131 to be restored at the position Pa on the imaging element 121.

As indicated in the equation (1), the detection signal level DA at the position Pa is expressed by the sum (composite value) of a product of a light intensity "a" of the light beam from the point light source PA at the position Pa and the coefficient α1, a product of a light intensity "b" of the light beam from the point light source PB at the position Pa and the coefficient β1, and a product of a light intensity "c" of the light beam from the point light source PC at the position Pa and the coefficient γ1. In the following, coefficients αx, βx, and γx (x is a natural number) are collectively referred to as a coefficient set.

Similarly, a coefficient set α2, β2, and γ2 of the equation (2) is a coefficient set that is set depending on incident angles of light beams from the point light sources PA, PB, and PC on the subject surface 131 to be restored at the position Pb on the imaging element 121. That is, as in the above-described equation (2), the detection signal level DB at the position Pb is expressed by the sum (composite value) of a product of the light intensity "a" of the light beam from the point light source PA at the position Pb and the coefficient α2, a product of the light intensity "b" of the light beam from the point light source PB at the position Pb and the coefficient β2, and a product of the light intensity "c" of the light beam from the point light source PC at the position Pb and the coefficient γ2. Furthermore, coefficients α3, β3, and γ3 in the equation (3) are a coefficient set that is set depending on incident angles of light beams from the point light sources PA, PB, and PC on the subject surface 131 to be restored at the position Pc on the imaging element 121. That is, as in the above-described equation (3), the detection signal level DC at the position Pc is expressed by the sum (composite value) of a product of the light intensity "a" of the light beam from the point light source PA at the position Pc and the coefficient α3, a product of the light intensity "b" of the light beam from the point light source PB at the position Pc and the coefficient β3, and a product of the light intensity "c" of the light beam from the point light source PC at the position Pc and the coefficient γ3.

As described above, these detection signal levels are different from those in which the subject image is formed since the light intensities of the light beams emitted from the point light sources PA, PB, and PC are mixed. That is, the detection signal level illustrated in the upper right part of FIG. 2 is not the detection signal level corresponding to the image (captured image) in which the subject image is formed, so that the detection signal level is different from the pixel value illustrated in the lower right part of FIG. 2 (generally they do not match).

However, by configuring simultaneous equations using the coefficient set α1, β1, and γ1, coefficient set α2, β2, and 2, coefficient set α3, β3, and γ3, and detection signal levels DA, DB, and DC, and solving the simultaneous equations of the above-described equations (1) to (3) using a, b, and c as variables, it is possible to obtain the pixel values at the respective positions Pa, Pb, and Pc as illustrated in the lower right part of FIG. 2. As a result, a restored image is restored that is a set of pixel values (an image in which the subject image is formed).

With such a configuration, the imaging element 121 can output one detection signal indicating an output pixel value modulated by an incident angle of incident light, in each pixel, without requiring an imaging lens, an optical filter including a diffraction grating or the like, a pinhole, or the like. As a result, the imaging lens, the optical filter including the diffraction grating or the like, the pinhole, or the like is not an essential configuration, so that it is possible to reduce the height of the imaging apparatus, in other words, to reduce the thickness in the light incident direction in a configuration that realizes an imaging function.

<Formation of Incident Angle Directivity>

Figure 3:
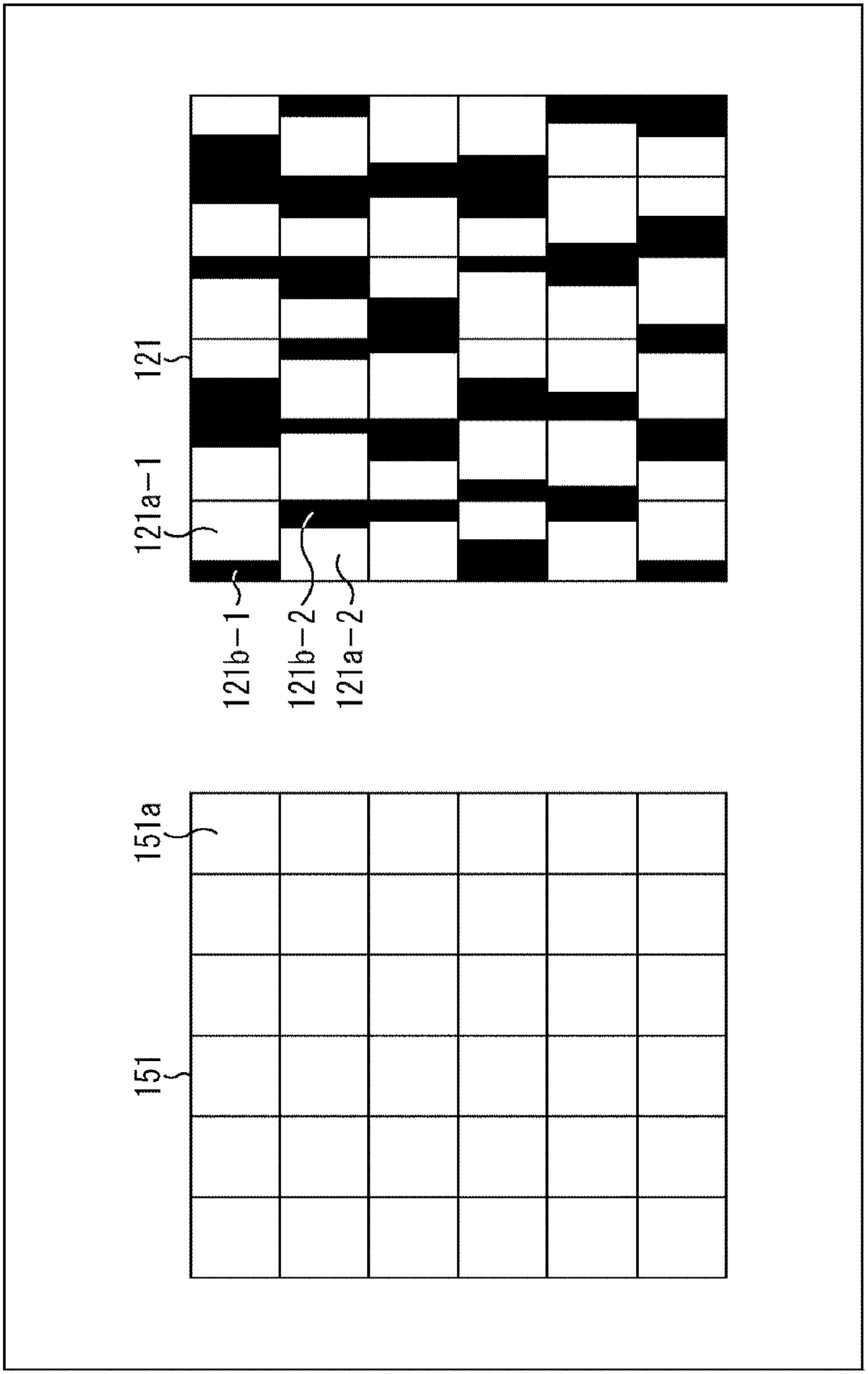
FIG. 3 is a diagram illustrating a difference in configuration between a conventional imaging element and an imaging element according to the present disclosure.

The left part of FIG. 3 illustrates a front view of a part of a pixel array unit of a general imaging element, and the right part of FIG. 3 illustrates a front view of a part of a pixel array unit of the imaging element 121. Note that, FIG. 3 illustrates an example in which the pixel array unit has a configuration in which the number of pixels in the horizontal direction×vertical direction is 6 pixels×6 pixels; however, the configuration of the number of pixels is not limited to this.

The incident angle directivity can be formed by a light-shielding film, for example. As illustrated in the example of the left part of FIG. 3, in a general imaging element 151, pixels 151*a* having the same incident angle directivity are arranged in an array. On the other hand, the imaging element 121 in the example of the right part of FIG. 3 is provided with a light-shielding film 121*b* that is one of modulation elements to cover a part of the light-receiving region of the photodiode for each of pixels 121*a*, and incident light entering each pixel 121*a* is optically modulated depending on an incident angle. Then, for example, by providing the light-shielding film 121*b* in a different range for each pixel 121*a*, the light-receiving sensitivity with respect to the incident angle of the incident light differs for each pixel 121*a*, and each pixel 121*a* has a different incident angle directivity.

For example, a pixel 121*a*-1 and a pixel 121*a*-2 have different ranges of pixels shielded by a light-shielding film 121*b*-1 and a light-shielding film 121*b*-2 provided (at least one of light-shielding region (position) or light-shielding area differs). In other words, in the pixel 121*a*-1, the light-shielding film 121*b*-1 is provided to shield a part of the left side in the light-receiving region of the photodiode by a predetermined width, and in the pixel 121*a*-2, the light-shielding film 121*b*-2 is provided to shield a part of the right side in the light-receiving region by a width wider in the horizontal direction than the light-shielding film 121*b*-1. Similarly, in the other pixels 121*a*, the light-shielding film 121*b* is provided so that a different range in the light-receiving region is shielded for each pixel, and is randomly arranged in the pixel array.

Note that, since the amount of light that can be received decreases as the ratio of covering the light-receiving region of each pixel increases, the range of the light-shielding film 121*b* is desirably set to an area that can secure a desired amount of light, and the area of the light-shielding film 121*b* may be configured with a limitation, for example, up to about ¾ of a range capable of receiving light at most. In this way, it becomes possible to secure the amount of light of greater than or equal to the desired amount. However, if an unshielded range is provided having a width corresponding to the wavelength of light to be received, for each pixel, it is possible to receive a minimum amount of light. In other words, for example, in the case of a blue pixel (B pixel), the wavelength is about 500 nm, and it is possible to receive the minimum amount of light if the pixel is not shielded from light of greater than or equal to a width corresponding to this wavelength.

<Configuration Example of Imaging Element>

Figure 4:
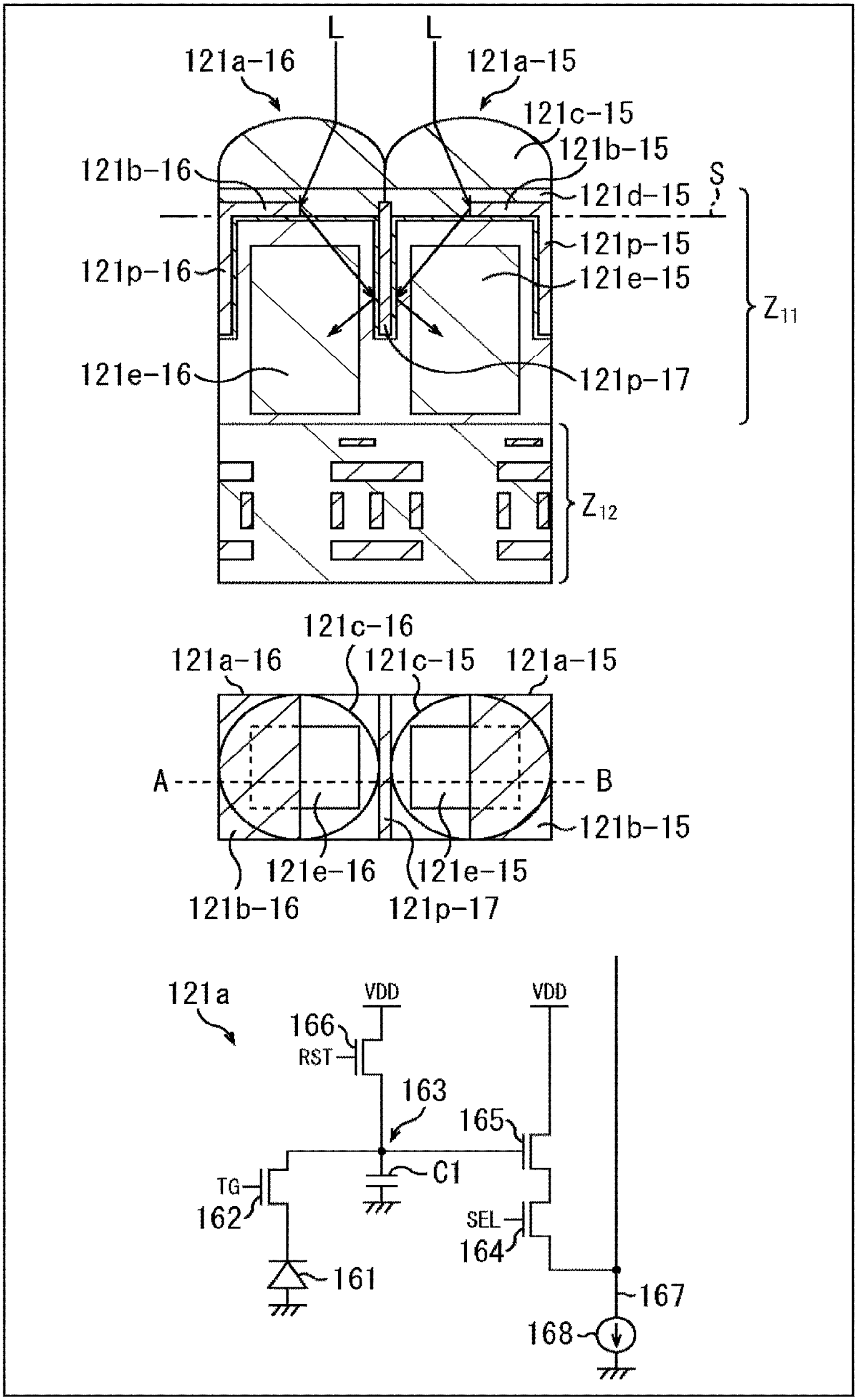
FIG. 4 is a diagram illustrating a first configuration example of the imaging element.

With reference to FIG. 4, a configuration example will be described of the imaging element 121 in this case. The upper part of FIG. 4 is a side cross-sectional view of the imaging element 121, and the middle part of FIG. 4 is a top view of the imaging element 121. Furthermore, the side cross-sectional view in the upper part of FIG. 4 is an AB cross section in the middle part of FIG. 4. Moreover, the lower part of FIG. 4 is a circuit configuration example of the imaging element 121.

The imaging element 121 having the configuration illustrated in FIG. 4 includes a plurality of pixel output units that receives incident light entering without passing through either an imaging lens or a pinhole, and each outputs one detection signal indicating an output pixel value modulated by an incident angle of the incident light. For example, the imaging element 121 has a configuration for causing incident angle directivities each indicating the directivity with respect to the incident angle of the incident light from the subject of output pixel values of at least two pixel output units among the plurality of pixel output units to be different characteristics from each other. Furthermore, in this case, in the imaging element 121, the plurality of pixel output units has a configuration in which an incident angle directivity indicating the directivity with respect to the incident angle of the incident light from the subject is settable independently for each of the pixel output units.

In the imaging element 121 in the upper part of FIG. 4, the incident light enters from the upper side to the lower side in the figure. Adjacent pixels 121*a*-15 and 121*a*-16 are of a so-called back-illuminated type in which a wiring layer Z12 is provided in the lowermost layer in the figure, and a photoelectric conversion layer Z11 is provided thereon.

Note that, in a case where it is not necessary to distinguish the pixels 121*a*-15 and 121*a*-16, the pixels 121*a*-15 and 121*a*-16 are simply referred to as the pixel 121*a*, and the other configurations are also referred to similarly. Furthermore, FIG. 4 illustrates a side view and a top view of two pixels constituting the pixel array of the imaging element 121; however, needless to say, a larger number of pixels 121*a* are arranged but illustration thereof is omitted.

Moreover, the pixels 121*a*-15 and 121*a*-16 include photodiodes 121*e*-15 and 121*e*-16 in the photoelectric conversion layer Z11, respectively. Furthermore, on the photodiodes 121*e*-15 and 121*e*-16, on-chip lenses 121*c*-15 and 121*c*-16, and color filters 121*d*-15 and 121*d*-16 are formed from above, respectively.

The on-chip lenses 121*c*-15 and 121*c*-16 focus the incident light on the photodiodes 121*e*-15 and 121*e*-16.

The color filters 121*d*-15 and 121*d*-16 are, for example, optical filters that transmit light of specific wavelengths such as red, green, blue, infrared, and white. Note that, in the case of white, the color filters 121*d*-15 and 121*d*-16 may be transparent filters, or do not have to exist.

In the photoelectric conversion layer Z11 of the pixels 121*a*-15 and 121*a*-16, light-shielding films 121*p*-15 to 121*p*-17 are respectively formed at boundaries between pixels, and crosstalk between adjacent pixels is suppressed.

Furthermore, the light-shielding films 121*b*-15 and 121*b*-16, which are one of the modulation elements, shield a part of a light-receiving surface S as illustrated in the upper part and the middle part of FIG. 4. A part of the light-receiving surface S is shielded by the light-shielding film 121*b*, whereby the incident light entering the pixel 121*a* is optically modulated depending on the incident angle. Since the pixel 121*a* detects the optically modulated incident light, the pixel 121*a* has an incident angle directivity. On the light-receiving surface S of the photodiodes 121*e*-15 and 121*e*-16 in the pixels 121*a*-15 and 121*a*-16, different ranges are respectively shielded by the light-shielding films 121*b*-15 and 121*b*-16, whereby a different incident angle directivity is set for each pixel. However, not limited to a case where the ranges shielded from light are different from each other in all the pixels 121*a* of the imaging element 121, some pixels 121*a* may exist in which the same range is shielded from light.

With the configuration illustrated in the upper part of FIG. 4, the right end of the light-shielding film 121*p*-15 and the upper end of the light-shielding film 121*b*-15 are connected together, and the left end of the light-shielding film 121*b*-16 and the upper end of the light-shielding film 121*p*-16 are connected together, and they are configured to have an L shape when viewed from the side.

Moreover, the light-shielding films 121*b*-15 to 121*b*-17 and the light-shielding films 121*p*-15 to 121*p*-17 include metal, for example, tungsten (W), aluminum (Al), or an alloy of Al and copper (Cu). Furthermore, the light-shielding films 121*b*-15 to 121*b*-17 and the light-shielding films 121*p*-15 to 121*p*-17 may be formed at the same time with the same metal as wiring, in the same process as a process of forming wiring in a semiconductor process. Note that, the film thicknesses of the light-shielding films 121*b*-15 to 121*b*-17 and the light-shielding films 121*p*-15 to 121*p*-17 do not have to be the same depending on the position.

Furthermore, as illustrated in the lower part of FIG. 4, the pixel 121*a* includes a photodiode 161 (corresponding to the photodiode 121*e*), a transfer transistor 162, a floating diffusion (FD) portion 163, a selection transistor 164, an amplification transistor 165, and a reset transistor 166, and is connected to a current source 168 via a vertical signal line 167.

The photodiode 161 is configured such that the anode electrode is individually grounded, and the cathode electrode is individually connected to the gate electrode of the amplification transistor 165 via the transfer transistor 162.

The transfer transistors 162 are individually driven in accordance with a transfer signal TG. For example, when the transfer signal TG supplied to the gate electrode of the transfer transistor 162 becomes the high level, the transfer transistor 162 is turned on. Therefore, charges accumulated in the photodiode 161 are transferred to the FD portion 163 via the transfer transistor 162.

The amplification transistor 165 is an input unit of a source follower that is a read circuit that reads a signal obtained by photoelectric conversion in the photodiode 161, and outputs a pixel signal of a level corresponding to the charges accumulated in the FD portion 163 to the vertical signal line 23. In other words, the amplification transistor 165, in which a drain terminal is connected to a power supply voltage VDD and a source terminal is connected to the vertical signal line 167 via the selection transistor 164, configures the source follower together with the current source 168 connected to one end of the vertical signal line 167.

The floating diffusion (FD) portion 163 is a floating diffusion region including a charge capacitance C1 provided between the transfer transistor 162 and the amplification transistor 165, and temporarily accumulates the charges transferred from the photodiode 161 via the transfer transistor 162. The FD portion 163 is a charge detection unit that converts charges into a voltage, and the charges accumulated in the FD portion 163 are converted into a voltage in the amplification transistor 165.

The selection transistor 164 is driven in accordance with a selection signal SEL, and is turned on when the selection signal SEL supplied to the gate electrode becomes the high level, and connects the amplification transistor 165 and the vertical signal line 167 together.

The reset transistor 166 is driven in accordance with a reset signal RST. For example, the reset transistor 166 is turned on when the reset signal RST supplied to the gate electrode becomes the high level, discharges the charges accumulated in the FD portion 163 to the power supply voltage VDD, and resets the FD portion 163.

With the circuit configuration described above, the pixel circuit illustrated in the lower part of FIG. 4 operates as follows.

In other words, as the first operation, the reset transistor 166 and the transfer transistor 162 are turned on, the charges accumulated in the FD portion 163 are discharged to the power supply voltage VDD, and the FD portion 163 is reset.

As the second operation, the reset transistor 166 and the transfer transistor 162 are turned off, and an exposure period is started, and charges corresponding to the amount of light of the incident light are accumulated by the photodiode 161.

As the third operation, the reset transistor 166 is turned on and the FD portion 163 is reset, and then the reset transistor 166 is turned off. By this operation, the FD portion 163 is reset, and set to a reference potential.

As the fourth operation, the potential of the FD portion 163 in a reset state is output from the amplification transistor 165 as the reference potential.

As the fifth operation, the transfer transistor 162 is turned on, and the charges accumulated in the photodiode 161 are transferred to the FD portion 163.

As the sixth operation, the potential of the FD portion 163 to which the charges of the photodiode are transferred is output from the amplification transistor 165 as a signal potential.

Through the above processing, the reference potential is subtracted from the signal potential, and is output as a detection signal by correlated double sampling (CDS). A value of the detection signal (output pixel value) is modulated depending on the incident angle of the incident light from the subject, and the characteristic (directivity) varies depending on the incident angle (has incident angle directivity).

As described above, the pixel 121*a* in the case of FIG. 4 is provided with one photodiode 121*e* for each pixel, and a different range for each pixel 121*a* is shielded by the light-shielding film 121*b*, and by optical modulation using the light-shielding film 121*b*, a detection signal for one pixel of a detection image having incident angle directivity can be expressed by one pixel 121*a*.

<Other Configuration Examples of Imaging Elements>

Furthermore, the incident angle directivity can be formed by, for example, the position, size, shape, and the like in a pixel of a light receiving element (for example, a photodiode). Pixels having different parameters have different sensitivities to incident light having the same light intensity from the same direction. That is, by setting these parameters for each pixel, the incident angle directivity can be set for each pixel.

For example, a plurality of light receiving elements (for example, photodiodes) may be provided in a pixel and used selectively. In this way, the incident angle directivity can be set for each pixel by selection of the light receiving element.

Figure 5:
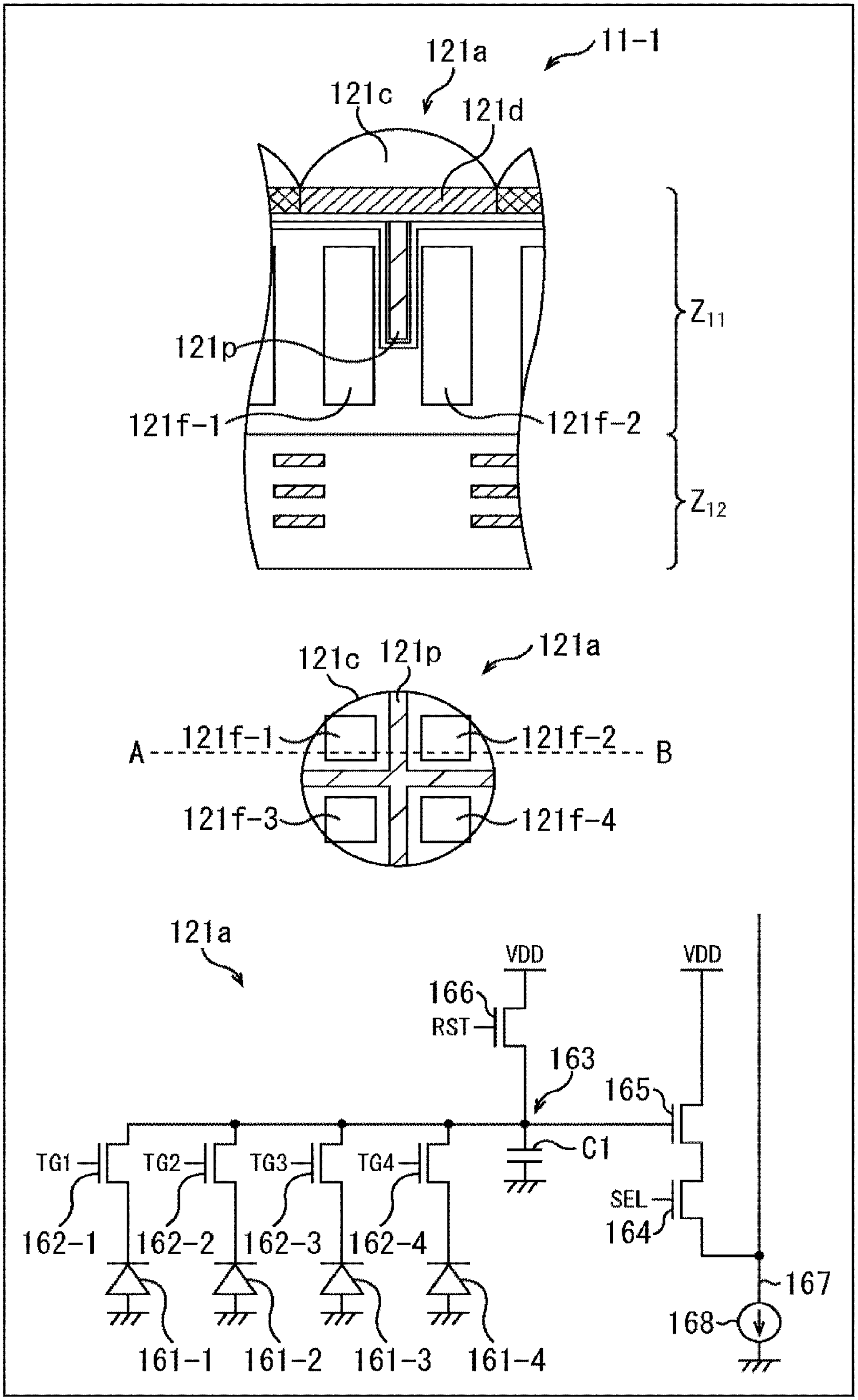
FIG. 5 is a diagram illustrating the first configuration example of the imaging element.

FIG. 5 is a diagram illustrating another configuration example of the imaging element 121. The upper part of FIG. 5 illustrates a side cross-sectional view of the pixel 121*a* of the imaging element 121, and the middle part of FIG. 5 illustrates a top view of the imaging element 121. Furthermore, the side cross-sectional view of the upper part of FIG. 5 is an AB cross section in the middle part of FIG. 5. Moreover, the lower part of FIG. 5 is a circuit configuration example of the imaging element 121.

The imaging element 121 having the configuration illustrated in FIG. 5 includes a plurality of pixel output units that receives incident light entering without passing through either an imaging lens or a pinhole, and each outputs one detection signal indicating an output pixel value modulated by an incident angle of the incident light. For example, the imaging element 121 has a configuration for causing incident angle directivities each indicating the directivity with respect to the incident angle of the incident light from the subject of output pixel values of at least two pixel output units among the plurality of pixel output units to be different characteristics from each other. Furthermore, in the imaging element 121 of this case, the plurality of pixel output units can set the incident angle directivity of the output pixel value indicating the directivity with respect to the incident angle of the incident light from the subject independently for each pixel output unit, by making photo diodes (PDs) that contribute to output different from each other.

As illustrated in FIG. 5, the imaging element 121 has a configuration different from that of the imaging element 121 of FIG. 5 in that four photodiodes 121*f*-1 to 121*f*-4 are formed in the pixel 121*a*, and a light-shielding film 121*p* is formed in a region that separates the photodiodes 121*f*-1 to 121*f*-4 from each other. In other words, in the imaging element 121 of FIG. 5, the light-shielding film 121*p* is formed in a "+" shape when viewed from the top. Note that, common components are denoted by the same reference signs, and a detailed description thereof will be omitted.

In the imaging element 121 configured as illustrated in FIG. 5, the photodiodes 121*f*-1 to 121*f*-4 are separated by the light-shielding film 121*p*, whereby an electrical and optical crosstalk between the photodiodes 121*f*-1 to 121*f*-4 can be prevented. In other words, similarly to the light-shielding film 121*p* of the imaging element 121 of FIG. 4, the light-shielding film 121*p* of FIG. 5 is for preventing the crosstalk, and is not for providing the incident angle directivity.

Although details will be described later, the photodiodes 121*f*-1 to 121*f*-4 have different incident angles at which the light-receiving sensitivity characteristics increase. That is, a desired incident angle directivity can be given to the output pixel value of the pixel 121*a* depending on which of the photodiodes 121*f*-1 to 121*f*-4 is used to read charges. That is, it is possible to control the incident angle directivity of the output pixel value of the pixel 121*a*.

In the configuration example of the imaging element 121 of FIG. 5, one FD portion 163 is shared by four photodiodes 121*f*-1 to 121*f*-4. The lower part of FIG. 5 illustrates a circuit configuration example in which one FD portion 163 is shared by four photodiodes 121*f*-1 to 121*f*-4. Note that, in the lower part of FIG. 5, descriptions will be omitted of the same components as those of the lower part of FIG. 4.

The lower part of FIG. 5 differs from the circuit configuration of the lower part of FIG. 4 in that photodiodes 161-1 to 161-4 (corresponding to photodiodes 121*f*-1 to 121*f*-4 in the upper part of FIG. 5) and transfer transistors 162-1 to 162-4 are provided instead of the photodiode 161 and the transfer transistor 162, and the FD portion 163 is shared.

In the circuit illustrated in the lower part of FIG. 5, the photodiodes 161-1 to 161-4 are referred to as the photodiode 161 in a case where it is not necessary to distinguish them from each other. Furthermore, the transfer transistors 162-1 to 162-4 are referred to as the transfer transistors 162 in a case where it is not necessary to distinguish them from each other.

In the circuit illustrated in the lower part of FIG. 5, when any of the transfer transistors 162 is turned on, the charges of the photodiode 161 corresponding to the transfer transistor 162 is read, and transferred to the common FD portion 163. Then, a signal corresponding to a level of the charges held in the FD portion 163 is read as a detection signal in a pixel output unit. That is, the charges of each photodiode 161 can be read independently of each other, and it is possible to control which of the photodiodes 161 is used to read the charges depending on which transfer transistor 162 is turned on. In other words, it is possible to control the degree of contribution to the output pixel value by each photodiode 161 depending on which transfer transistor 162 is turned on. For example, the photodiodes 161 that contribute to the output pixel value can be made different from each other by making the photodiodes 161 that read the charges different from each other between at least two pixels. That is, by selection of the photodiode 161 that reads the charges, a desired incident angle directivity can be given to the output pixel value of the pixel 121*a*. That is, the detection signal output from each pixel 121*a* can be a value (output pixel value) modulated depending on the incident angle of the incident light from the subject.

For example, in FIG. 5, the charges of the photodiodes 121*f*-1 and 121*f*-3 are transferred to the FD portion 163, and the signals obtained by reading them are added together, whereby incident angle directivity in the horizontal direction in the figure can be given to the output pixel value of the pixel 121*a*. Similarly, the charges of the photodiode 121*f*-1 and the photodiode 121*f*-2 are transferred to the FD portion 163, and the signals obtained by reading them are added together, whereby incident angle directivity in the vertical direction in the figure can be given to the output pixel value of the pixel 121*a*

Note that, the signals obtained on the basis of the charges of respective photodiodes 121*f* of the pixel 121*a* of FIG. 5 may be added together after being read from the pixel, or may be added together within the pixel (for example, the FD portion 163).

Furthermore, the combination is arbitrary of the photodiodes 121*f* for adding the charges (or the signals corresponding to the charges) together, and is not limited to the above example. For example, the charges (or the signals corresponding to the charges) of three or more photodiodes 121*f* may be added together. Furthermore, for example, the charges of one photodiode 121*f* may be read without performing addition.

Note that, for example, by resetting detection values (charges) accumulated in the photodiode 161 (photodiode 121*f*) by using the electronic shutter function before reading the charges to the FD portion 163, a desired incident angle directivity may be given to the pixel 121*a* (detection sensitivity thereof).

For example, in a case where the electronic shutter function is used, if the reset of the charges of the photodiode 121*f* is performed immediately before the reading to the FD portion 163, the photodiode 121*f* can be made to have no contribution to the detection signal level of the pixel 121*a*, and if a time is given between the reset and the reading to the FD portion 163, a partial contribution can be made.

As described above, each of the pixels 121*a* of FIG. 5 includes four photodiodes 121*f*, and, although the light-shielding film 121*b* is not formed on the light-receiving surface, is divided into a plurality of regions by the light-shielding film 121*p*, and the four photodiodes 121*f*-1 to 121*f*-4 are formed, and expresses a detection signal for one pixel of a detection image having incident angle directivity. In other words, for example, a range that does not contribute to output among the photodiodes 121*f*-1 to 121*f*-4 functions similarly to a region shielded from light, and expresses a detection signal for one pixel of a detection image having incident angle directivity. Note that, in a case where the detection signal for one pixel is expressed by using the photodiodes 121*f*-1 to 121*f*-4, since the light-shielding film 121*b* is not used, the detection signal is not a signal obtained by optical modulation.

In the above, an example has been described in which four photodiodes are arranged in a pixel; however, the number of photodiodes arranged in the pixel is arbitrary and is not limited to the above example. That is, the number of partial regions is also arbitrary in which the photodiodes are arranged in the pixel.

Furthermore, in the above description, the photodiodes are arranged in four partial regions obtained by equally dividing the inside of the pixel into four regions; however, the partial regions do not have to be equally divided. That is, the sizes and shapes of the partial regions do not have to be unified (partial regions having different sizes and shapes may be included). Alternatively, the position (position in the partial region), size, shape, and the like of the photodiodes arranged in each partial region may be different for each photodiode (for each partial region). At that time, the sizes and shapes of the partial regions may be all unified or may not be unified.

Moreover, these parameters do not have to be unified for all the pixels of the imaging element 121. That is, in one or more pixels of the imaging element 121, one or more of these parameters may be different from those of other pixels.

For example, the pixel group of the imaging element 121 may include a pixel in which a division position for forming the partial region in which the photodiode is arranged in the pixel is different from that of other pixels. That is, the imaging element 121 may include one or more pixels whose partial regions have different sizes and shapes from those of other pixels. For example, by making the division position different for each pixel, even if only the upper left photodiode is used in a plurality of pixels, the incident angle directivity of the detection signal detected in each of the plurality of pixels can be made different from each other.

Furthermore, for example, the pixel group of the imaging element 121 may include a pixel in which the position, size, shape, and the like of a plurality of photodiodes arranged in the pixel are different from those of other pixels. That is, the imaging element 121 may include one or more pixels in which at least one of the position, size, or shape of the plurality of photodiodes arranged is different from that of other pixels. For example, by making the position, size, shape, and the like of the photodiode different for each pixel, even if only the upper left photodiode is used in a plurality of pixels, the incident angle directivity of the detection signal detected in each of the plurality of pixels can be made different from each other.

Moreover, for example, one or more pixels may be included in which both the parameters (size, shape) of the partial region and the parameters (position, size, shape) of the photodiode are different from those of other pixels.

Furthermore, for example, the pixel group of the imaging element 121 may include a pixel in which the number of divisions for forming the partial region in which the photodiode is arranged in the pixel is different from that of other pixels. That is, the imaging element 121 may include one or more pixels in which the number of photodiodes arranged is different from that of other pixels. For example, by making the number of divisions (the number of photodiodes) different for each pixel, the incident angle directivity can be set more freely.

<Principle of Causing Incident Angle Directivity>

Figure 6:
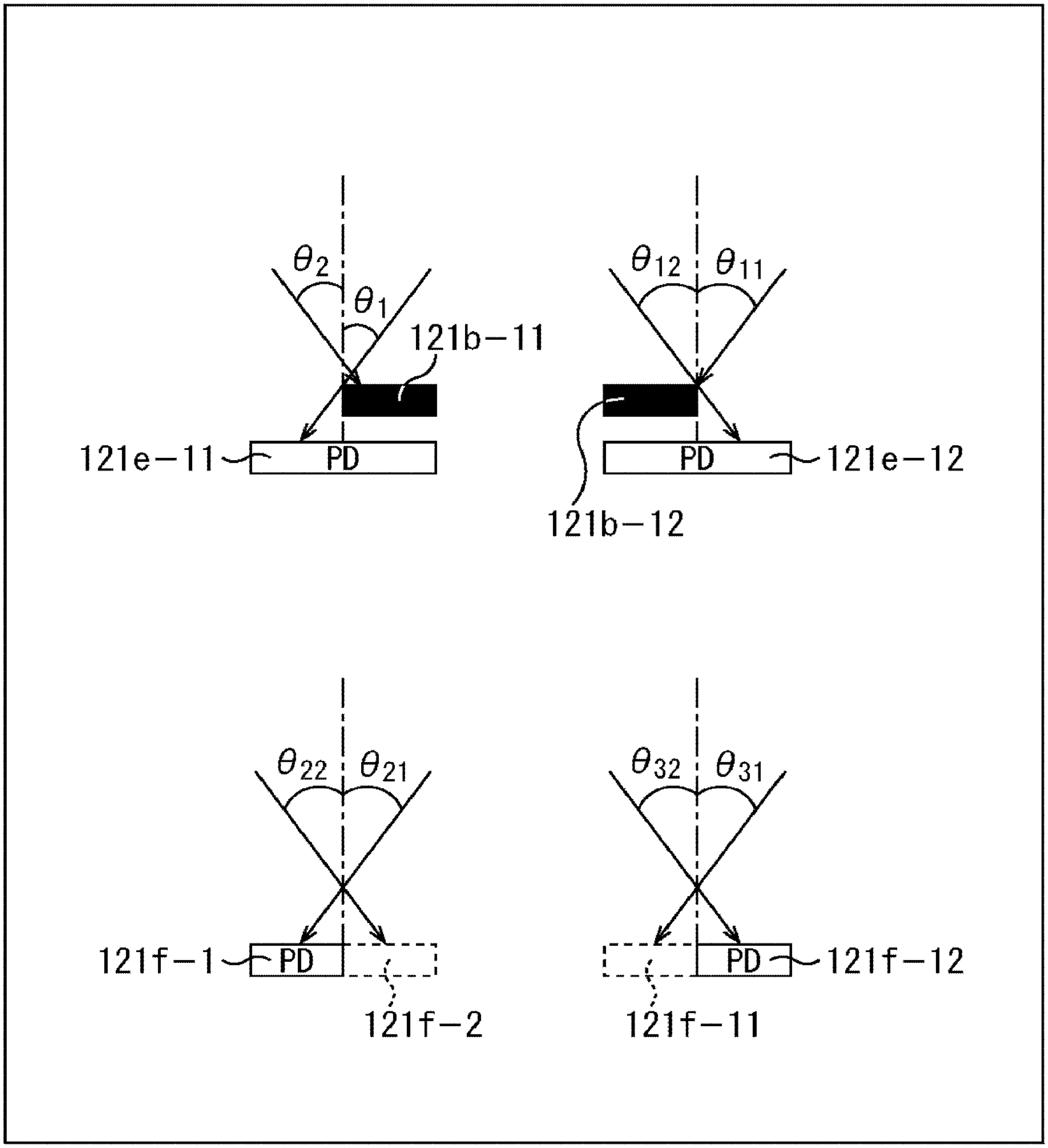
FIG. 6 is a diagram illustrating the principle of generation of incident angle directivity.

The incident angle directivity of each pixel in the imaging element 121 is generated on the basis of a principle illustrated in FIG. 6, for example. Note that, the upper left part and the upper right part of FIG. 6 are diagrams illustrating a generation principle of the incident angle directivity in the imaging element 121 of FIG. 4, and the lower left part and lower right part of FIG. 6 are diagrams illustrating a generation principle of the incident angle directivity in the imaging element 121 of FIG. 5.

Furthermore, each of the pixels in the upper left part and the upper right part of FIG. 6 includes one photodiode 121*e*. On the other hand, each of the pixels in the lower left part and the lower right part of FIG. 6 includes two photodiodes 121*f*. Note that, here, an example is described in which one pixel includes two photodiodes 121*f*; however, this is for convenience of description, and the number of photodiodes 121*f* included in one pixel may be the other number.

In the upper left part of FIG. 6, a light-shielding film 121*b*-11 is formed to shield the right half of the light-receiving surface of the photodiode 121*e*-11 when incident light enters from the upper side to the lower side in the figure. Furthermore, in the upper right part of FIG. 6, a light-shielding film 121*b*-12 is formed to shield the left half of the light-receiving surface of the photodiode 121*e*-12. Note that, it is indicated that one-dot chain lines in the figure are at the center position in the horizontal direction in the figure of the light-receiving surface of the photodiode 121*e*, and is in the vertical direction with respect to the light-receiving surface.

For example, in the case of the configuration illustrated in the upper left part of FIG. 6, incident light from the upper right direction in the figure indicated by an arrow forming an incident angle θ1 with respect to the one-dot chain line in the figure is easily received in a left half range that is not shielded by the light-shielding film 121*b*-11 of the photodiode 121*e*-11, but incident light from the upper left direction in the figure indicated by an arrow forming an incident angle 82 with respect to the one-dot chain line in the figure is not easily received in the left half range that is not shielded by the light-shielding film 121*b*-11 of the photodiode 121*e*-11. Thus, in the case of the configuration illustrated in the upper left part of FIG. 6, an incident angle directivity is given such that the light-receiving sensitivity characteristic is high for the incident light from the upper right in the figure, and the light-receiving sensitivity characteristic is low for the incident light from the upper left.

On the other hand, for example, in the case of the configuration illustrated in the upper right part of FIG. 6, incident light from the upper right direction in the figure indicated by an arrow forming an incident angle θ11 with respect to the one-dot chain line in the figure is not easily received in a left half range that is shielded by the light-shielding film 121*b*-12 of the photo diode 121*e*-12, but incident light from the upper left direction in the figure indicated by an arrow forming an incident angle θ12 with respect to the one-dot chain line in the figure is easily received in a right half range that is not shielded by the light-shielding film 121*b*-12 of the photodiode 121*e*-12. Thus, in the case of the configuration illustrated in the upper right part of FIG. 6, an incident angle directivity is given such that the light-receiving sensitivity characteristic is low for the incident light from the upper right in the figure, and the light-receiving sensitivity characteristic is high for the incident light from the upper left.

Furthermore, in the case of the lower left part of FIG. 6, the photodiodes 121*f*-1 and 121*f*-2 are provided on the left and right in the figure, and the configuration is made to have the incident angle directivity without providing the light-shielding film 121*b* by reading one of the detection signals.

In other words, in a case where two photodiodes 121*f*-1 and 121*f*-2 are formed in the pixel 121*a* as illustrated in the lower left part of FIG. 6, by making the detection signal of the photodiode 121*f*-1 provided on the left side in the figure contribute to the detection signal level of the pixel 121*a*, it is possible to have the incident angle directivity similar to that of the configuration in the upper left part of FIG. 6. In other words, incident light from the upper right direction in the figure, indicated by an arrow forming an incident angle θ21 with respect to the one-dot chain line in the figure, enters the photodiode 121*f*-1 and is received, and the detection signal is read and contributes to the detection signal level of the pixel 121*a*. On the other hand, incident light from the upper left direction in the figure, indicated by an arrow forming an incident angle θ22 with respect to the one-dot chain line in the figure, enters the photodiode 121*f*-2, but the detection signal is not read and does not contribute to the detection signal level of the pixel 121*a*.

Similarly, in a case where two photodiodes 121*f*-11 and 121*f*-12 are formed in the pixel 121*a* as illustrated in the lower right part of FIG. 6, by making the detection signal of the photodiode 121*f*-12 provided on the left side in the figure contribute to the detection signal level of the pixel 121*a*, it is possible to have the incident angle directivity similar to that of the configuration in the upper right part of FIG. 6. In other words, incident light from the upper right direction in the figure, indicated by an arrow forming an incident angle θ31 with respect to the one-dot chain line in the figure, enters the photodiode 121*f*-11, but the detection signal is not read and does not contribute to the detection signal level of the pixel 121*a*. On the other hand, incident light from the upper left direction in the figure, indicated by an arrow forming an incident angle θ32 with respect to the one-dot chain line in the figure, enters the photodiode 121*f*-12 and is received, and the detection signal is read and contributes to the detection signal level of the pixel 121*a*.

Note that, in FIG. 6, an example has been described in which the one-dot chain line in the vertical direction is at the center position in the horizontal direction in the figure of the light-receiving surface of the photodiode 121*e*; however, this is for convenience of description, and the one-dot chain line may be at another position. Different incident angle directivities can be generated by the difference in the horizontal position of the light-shielding film 121*b* indicated by the one-dot chain line in the vertical direction.

<Incident Angle Directivity in Configuration Including On-Chip Lens>

In the above, the principle of generation of the incident angle directivity has been described; however, here, a description will be given of the incident angle directivity in the configuration including the on-chip lens 121*c*.

Figure 7:
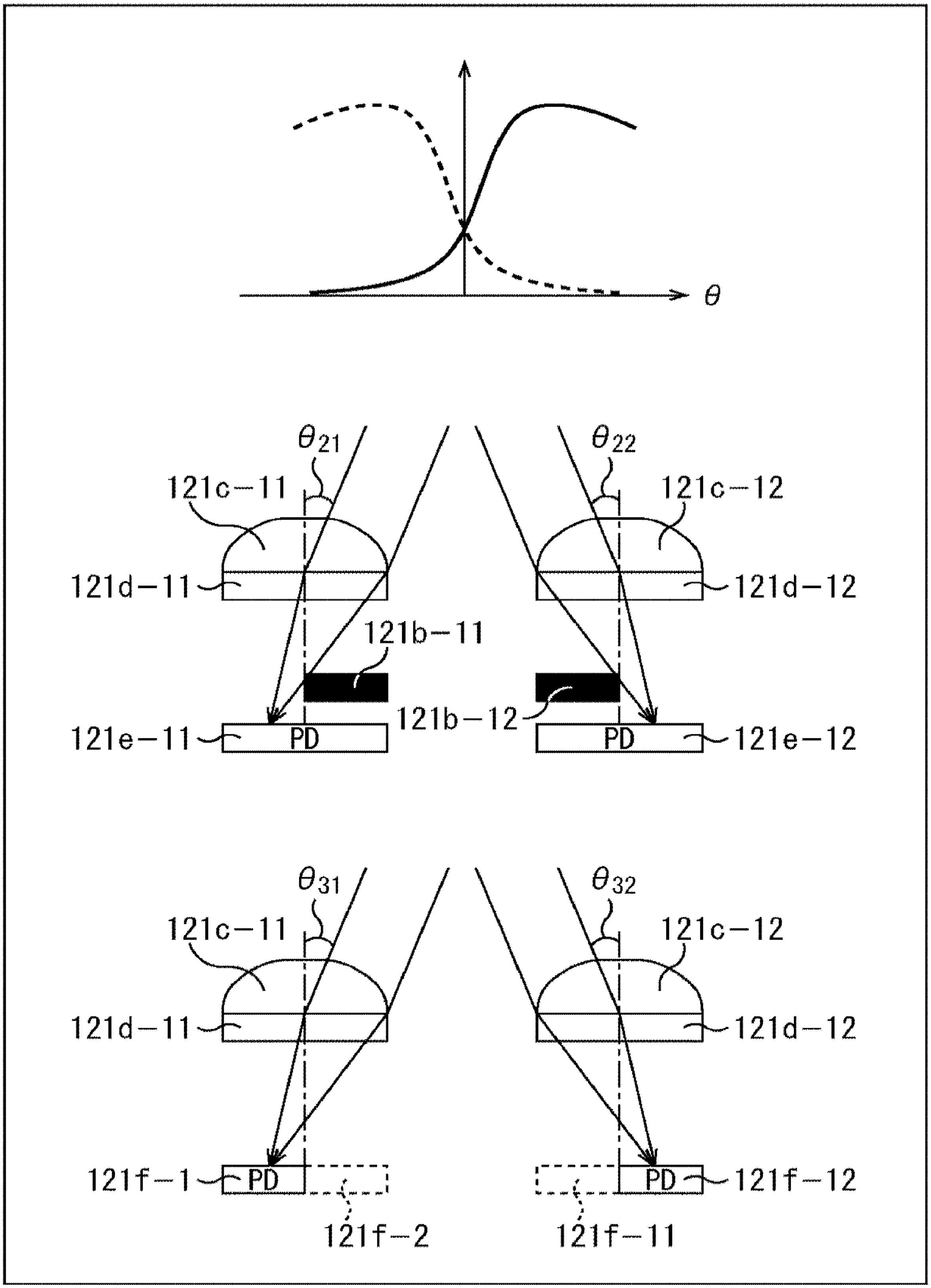
FIG. 7 is a diagram illustrating a change in incident angle directivity using an on-chip lens.

In other words, the incident angle directivity of each pixel in the imaging element 121 is set, for example, as illustrated in FIG. 7, by using the on-chip lens 121*c*, in addition to that by the above-described light-shielding film 121*b*. In other words, in the middle left part of FIG. 7, from the incident direction in the upper part of the figure, an on-chip lens 121*c*-11 that focuses incident light, a color filter 121*d*-11 that transmits light of a predetermined wavelength, and the photodiode 121*e*-11 that generates a pixel signal by photoelectric conversion are layered in this order, and in the middle right part of FIG. 7, from the incident direction in the upper part of the figure, an on-chip lens 121*c*-12, a color filter 121*d*-12, and the photodiode 121*e*-12 are arranged in this order.

Note that, in a case where it is not necessary to distinguish between the on-chip lenses 121*c*-11 and 121*c*-12, between the color filters 121*d*-11 and 121*d*-12, and between the photodiodes 121*e*-11 and 121*e*-12, they are simply referred to as the on-chip lenses 121*c*, the color filter 121*d*, and the photodiode 121*e*.

The imaging element 121 is further provided with the light-shielding films 121*b*-11 and 121*b*-12 that shield part of the region that receives incident light, as respectively illustrated in the middle left part and the middle right part of FIG. 7.

As illustrated in the middle left part of FIG. 7, in a case where the light-shielding film 121*b*-11 is provided that shields the right half of the photodiode 121*e*-11 in the figure, the detection signal level of the photodiode 121*e*-11 changes depending on an incident angle θ of the incident light as indicated by the solid line waveform in the upper part of FIG. 7.

In other words, when the incident angle θ, which is an angle formed by the incident light with respect to the one-dot chain line that is at the center position of the photodiode 121*e* and the on-chip lens 121*c* and vertical to each of the photodiode 121*e* and the on-chip lens 121*c*, increases (when the incident angle θ increases in the positive direction (inclines to the right direction in the figure)), the light is focused on a range where the light-shielding film 121*b*-11 is not provided, whereby the detection signal level of the photodiode 121*e*-11 increases. Conversely, as the incident angle θ decreases (as the incident angle θ increases in the negative direction (inclines to the left direction in the figure)), the light is focused on a range where the light-shielding film 121*b*-11 is provided, whereby the detection signal level of the photodiode 121*e*-11 decreases.

Note that, the incident angle θ here is defined as 0 degrees in a case where the direction of the incident light coincides with the one-dot chain line, and the incident angle θ on the incident angle θ21 side in the middle left of FIG. 7, at which incident light from the upper right in the figure enters, is defined as a positive value, and the incident angle θ on the incident angle θ22 side in the middle right of FIG. 7 is defined as a negative value. Thus, in FIG. 7, the incident angle of the incident light entering the on-chip lens 121*c* from the upper right is greater than the incident angle of the incident light entering from the upper left. That is, in FIG.

7, the incident angle θ increases as a direction of travel of the incident light inclines to the right (increases in the positive direction), and decreases as the direction of travel inclines to the left (increases in the negative direction).

Furthermore, as illustrated in the middle right part of FIG. 7, in a case where the light-shielding film **121*b*-12 is provided that shields the left half of the photodiode 121*e*-12 in the figure, the detection signal level of the photodiode 121*e*-12 changes depending on the incident angle θ of the incident light as indicated by the dotted line waveform in the upper part of FIG. 7**.

In other words, as indicated by the dotted line waveform in the upper part of FIG. 7, as the incident angle θ, which is an angle formed by the incident light with respect to the one-dot chain line that is at the center position of the photodiode **121*e* and the on-chip lens 121*c* and vertical to each of the photodiode 121*e* and the on-chip lens 121*c*, increases (as the incident angle θ increases in the positive direction), the light is focused on a range where the light-shielding film 121*b*-12 is provided, whereby the detection signal level of the photodiode 121*e*-12 decreases. Conversely, as the incident angle θ decreases (as the incident angle θ increases in the negative direction), the light enters a range where the light-shielding film 121*b*-12 is not provided, whereby the detection signal level of the photodiode 121*e*-12** increases.

Note that, in the upper part of FIG. 7, the horizontal axis indicates the incident angle θ, and the vertical axis indicates the detection signal level in the photodiode **121*e***.

Since the waveforms indicated by the solid line and the dotted line indicating the detection signal level depending on the incident angle θ illustrated in the upper part of FIG. 7 can be changed depending on the range of the light-shielding film **121*b*, thus it becomes possible to give (set) incident angle directivities different from each other in respective pixel units. Note that, the solid line waveform in the upper part of FIG. 7 corresponds to solid line arrows indicating that the incident light in the middle left part and the lower left part of FIG. 7 is focused with the incident angle θ changed. Furthermore, the dotted line waveform in the upper part of FIG. 7 corresponds to dotted arrows indicating that the incident light in the middle right part and the lower right part of FIG. 7** is focused with the incident angle θ changed.

The incident angle directivity here is a characteristic (light-receiving sensitivity characteristic) of the detection signal level of each pixel depending on the incident angle θ, but in the case of the example of the middle part of FIG. 7, it can also be said that this is a characteristic of a light shielding value depending on the incident angle θ. In other words, the light-shielding film **121*b* blocks incident light in a specific direction at a high level, but cannot sufficiently block incident light from directions other than the specific direction. This change in level of shielding from light causes different detection signal levels depending on the incident angle θ as illustrated in the upper part of FIG. 7**. Thus, when a direction in which each pixel can be shielded at the highest level from light is defined as a light shielding direction of each pixel, having incident angle directivities different from each other in respective pixel units is, in other words, having light shielding directions different from each other in respective pixels.

Moreover, with a configuration in which two photodiodes **121*f*-1 and 121*f*-2 are provided for one on-chip lens 121*c*-11 (a pixel output unit includes two photodiodes 121*f*-1 and 121*f*-2) as illustrated in the lower left part of FIG. 7, by using only the detection signal of the photodiode 121*f*-1 in the left part of the figure, it is possible to obtain the same detection signal level as that in a state where the right side of the photodiode 121*e*-11 in the middle left part of FIG. 7** is shielded from light.

In other words, when the incident angle θ, which is an angle formed by the incident light with respect to the one-dot chain line that is the center position of the on-chip lens **121*c* and vertical to each, increases (when the incident angle θ increases in the positive direction), the light is focused on a range of the photodiode 121*f*-1 from which the detection signal is read, whereby the detection signal level increases. Conversely, as the incident angle θ decreases (as the incident angle θ increases in the negative direction), the light is focused on a range of the photodiode 121*f*-2** from which the detection value is not read, whereby the detection signal level decreases.

Furthermore, similarly, with a configuration in which two photodiodes **121*f*-11 and 121*f*-12 are provided for one on-chip lens 121*c*-12 as illustrated in the lower right part of FIG. 7, by using only the detection signal of the photodiode 121*f*-12 in the right part of the figure, it is possible to obtain a detection signal of an output pixel unit of the same detection signal level as that in a state where the left side of the photodiode 121*e*-12 in the middle right part of FIG. 7** is shielded from light.

In other words, when the incident angle θ, which is an angle formed by the incident light with respect to the one-dot chain line that is at the center position of the on-chip lens **121*c* and vertical to each, increases (when the incident angle θ increases in the positive direction), the light is focused on a range of the photodiode 121*f*-11 in which the detection signal does not contribute to the detection signal of the output pixel unit, whereby the detection signal level of the detection signal of the output pixel unit decreases. Conversely, as the incident angle θ decreases (as the incident angle θ increases in the negative direction), the light is focused on a range of the photodiode 121*f*-12** in which the detection signal contributes to the detection signal of the output pixel unit, whereby the detection signal level of the detection signal of the output pixel unit increases.

Note that, it is desirable that the incident angle directivity has high randomness. This is because there is a possibility that, for example, when adjacent pixels have the same incident angle directivity, the above-described equations (1) to (3) or equations (4) to (6) described later become the same equations as each other, and the relationship cannot be satisfied between the number of equations and the number of unknowns that are the solutions of the simultaneous equations, and the pixel values constituting the restored image cannot be obtained. Furthermore, in the configuration illustrated in the middle part of FIG. 7, one photodiode **121*e*-11 and one photodiode 121*e*-12 are formed in the pixel 121*a*. On the other hand, in the configuration illustrated in the lower part of FIG. 7, two photodiodes 121*f*-1 and 121*f*-2, and two photodiodes 121*f*-11 and 121*f*-12 are formed in the pixel 121*a*. Thus, for example, in the lower part of FIG. 7, a single photodiode 121*f*** does not constitute one pixel.

Furthermore, as illustrated in the lower part of FIG. 7, in a case where one pixel output unit includes a plurality of photodiodes **121*f*, it can be considered that the output pixel value of the pixel output unit is modulated depending on the incident angle. Thus, the characteristic (incident angle directivity) of the output pixel value can be made different in pixel output unit, and the incident angle directivity in one pixel output unit is set. Moreover, in the case where one pixel output unit includes the plurality of photodiodes 121*f*, a configuration is essential of one on-chip lens 121***c* for one pixel output unit, for generating incident angle directivity in one pixel output unit.

Furthermore, as illustrated in the upper part of FIG. 7, in a case where one photodiode 121*e*-11 or one photodiode 121*e*-12 individually constitutes one pixel output unit, incident light to one photodiode 121*e*-11 or one photodiode 121*e*-12 constituting one pixel output unit is modulated depending on the incident angle, whereby the output pixel value is modulated as a result. Thus, the characteristics (incident angle directivities) of the output pixel value can be made different from each other, and the incident angle directivity in one pixel output unit is set. Moreover, in a case where one photodiode 121*e*-11 or one photodiode 121*e*-12 individually constitutes one pixel output unit, the incident angle directivity is set independently by the light-shielding film 121*b* provided for each one pixel output unit at the time of manufacturing.

Furthermore, as illustrated in the lower part of FIG. 7, in the case where one pixel output unit includes the plurality of photodiodes 121*f*, positions and the number of the plurality of photodiodes 121*f* (the number of divisions of the photodiodes 121*f* constituting one pixel output unit) for setting the incident angle directivity for each one pixel output unit are set independently in one pixel output unit at the time of manufacturing, and moreover, regarding which photodiode 121*f* is used for setting the incident angle directivity among the plurality of photodiodes 121*f*, it is possible to switch at the time of imaging.

<Setting of Incident Angle Directivity>

Figure 8:
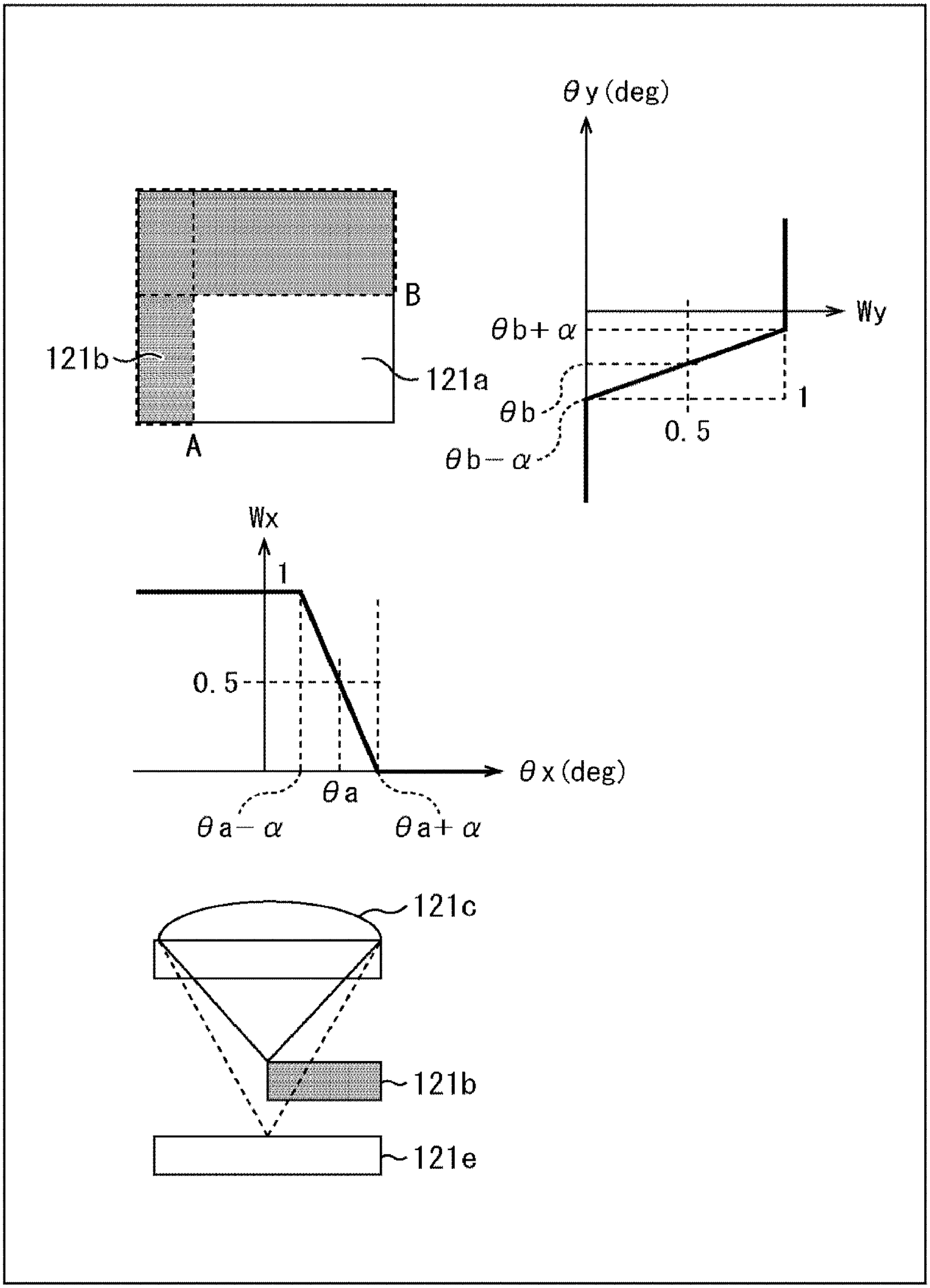
FIG. 8 is a diagram illustrating design of incident angle directivity.

For example, as illustrated in the upper part of FIG. 8, a setting range of the light-shielding film 121*b* is set as a range from the left end to a position A in the horizontal direction in the pixel 121*a*, and a range from the upper end to a position B in the vertical direction.

In this case, a weight Wx of from 0 to 1 in the horizontal direction is set, which serves as an index of incident angle directivity depending on an incident angle θx (deg) from the center position in the horizontal direction of each pixel. In more detail, in a case where it is assumed that the weight Wx is 0.5 at the incident angle θx=θa corresponding to the position A, a weight Wh is set so that the weight Wx is 1 at the incident angle $\theta x<\theta a-\alpha$, and the weight Wx is $(-(\theta x-\theta a)/2\alpha+1/2)$ at $\theta a-\alpha\leq$ the incident angle $\theta x\leq\theta a+\alpha$, and the weight Wx is 0 at the incident angle $\theta x>\theta a+\alpha$. Note that, here, an example will be described in which the weight Wh is 0, 0.5, and 1; however, the weight Wh is 0, 0.5, and 1 when an ideal condition is satisfied.

Similarly, a weight Wy of from 0 to 1 in the vertical direction is set, which serves as an index of incident angle directivity depending on an incident angle θy (deg) from the center position in the vertical direction of each pixel. In more detail, in a case where it is assumed that the weight Wv is 0.5 at the incident angle θy=θb corresponding to the position B, a weight Wy is set so that the weight Wy is 0 at the incident angle $\theta y<\theta b-\alpha$, the weight Wy is $((\theta y-\theta b)/2\alpha+1/2)$ at $\theta b-\alpha\leq$ the incident angle $\theta y\leq\theta b+\alpha$, and the weight Wy is 1 at the incident angle $\theta y>\theta b+\alpha$.

Then, by using the weights Wx and Wy thus obtained, the incident angle directivity of each pixel 121*a*, in other words, coefficients (coefficient set) corresponding to the light-receiving sensitivity characteristic can be obtained.

Furthermore, at this time, an inclination (½α) indicating a change in weight in a range where the weight Wx in the horizontal direction and the weight Wy in the vertical direction are around 0.5 is set by using the on-chip lens 121*c* having a different focal length.

In other words, different focal lengths can be obtained by using on-chip lenses 121*c* having different curvatures.

For example, by using the on-chip lens 121*c* having a different curvature, as indicated by the solid line in the lower part of FIG. 8, when light is focused so that the focal length is on the light-shielding film 121*b*, the inclination (½α) becomes steep. In other words, in the upper part of FIG. 8, the weight Wx in the horizontal direction and the weight Wy in the vertical direction sharply change to 0 or 1 in the vicinity of boundaries of the incident angle θx=θa in the horizontal direction and the incident angle θy=θb in the vertical direction where the weights are near 0.5.

Furthermore, for example, by using the on-chip lens 121*c* having a different curvature, when the focal length is focused on the photodiode 121*e* as indicated by the dotted line in the lower part of FIG. 8, the inclination (½α) becomes moderate. In other words, in the upper part of FIG. 8, the inclination moderately changes to 0 or 1 in the vicinity of boundaries of the incident angle θx=θa in the horizontal direction and the incident angle θy=θb in the vertical direction where the weight Wx in the horizontal direction and the weight Wy in the vertical direction are near 0.5.

As described above, different incident angle directivities, in other words, different light-receiving sensitivity characteristics can be obtained by using the on-chip lenses 121*c* having different curvatures to make different focal lengths.

Thus, the incident angle directivity of the pixel 121*a* can be set to a different value by making the range in which the photodiode 121*e* is shielded by the light-shielding film 121*b* and the curvature of the on-chip lens 121*c* different. Note that, the curvature of the on-chip lens may be the same for all pixels in the imaging element 121, or may be different for some pixels.

<Difference Between On-Chip Lens and Imaging Lens>

As described above, the imaging element 121 does not require an imaging lens. However, the on-chip lens 121*c* is necessary at least in a case where the incident angle directivity is realized by using the plurality of photodiodes in the pixel as described with reference to FIG. 5. The on-chip lens 121*c* and the imaging lens have different physical functions.

The imaging lens has a focusing function for causing incident light entering from the same direction to enter a plurality of pixels adjacent to each other. On the other hand, light passing through the on-chip lens 121*c* is incident only on the light-receiving surface of the photodiode 121*e* or 121*f* constituting one corresponding pixel. In other words, the on-chip lens 121*c* is provided for each pixel output unit, and focuses subject light entering the on-chip lens 121*c* on only the corresponding pixel output unit. In other words, the on-chip lens 121*c* does not have a focusing function for causing diffused light emitted from a virtual point light source to enter a plurality of pixels adjacent to each other.

<Relationship Between Subject Surface and Distance to Imaging Element>

Next, a relationship between the subject surface and the distance to the imaging element 121 will be described with reference to FIG. 9.

Figure 9:
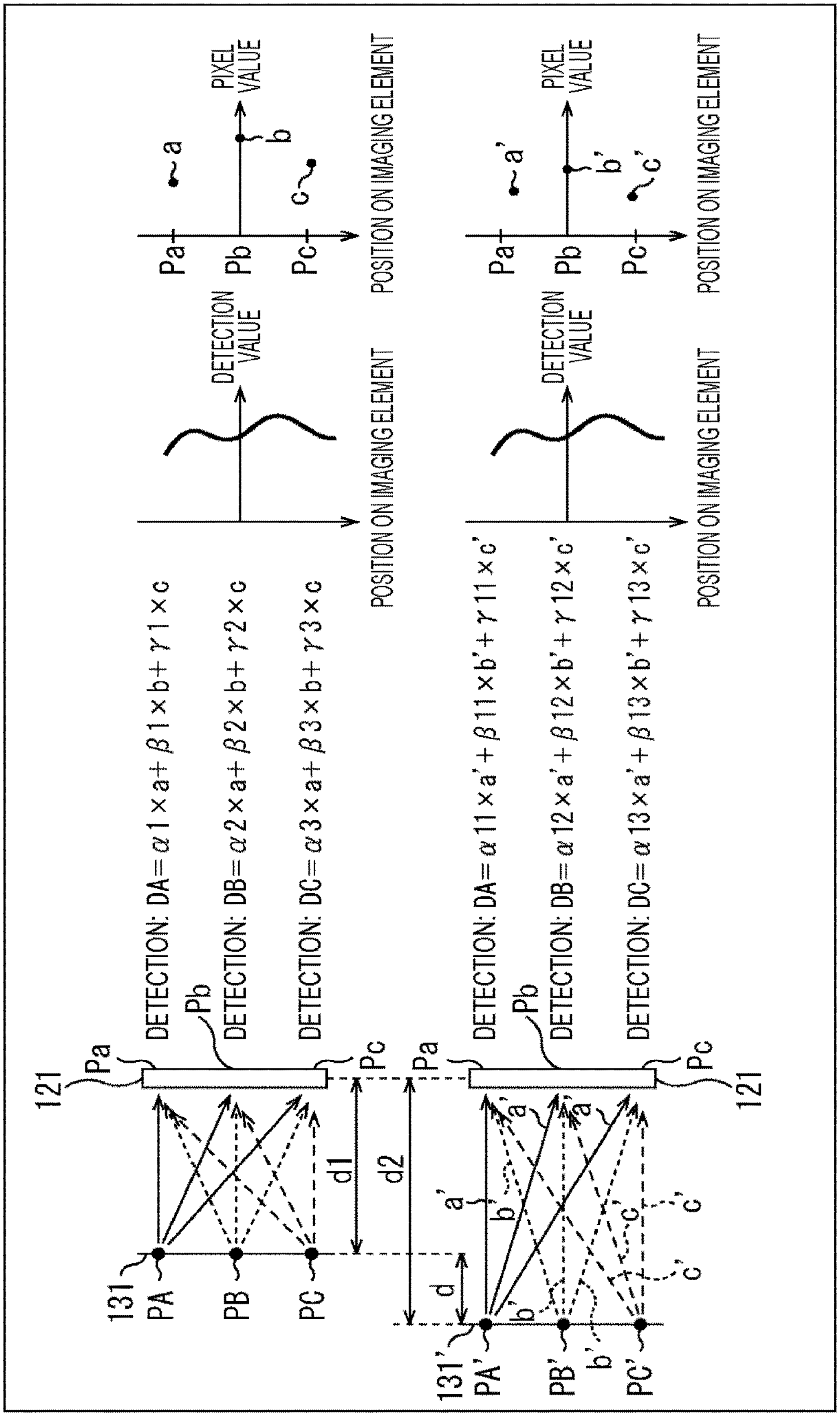
FIG. 9 is a diagram illustrating a relationship between a subject distance and coefficients expressing incident angle directivity.

As illustrated in the upper left part of FIG. 9, in a case where a subject distance between the imaging element 121 and the subject surface 131 is a distance d1, for example, when the point light sources PA, PB, and PC on the subject surface 131 are set, it is assumed that the detection signal levels DA, DB, and DC at the corresponding positions Pa, Pb, and Pc on the imaging element 121 can be expressed by the same equations as the equations (1) to (3) described above.

$$DA=\alpha 1\times a+\beta 1\times b+\gamma 1\times c \quad (1)$$

$$DB=\alpha 2\times a+\beta 2\times b+\gamma 2\times c \quad (2)$$

$$DC=\alpha 3\times a+\beta 3\times b+\gamma 3\times c \quad (3)$$

On the other hand, as illustrated in the lower left part of FIG. 9, in the case of a subject surface 131' in which the subject distance to the imaging element 121 is a distance d2 greater than the distance d1 by d, in other words, in the case of the subject surface 131' that is behind the subject surface 131 when viewed from the imaging element 121, the detection signal levels DA, DB, and DC are all similar, as illustrated in the upper center part and the lower center part of FIG. 9.

However, in this case, the light beams having light intensities a', b', and c' from point light sources PA', PB', and PC' on the subject surface 131' are received by each pixel of the imaging element 121. At this time, since the incident angles of the light beams having the light intensities a', b', and c' received on the imaging element 121 differ (change), respective different coefficient sets are required, and the detection signal levels DA, DB, and DC in the respective positions Pa, Pb, and Pc are expressed as indicated in the following equations (4) to (6), for example.

$$DA=\alpha 11\times a'+\beta 11\times b'+\gamma 11\times c \quad (4)$$

$$DB=\alpha 12\times a'+\beta 12\times b'+\gamma 12\times c \quad (5)$$

$$DC=\alpha 13\times a'+\beta 13\times b'+\gamma 13\times c \quad (6)$$

Here, a coefficient set group including a coefficient set α11, β11, and γ11, a coefficient set α12, β12, and γ12, and a coefficient set α13, β13, and γ13 is a coefficient set group of the subject surface 131' respectively corresponding to the coefficient set α1, β1, and γ1, the coefficient set α2, β2, and 2, and the coefficient set α3, β3, and γ3 in the subject surface 131.

Thus, by solving the equations (4) to (6) by using the preset coefficient set group α11, β11, γ11, α12, β12, γ12, α13, β13, and γ13, it becomes possible to obtain the light intensity (a', b', c') of the light beams from the point light sources PA', PB', and PC', as illustrated in the lower right part of FIG. 9, with a method similar to the method of obtaining the light intensity (a, b, c) of the light beams in the point light sources PA, PB, and PC in the case of the subject surface 131 as illustrated in the upper right part of FIG. 9, and as a result, it becomes possible to obtain a restored image of the subject on the subject surface 131'.

In other words, in the imaging apparatus 100 of FIG. 1, a coefficient set group for each distance from the imaging element 121 to a subject surface is stored in advance, simultaneous equations are configured by switching the coefficient set groups, and the configured simultaneous equations are solved, whereby it becomes possible to obtain a restored image of the subject surface at various subject distances on the basis of one detection image.

That is, by simply capturing the detection image once, the restored image is obtained by switching the coefficient set groups depending on the distance to the subject surface in subsequent processing, whereby it is also possible to generate a restored image at an arbitrary distance.

Furthermore, in the case of image recognition or in a case where it is desired to obtain characteristics of a subject such as a visible image or other than the visible image, it is also possible to perform image recognition or the like by using a detection signal itself by applying machine learning such as deep learning to the detection signal of the imaging element, without performing the image recognition on the basis of a restored image after the restored image is obtained.

Furthermore, in a case where the subject distance and the angle of view can be specified, a restored image may be generated by using a detection image including detection signals of respective pixels each having an incident angle directivity suitable for imaging the subject surface corresponding to the specified subject distance and angle of view, without using all the pixels. In this way, a restored image can be obtained by using a detection signal of a pixel suitable for imaging the subject surface corresponding to the specified subject distance and angle of view.

Figure 10:
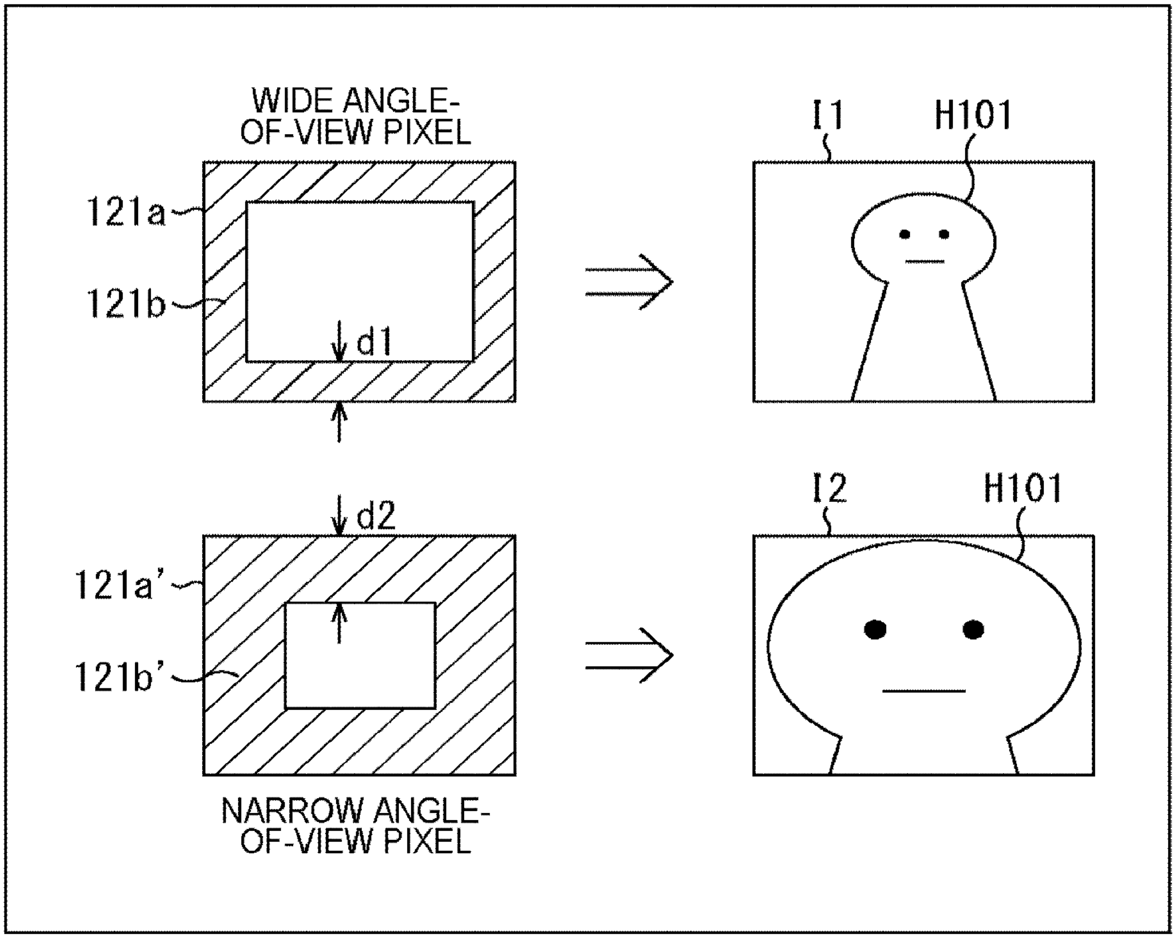
FIG. 10 is a diagram illustrating a relationship between a narrow angle-of-view pixel and a wide angle-of-view pixel.

For example, pixels are considered, a pixel 121*a* that is shielded by the light-shielding film 121*b* by a width d1 from each end of four sides as illustrated in the upper part of FIG. 10, and a pixel 121*a*' that is shielded by the light-shielding film 121*b* by a width d2 (>d1) from each end of four sides as illustrated in the lower part of FIG. 10.

Figure 11:
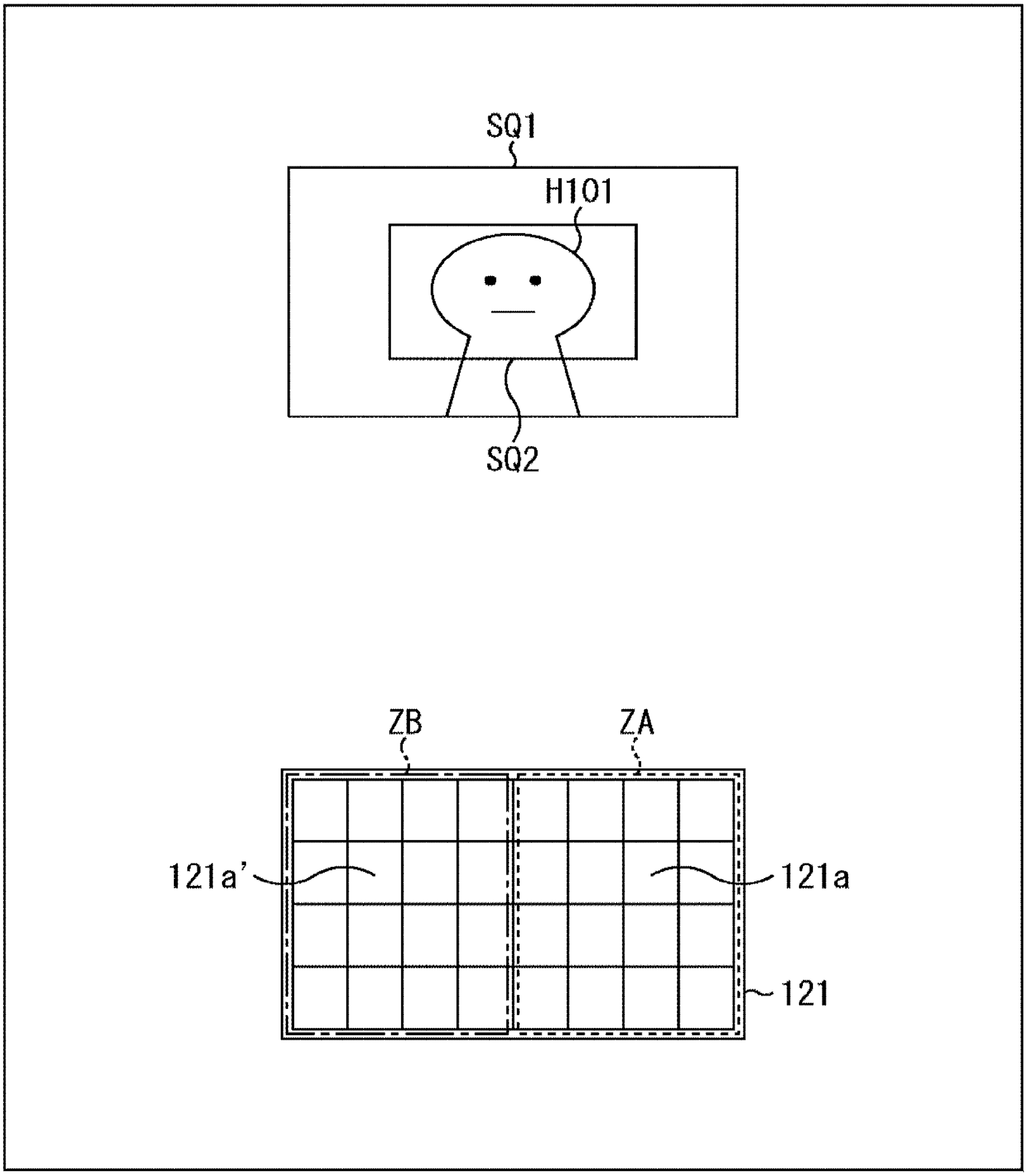
FIG. 11 is a diagram illustrating the relationship between the narrow angle-of-view pixel and the wide angle-of-view pixel.

The pixel 121*a* is used, for example, for restoring an image I1 of FIG. 10 corresponding to an angle of view SQ1 including the whole of a person H101 as a subject, as illustrated in the upper part of FIG. 11. On the other hand, the pixel 121*a*' is used, for example, for restoring an image I2 of FIG. 10 corresponding to an angle of view SQ2 in which the periphery of the face of the person H101 as the subject is zoomed up, as illustrated in the upper part of FIG. 11.

Figure 12:
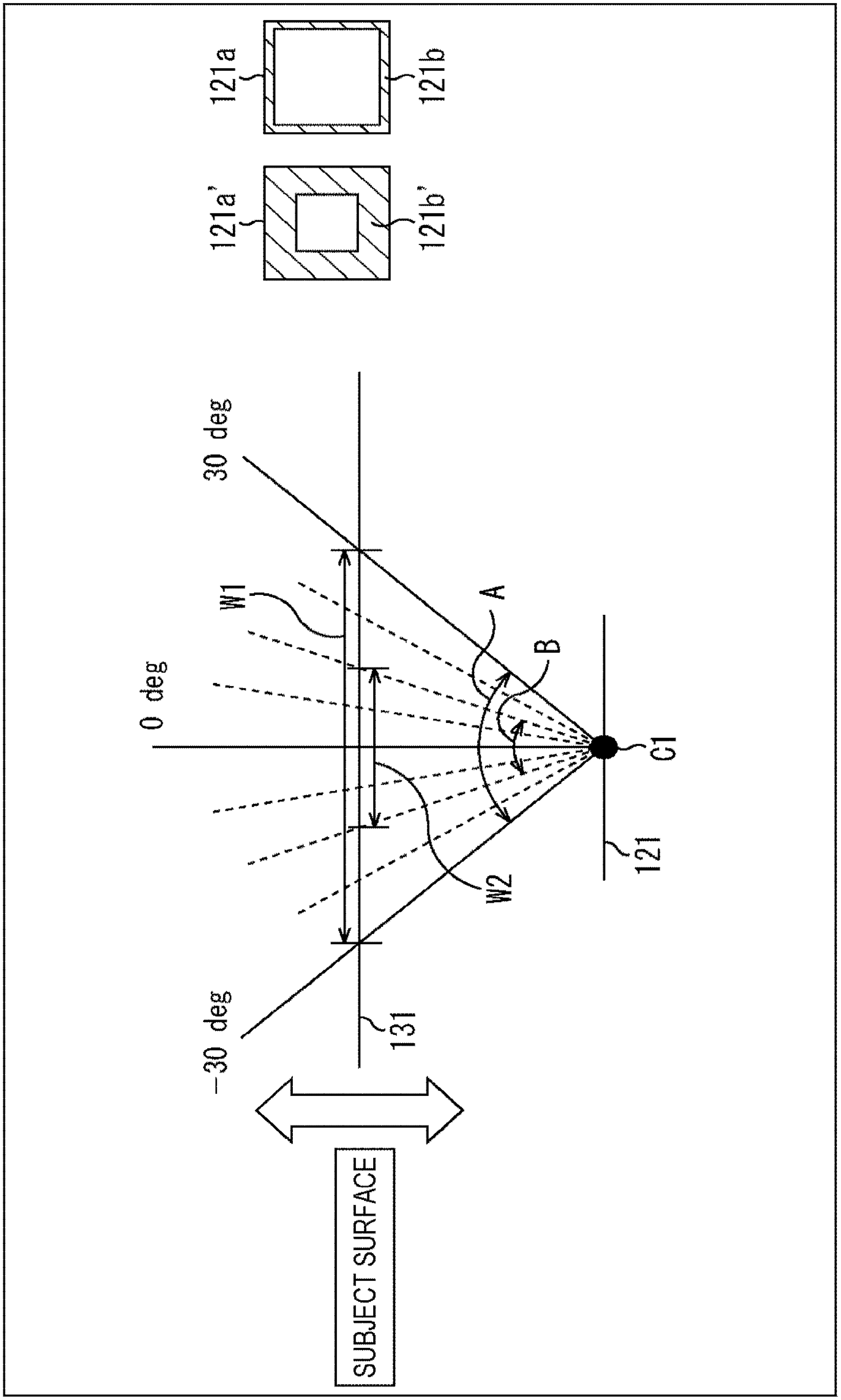
FIG. 12 is a diagram illustrating the relationship between the narrow angle-of-view pixel and the wide angle-of-view pixel.

This is because the pixel 121*a* of FIG. 10 has an incident light angle range A with respect to the imaging element 121 as illustrated in the left part of FIG. 12, whereby incident light can be received for a subject width W1 in the horizontal direction on the subject surface 131.

On the other hand, since the pixel 121*a*' of FIG. 10 has a wider range shielded from light than that of the pixel 121*a* of FIG. 10, an incident light angle range with respect to the imaging element 121 is B (<A) as illustrated in the left part of FIG. 12, so that incident light can be received for a subject width W2 (<W1) in the horizontal direction on the subject surface 131.

That is, the pixel 121*a* of FIG. 10 with a narrow light-shielding range is a wide angle-of-view pixel suitable for imaging a wide range on the subject surface 131, whereas the pixel 121*a*' of FIG. 10 with a wide light-shielding range is a narrow angle-of-view pixel suitable for imaging a narrow range on the subject surface 131. Note that, the wide angle-of-view pixel and the narrow angle-of-view pixel here are expressions for comparing both the pixels 121*a* and 121*a*' of FIG. 10 with each other, and are not limited to these when comparing pixels having other angles of view.

Note that, FIG. 12 illustrates a relationship between positions on the subject surface 131 and the incident angle of incident light from each position, with respect to the center position C1 of the imaging element 121. Furthermore, FIG. 12 illustrates the relationship with respect to the horizontal direction between the positions on the subject surface 131 and the incident angle of incident light from each position on the subject surface 131, but there is a similar relationship for the vertical direction. Moreover, on the right part of FIG. 12, the pixels 121*a* and 121*a*' of FIG. 10 are illustrated.

With such a configuration, as illustrated in the lower part of FIG. 11, in the case of a configuration in which a predetermined number of pixels 121*a* of FIG. 10 are gathered in a range ZA surrounded by the dotted line, and the predetermined number of pixels 121*a*' of FIG. 10 are gathered in a range ZB surrounded by the one-dot chain line, in the imaging element 121, when an image of the angle of view SQ1 corresponding to the subject width W1 is to be restored, the pixel 121*a* of FIG. 10 that images the angle of view SQ1 is used, whereby an image of the subject width W1 on the subject surface 131 can be appropriately restored.

Similarly, when an image of the angle of view SQ2 corresponding to the subject width W2 is to be restored, the detection signal level of the pixel 121*a*' of FIG. 10 that images the angle of view SQ2 is used, whereby an image of the subject width W2 can be appropriately restored.

Note that, in the lower part of FIG. 11, a configuration is illustrated in which the predetermined number of pixels 121*a*' are provided on the left side in the figure, and the predetermined number of pixels 121*a* are provided on the right side; however, this is illustrated as an example for simplifying the description, and the pixel 121*a* and the pixel 121*a*' are desirably arranged to be randomly mixed.

As described above, the angle of view SQ2 is narrower than the angle of view SQ1, so in a case where the images of the angle of view SQ2 and the angle of view SQ1 are to be restored with the same predetermined number of pixels, a restored image with higher image quality can be obtained by restoring the image of the angle of view SQ2 having a narrower angle of view, than restoring the image of the angle of view SQ1.

That is, in a case where it is considered to obtain a restored image by using the same number of pixels, a restored image with higher image quality can be obtained by restoring an image with a narrower angle of view.

Note that, in a case where an image with a wide angle of view is obtained as a restored image, all pixels of the wide angle-of-view pixels may be used, or some of the wide angle-of-view pixels may be used. Furthermore, in a case where an image with a narrow angle of view is obtained as a restored image, all pixels of the narrow angle-of-view pixels may be used, or some of the narrow angle-of-view pixels may be used.

By using the imaging element 121 as described above, as a result, an imaging lens, an optical element including a diffraction grating or the like, a pinhole, or the like is unnecessary (becomes imaging lens free), so that it becomes possible to increase the degree of freedom in apparatus design, and also possible to realize downsizing of the apparatus with respect to the incident direction of the incident light, and possible to reduce the manufacturing cost. Furthermore, a lens is also unnecessary corresponding to an imaging lens for forming an optical image, such as a focus lens.

Moreover, by using the imaging element 121, only a detection image is acquired, and thereafter, a restored image is obtained by solving simultaneous equations configured by selectively using a coefficient set group corresponding to the subject distance and the angle of view, whereby it becomes possible to generate restored images having various subject distances and angles of view.

Moreover, since the imaging element 121 can have an incident angle directivity in a pixel unit, it is possible to realize a multi-pixel, compared to an optical filter including a diffraction grating, a conventional imaging element, and the like, and also it is possible to obtain a restored image with high resolution and high angular resolution. On the other hand, in an imaging apparatus including an optical filter and a conventional imaging element, it is difficult to realize a high resolution of a restored image, and the like since it is difficult to miniaturize the optical filter even if the pixels are miniaturized.

Furthermore, since the imaging element 121 does not require an optical filter including a diffraction grating, or the like, it does not occur that the optical filter is distorted by heat due to temperature rise of the use environment. Thus, by using such an imaging element 121, it becomes possible to realize an apparatus with high environmental resistance.

<First Modification>

In the right part of FIG. 3, as the configuration of the light-shielding film 121*b* in each pixel 121*a* of the imaging element 121, an example has been described in which the entire light shielding is performed in the vertical direction, and the light shielding width and position are changed in the horizontal direction, whereby a difference is given in the incident angle directivity in the horizontal direction; however, the configuration of the light-shielding film 121*b* is not limited to this example. For example, the entire light-shielding is performed in the horizontal direction, and the width (height) and position are changed in the vertical direction, whereby a difference may be given in the incident angle directivity in the vertical direction.

Note that, the light-shielding film 121*b* that shields the entire pixel 121*a* in the vertical direction, and shields the pixel 121*a* with a predetermined width in the horizontal direction as in the example illustrated in the right part of FIG. 3, is referred to as a horizontal band type light-shielding film 121*b*. On the other hand, the light-shielding film 121*b* that shields the entire pixel 121*a* in the horizontal direction, and shields the pixel 121*a* with a predetermined height in the vertical direction, is referred to as a vertical band type light-shielding film 121*b*.

Figure 13:
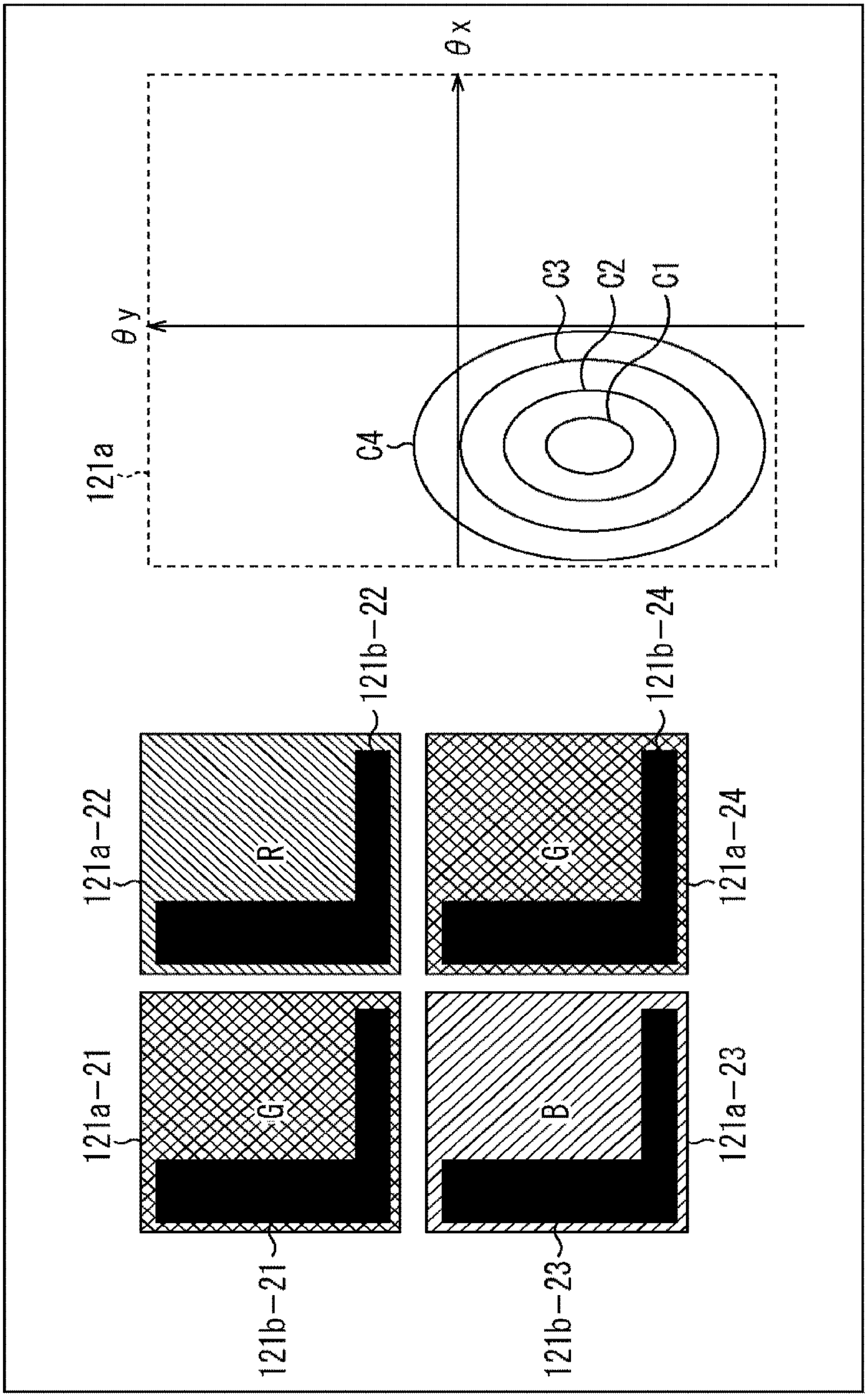
FIG. 13 is a diagram illustrating a modification.

Furthermore, as illustrated in the example illustrated in the left part of FIG. 13, the pixel 121*a* may be provided with an L-shaped light-shielding film 121*b* obtained by combining the vertical band type and the horizontal band type light-shielding films 121*b*. In the left part of FIG. 13, a portion indicated in black is the light-shielding film 121*b*. That is, light-shielding films 121*b*-21 to 121*b*-24 are light-shielding films of pixels 121*a*-21 to 121*a*-24, respectively.

Each of these pixels (pixels 121*a*-21 to 121*a*-24) has incident angle directivity as illustrated in the right part of FIG. 13. The graph illustrated in the right part of FIG. 13 illustrates light-receiving sensitivity in each pixel. The horizontal axis represents the incident angle θx in the horizontal direction (x direction) of the incident light, and the vertical axis represents the incident angle θy in the vertical direction (y direction) of the incident light. Then, light-receiving sensitivity within a range C4 is higher than that outside the range C4, light-receiving sensitivity within a range C3 is higher than that outside the range C3, light-receiving sensitivity within a range C2 is higher than that outside the range C2, and light-receiving sensitivity within a range C1 is higher than that outside the range C1.

Thus, it is indicated that, for each pixel, a detection signal level of the incident light that satisfies conditions of the incident angle θx in the horizontal direction (x direction) and the incident angle θy in the vertical direction (y direction) that are within the range C1, is the highest, and the detection signal level decreases in the order of the conditions of being within the range C2, the range C3, the range C4, and the range other than the range C4. Such intensity of light-receiving sensitivity is determined by the range shielded by the light-shielding film 121*b*.

Furthermore, in the left part of FIG. 13, an alphabet in each pixel 121*a* indicates color of a color filter (the alphabet is indicated for convenience of description, and is not actually written). The pixel 121*a*-21 is a G pixel in which a green color filter is arranged, the pixel 121*a*-22 is an R pixel in which a red color filter is arranged, the pixel 121*a*-23 is a B pixel in which a blue color filter is arranged, and the pixel 121*a*-24 is a G pixel in which a green color filter is arranged. That is, these pixels form a Bayer array. Of course, this is an example, and the arrangement pattern of the color filters is arbitrary. The arrangement of the light-shielding film 121*b* and the color filter are irrelevant. For example, in some or all of the pixels, a filter other than the color filter may be provided, or no filter may be provided.

In the left part of FIG. 13, an example is illustrated in which an "L-shaped" light-shielding film 121*b* shields the left side and the lower side in the figure of the pixel 121*a*; however, the orientation of the "L-shaped" light-shielding film 121*b* is arbitrary, and is not limited to the example of FIG. 13. For example, the "L-shaped" light-shielding film 121*b* may shield the lower side and the right side in the figure of the pixel 121*a*, may shield the right side and the upper side in the figure of the pixel 121*a*, or may shield the upper side and the left side in the figure of the pixel 121*a*. Of course, the orientation of the light-shielding film 121*b* can be set independently for each pixel. Note that, the "L-shaped" light-shielding film 121*b* is also collectively referred to as "L-shaped type light-shielding film 121*b*".

Although the light-shielding film has been described above, the description of this example can also be applied to a case where incident angle directivity is given by selectively using a plurality of photodiodes arranged in a pixel. That is, for example, by appropriately setting the division position (size and shape of each partial region), and the position, size, shape, and the like of each photodiode, or appropriately selecting the photodiode, an incident light directivity can be realized equivalent to the incident light directivity by the above-described L-shaped type light-shielding film 121*b*.

<Second Modification>

Figure 14:
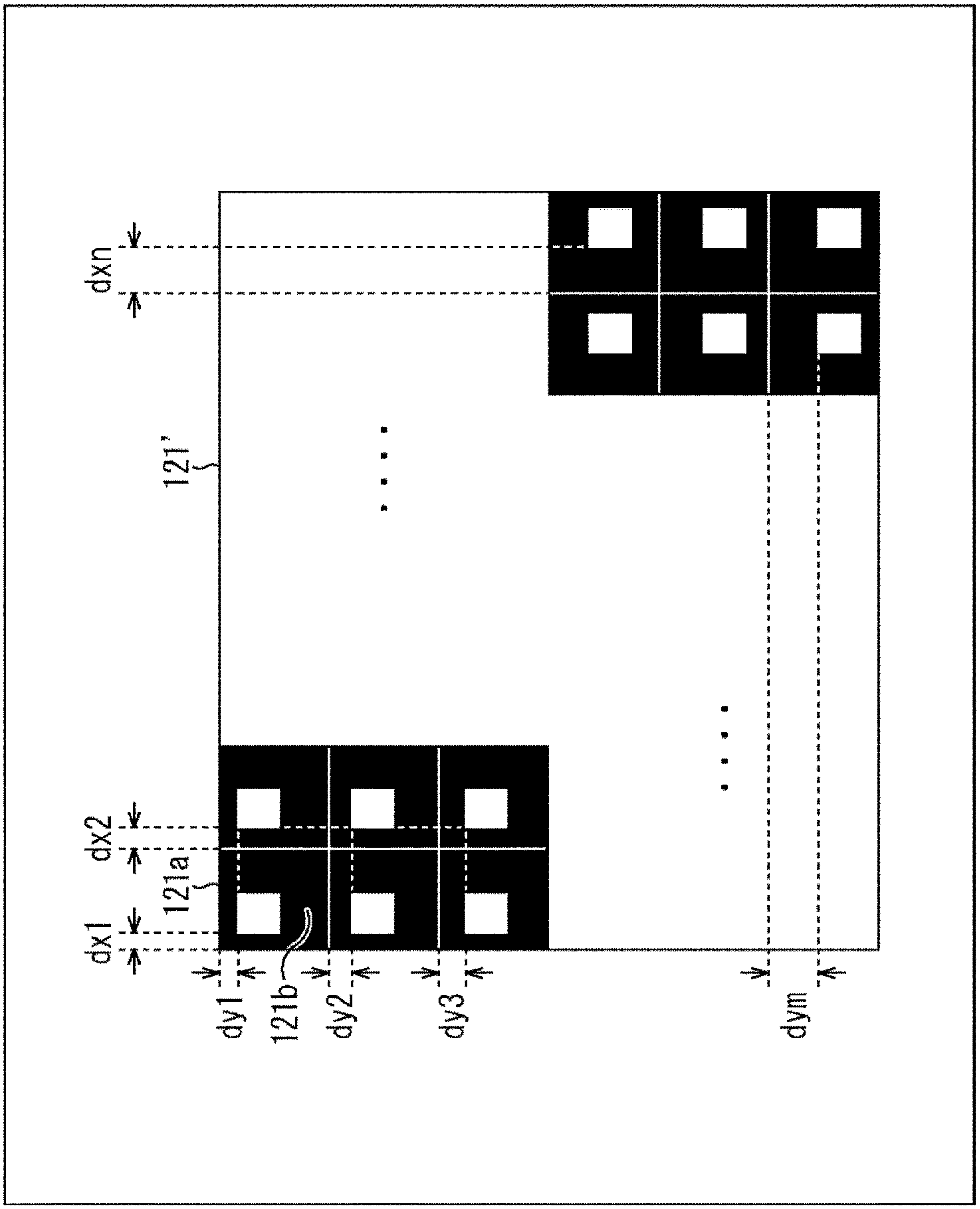
FIG. 14 is a diagram illustrating a modification.

In the above, an example has been described in which the horizontal band type, the vertical band type, and the L-shaped type light-shielding films are arranged in each pixel so that the range shielded from light randomly changes; however, for example, as illustrated by an imaging element 121' of FIG. 14, a light-shielding film 121*b* may be formed that shields a range (a range indicated in black in the figure) other than a range in the vicinity of a position where a light beam is received in each pixel in a case where a rectangular opening is provided.

In other words, the light-shielding film 121*b* may be provided so that an incident angle directivity is given in which only a light beam transmitted through the rectangular opening is received among light beams emitted from a point light source constituting a subject surface at a predetermined subject distance in a case where the rectangular opening is provided for each pixel.

Note that, in FIG. 14, for example, the horizontal width of the light-shielding film 121*b* changes to the widths dx1, dx2, . . . dxn with respect to the horizontal pixel arrangement, and there is a relationship of dx1<dx2< . . . <dxn. Similarly, the vertical height of the light-shielding film 121*b* changes to the heights dy1, dy2 . . . dym with respect to the vertical pixel arrangement, and there is a relationship of dy1<dy2< . . . <dxm. Furthermore, an interval of the change in each of the horizontal width and the vertical width of the light-shielding film 121*b* depends on the subject resolution (angular resolution) to be restored.

In other words, it can be said that the configuration of each pixel 121*a* in the imaging element 121' of FIG. 14 has incident angle directivity in which a range shielded from light is changed to correspond to the pixel arrangement in the imaging element 121' in the horizontal direction and the vertical direction.

Figure 15:
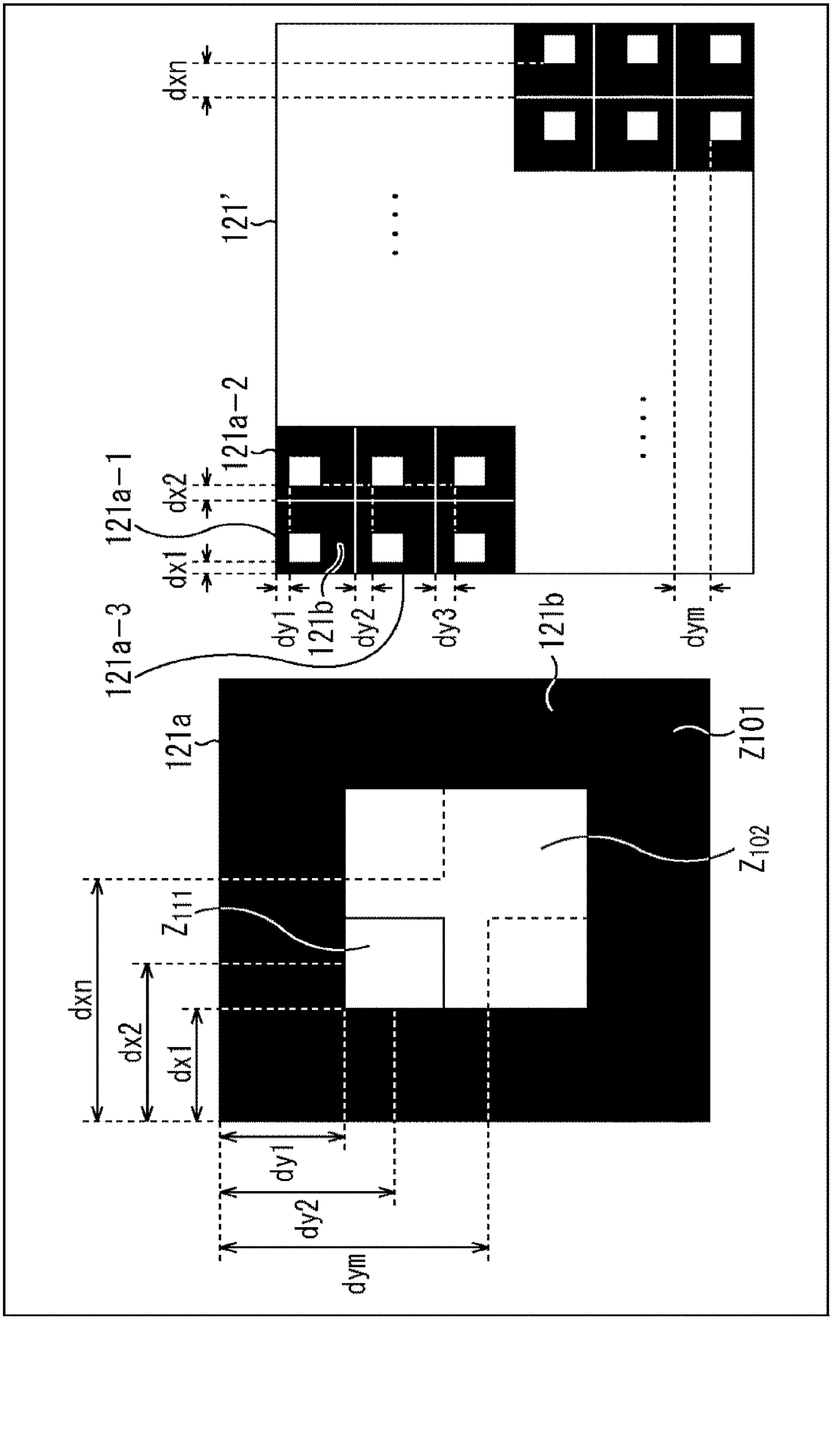
FIG. 15 is a diagram illustrating a modification.

In more detail, the light-shielding range of each pixel 121*a* of FIG. 14 is determined in accordance with a rule described by using the pixel 121*a* illustrated in the left part of FIG. 15, for example.

Note that, the right part of FIG. 15 illustrates the configuration of the same imaging element 121' as that of FIG. 14. Furthermore, the left part of FIG. 15 illustrates the configuration of the pixel 121*a* of the imaging element 121' in the right part of FIG. 15 (same as FIG. 14).

As illustrated in the left part of FIG. 15, the pixel is shielded by the light-shielding film 121*b* by the widths dx1 from the ends of the upper side and the lower side of the pixel 121*a* toward the inside of the pixel 121*a*, respectively, and shielded by the light-shielding film 121*b* by the heights dy1 from the ends of the left side and the right side toward the inside of the pixel 121*a*, respectively. Note that, in FIGS. 15 and 16, the light-shielding film 121*b* is in a range indicated in black.

In the left part of FIG. 15, a range shielded from light by such formation of the light-shielding film 121*b* is hereinafter referred to as a main light-shielding portion Z101 (black portion in the left part of FIG. 15) of the pixel 121*a*, and a rectangular range other than that is referred to as a range Z102.

In the pixel 121*a*, a rectangular opening Z111 not shielded by the light-shielding film 121*b* is provided in the range Z102. Thus, in the range Z102, a range other than the rectangular opening Z111 is shielded by the light-shielding film 121*b*.

In the pixel arrangement in the imaging element 121' of FIG. 14, as illustrated in the right part of FIG. 15 (same as FIG. 14), the pixel 121*a*-1 at the upper left end has a configuration in which the rectangular opening Z111 is arranged so that its left side is at a distance of the width dx1 from the left side of the pixel 121*a*, and its upper side is at a distance of the dy1 from the upper side of the pixel 121*a*.

Similarly, the pixel 121*a*-2 on the right side of the pixel 121*a*-1 has a configuration in which the rectangular opening Z111 is arranged so that its left side is at a distance of the width dx2 from the left side of the pixel 121*a*, and its upper side is at a distance of the height dy1 from the upper side of the pixel 121*a*, and the range other than the rectangular opening Z111 is shielded by the light-shielding film 121*b*.

Similarly, in the pixel 121*a* adjacent in the horizontal direction, as the arrangement proceeds to the right side in the figure, the right side of the rectangular opening Z111 moves to the widths dx1, dx2 . . . dxn from the right side of the pixel 121*a*. Note that, the dotted line rectangular portion of the upper right part in the range Z102 of FIG. 15 illustrates a state in which the rectangular opening Z111 is arranged so that its left side is at a distance of the width dxn from the left side of the pixel 121*a*, and its upper side is at a distance of the height dy1 from the upper side of the pixel 121*a*. Furthermore, each interval between the widths dx1, dx2 . . . dxn is a value obtained by dividing the width obtained by subtracting the width of the rectangular opening Z111 from the horizontal width of the range Z102 by the number of pixels n in the horizontal direction. In other words, the interval of the change in the horizontal direction is determined by division by the number of pixels n in the horizontal direction.

Furthermore, the horizontal position of the rectangular opening Z111 in the pixel 121*a* in the imaging element 121' is the same in the pixels 121*a* having the same horizontal position in the imaging element 121' (pixels 121*a* in the same column).

Moreover, the pixel 121*a*-3 immediately below the pixel 121*a*-1 has a configuration in which the rectangular opening Z111 is arranged so that its left side is at a distance of the width dx1 from the left side of the pixel 121*a*, and its upper side is at a distance of the height dy2 from the upper side of the pixel 121*a*, and the range other than the rectangular opening Z111 is shielded by the light-shielding film 121*b*.

Similarly, in the pixel 121*a* adjacent in the vertical direction, as the arrangement proceeds to the lower side in the figure, the upper side of the rectangular opening Z111 moves to the heights dy1, dy2, . . . dyn from the upper side of the pixel 121*a*. Note that, the dotted line rectangular portion of the lower left part in the range Z102 of FIG. 15 illustrates a state in which the rectangular opening Z111 is arranged so that its left side is at a distance of the width dx1 from the left side of the pixel 121*a*, and its upper side is at a distance of the height dym from the upper side of the pixel 121*a*. Furthermore, each interval between the heights dy1, dy2, . . . dym is a value obtained by dividing the height obtained by subtracting the height of the rectangular opening Z111 from the vertical height of the range Z102 by the number of pixels m in the vertical direction. In other words, the interval of the change in the vertical direction is determined by division by the number of pixels m in the vertical direction.

Furthermore, the vertical position of the rectangular opening Z111 in the pixel 121*a* in the imaging element 121' is the same in the pixels 121*a* having the same vertical position in the imaging element 121' (pixels 121*a* in the same row).

Moreover, the angle of view can be changed by changing the main light-shielding portion Z101 and the rectangular opening Z111 of each pixel 121*a* constituting the imaging element 121' illustrated in FIG. 15 (FIG. 14).

Figure 16:
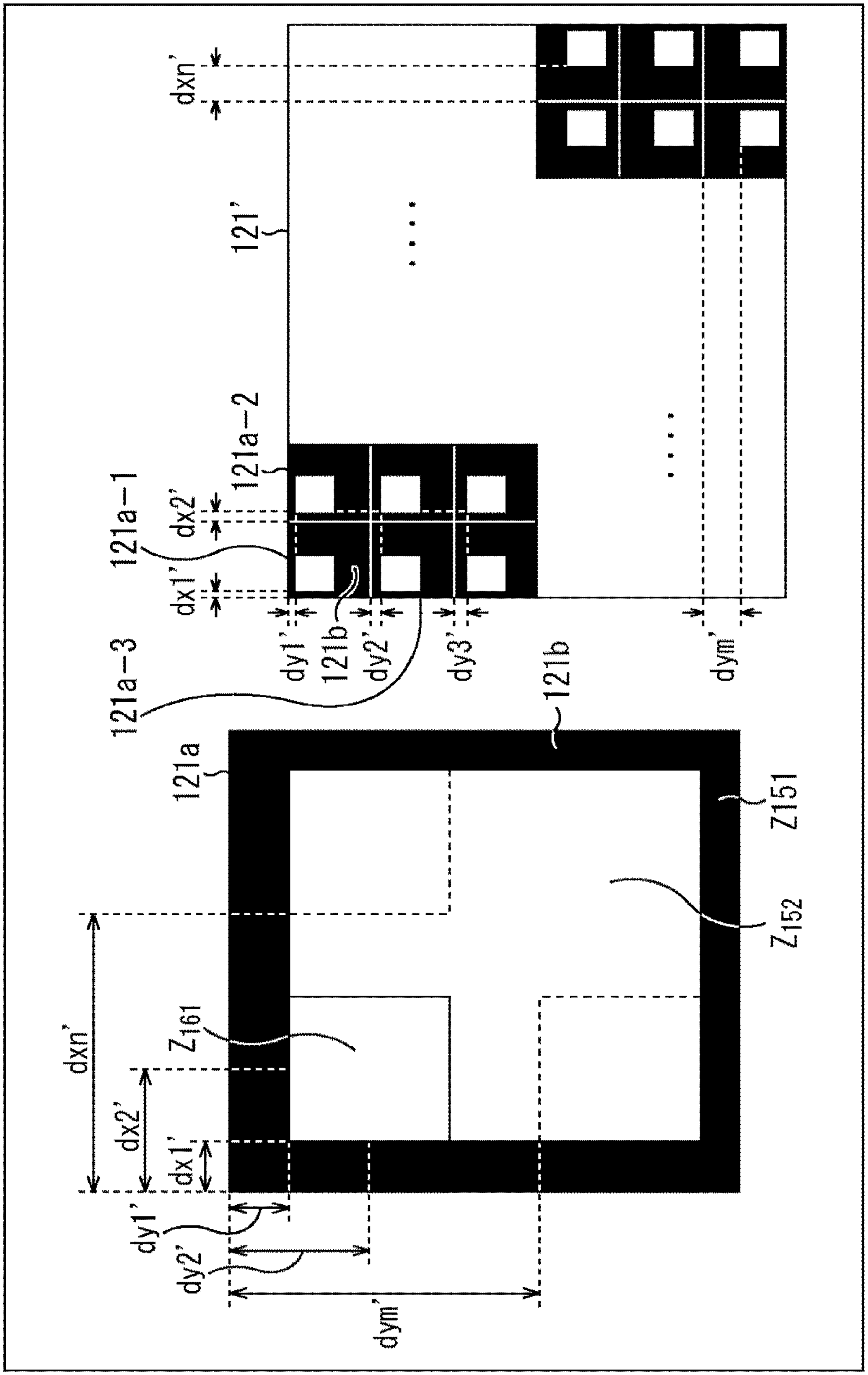
FIG. 16 is a diagram illustrating an example in which an angle of view is changed by applying the modification.

The right part of FIG. 16 illustrates a configuration of the imaging element 121' in a case where the angle of view is wider than the imaging element 121' of FIG. 15 (FIG. 14). Furthermore, the left part of FIG. 16 illustrates a configuration of the pixel 121*a* of the imaging element 121' in the right part of FIG. 16.

In other words, as illustrated in the left part of FIG. 16, for example, in the pixel 121*a*, a main light-shielding portion Z151 (black portion in the left part of FIG. 16) is set having a light-shielding range narrower than that of the main light-shielding portion Z101 in FIG. 15, and a range other than that is set to a range Z152. Moreover, in the range Z152, a rectangular opening Z161 is set having a wider opening area than that of the rectangular opening Z111.

In more detail, as illustrated in the left part of FIG. 16, the pixel is shielded by the light-shielding film 121*b* by the widths dx1' (<dx1) from the ends of the upper side and the lower side of the pixel 121*a* toward the inside of the pixel 121*a*, respectively, and shielded by the light-shielding film 121*b* by the heights dy1' (<dy1) from the ends of the left side and the right side toward the inside of the pixel 121*a*, respectively, whereby the rectangular opening Z161 is formed.

Here, as illustrated in the right part of FIG. 16, the pixel 121*a*-1 at the upper left end has a configuration in which the rectangular opening Z161 is arranged so that its left side is at a distance of the width dx1' from the left side of the pixel 121*a*, and its upper side is at a distance of the height dy1' from the upper side of the pixel 121*a*, and a range other than the rectangular opening Z161 is shielded by the light-shielding film 121*b*.

Similarly, the pixel 121*a*-2 on the right side of the pixel 121*a*-1 has a configuration in which the rectangular opening Z161 is arranged so that its left side is at a distance of the width dx2' from the left side of the pixel 121*a*, and its upper side is at a distance of the height dy1' from the upper side of the pixel 121*a*, and the range other than the rectangular opening Z161 is shielded by the light-shielding film 121*b*.

Similarly, in the pixel 121*a* adjacent in the horizontal direction, as the arrangement proceeds to the right side in the figure, the right side of the rectangular opening Z161 moves to the widths dx1', dx2' . . . dxn' from the right side of the pixel 121*a*. Here, each interval between the widths dx1', dx2' . . . dxn' is a value obtained by dividing the width obtained by subtracting the horizontal width of the rectangular opening Z161 from the horizontal width of the range Z152 by the number of pixels n in the horizontal direction. In other words, the interval of the change in the vertical direction is determined by division by the number of pixels n in the horizontal direction. Thus, the interval of the change between the widths dx1', dx2' . . . dxn' is greater than the interval of the change between the widths dx1, dx2 . . . dxn.

Furthermore, the horizontal position of the rectangular opening Z161 in the pixel 121*a* in the imaging element 121' of FIG. 16 is the same in the pixels 121*a* having the same horizontal position in the imaging element 121' (pixels 121*a* in the same column).

Moreover, the pixel 121*a*-3 immediately below the pixel 121*a*-1 has a configuration in which the rectangular opening Z161 is arranged so that its left side is at a distance of the width dx1' from the left side of the pixel 121*a*, and its upper side is at the height dy2' from the upper side of the pixel 121*a*, and the range other than the rectangular opening Z161 is shielded by the light-shielding film 121*b*.

Similarly, in the pixel 121*a* adjacent in the vertical direction, as the arrangement proceeds to the lower side in the figure, the upper side of the rectangular opening Z161 changes to the heights dy1', dy2' . . . dym' from the upper side of the pixel 121*a*. Here, the interval of the change between the heights dy1', dy2' . . . dym' is a value obtained by dividing the height obtained by subtracting the height of the rectangular opening Z161 from the vertical height of the range Z152 by the number of pixels m in the vertical direction. In other words, the interval of the change in the vertical direction is determined by division by the number of pixels m in the vertical direction. Thus, the interval of the change between the heights dy1', dy2' . . . dym' is greater than the interval of the change between the width heights dy1, dy2 . . . dym.

Furthermore, the vertical position of the rectangular opening Z161 in the pixel 121*a* in the imaging element 121' of FIG. 16 is the same in the pixels 121*a* having the same vertical position in the imaging element 121' (pixels 121*a* in the same row).

As described above, by changing the combination of the light-shielding range of the main light-shielding portion and the opening range of the opening, it becomes possible to realize the imaging element 121' including the pixels 121*a* having various angles of view (having various incident angle directivities).

Moreover, the imaging element 121 may be realized by combining not only the pixels 121*a* having the same angle of view but also the pixels 121*a* having various angles of view.

Figure 17:
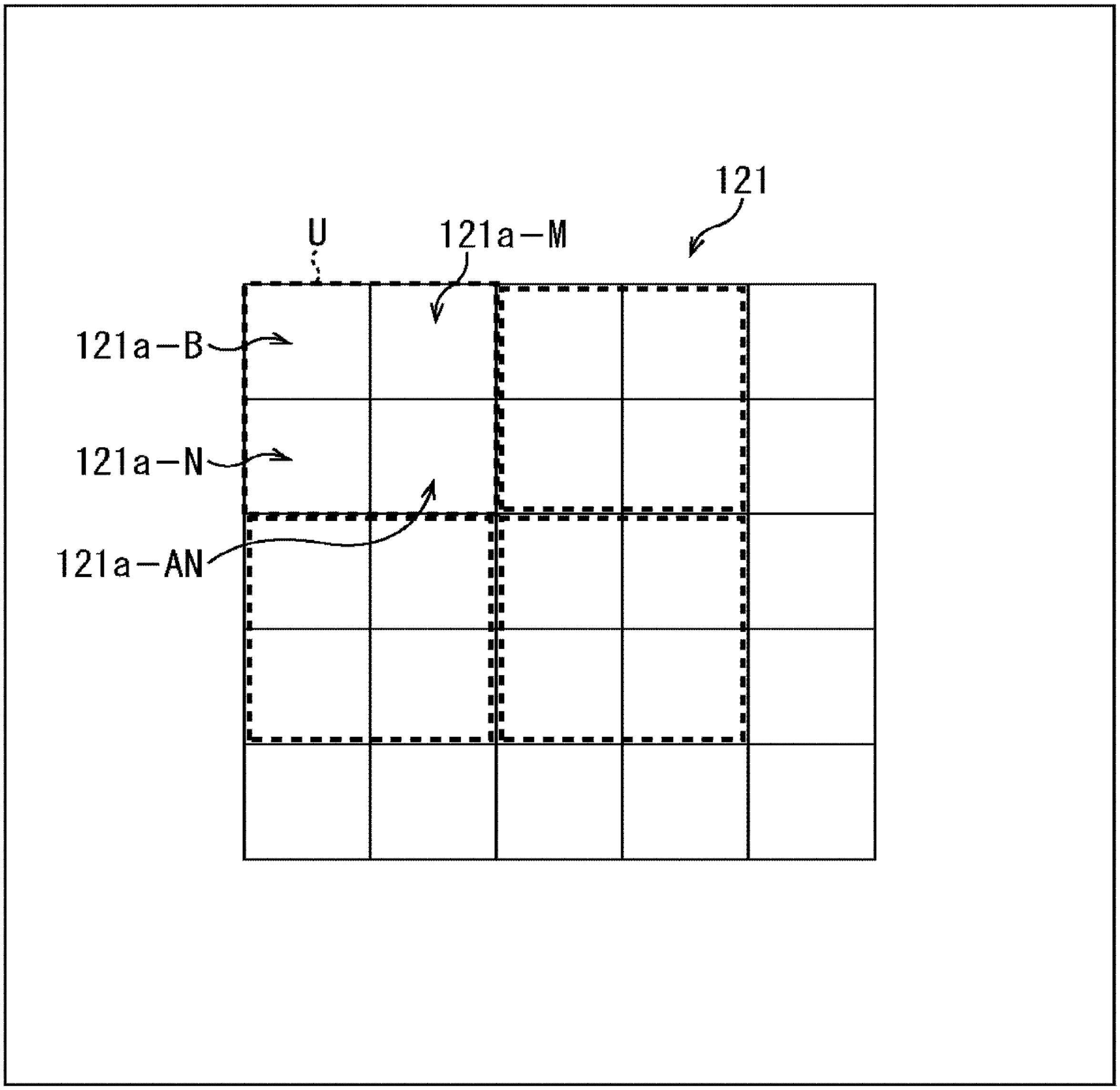
FIG. 17 is a diagram illustrating an example of combining pixels having a respective plurality of angles of view when the angle of view is changed by applying the modification.

For example, as illustrated in FIG. 17, four pixels including two pixels×two pixels indicated by a dotted line are defined as one unit U, in which each unit U includes a pixel 121*a*-W having a wide angle of view, a pixel 121*a*-M having a medium angle of view, a pixel 121*a*-N having a narrow angle of view, and a pixel 121*a*-AN having an extremely narrow angle of view.

In this case, for example, in a case where the number of pixels of all the pixels 121*a* is X, it becomes possible to restore a restored image by using detection images of X/4 pixels for each of the four types of angles of view. At this time, four types of different coefficient sets are used for respective angles of view, and restored images having different angles of view are restored by four types of different simultaneous equations.

For this reason, by restoring a restored image having an angle of view to be restored using a detection image obtained from a pixel suitable for imaging the angle of view to be restored, it becomes possible to restore an appropriate restored image corresponding to each of the four types of angles of view.

Furthermore, an image having an intermediate angle of view between the four types of angles of view, or an angle of view around the intermediate angle of view may be generated by interpolation from images having the four types of angles of view, and pseudo optical zoom may be realized by seamlessly generating images having various angles of view.

Although the light-shielding film has been described above, the description of this example can also be applied to a case where incident angle directivity is given by selectively using a plurality of photodiodes arranged in a pixel. That is, for example, by appropriately setting the division position (size and shape of each partial region), and the position, size, shape, and the like of each photodiode, or appropriately selecting the photodiode, an incident light directivity can be realized equivalent to the incident light directivity by the above-described light-shielding film 121*b* including the rectangular opening. Of course, also in this case, the imaging element 121 can be realized by combining the pixels 121*a* having various angles of view. Furthermore, an image having an intermediate angle of view, or an angle of view around the intermediate angle of view may be generated by interpolation from images having a plurality of types of angles of view, and pseudo optical zoom may be realized by seamlessly generating images having various angles of view.

<Third Modification>

By the way, in a case where randomness is given to a range shielded by the light-shielding film 121*b* of the pixel 121*a* in the imaging element 121, as the randomness of the difference in the range shielded by the light-shielding film 121*b* increases, the processing load by the restoration unit 124 and the like increases. Thus, the processing load may be reduced by reducing the randomness of the difference by making a part of the difference in the range shielded by the light-shielding film 121*b* of the pixel 121*a* have regularity.

For example, an L-shaped type light-shielding film 121*b* obtained by combining a vertical band type and a horizontal band type is configured, and the horizontal band type light-shielding films 121*b* having the same width are combined for a predetermined column direction, and the vertical band type light-shielding films 121*b* having the same height are combined for a predetermined row direction. In this way, the light-shielding range of the light-shielding film 121*b* of each pixel 121*a* is set to a different value randomly in the pixel unit while having regularity in the column direction and the row direction. As a result, it is possible to reduce the difference in the light-shielding range of the light-shielding film 121*b* of each pixel 121*a*, in other words, the randomness of the difference in the incident angle directivity of each pixel, and it is possible to reduce the processing load outside the imaging element 121 such as the restoration unit 124.

Figure 18:
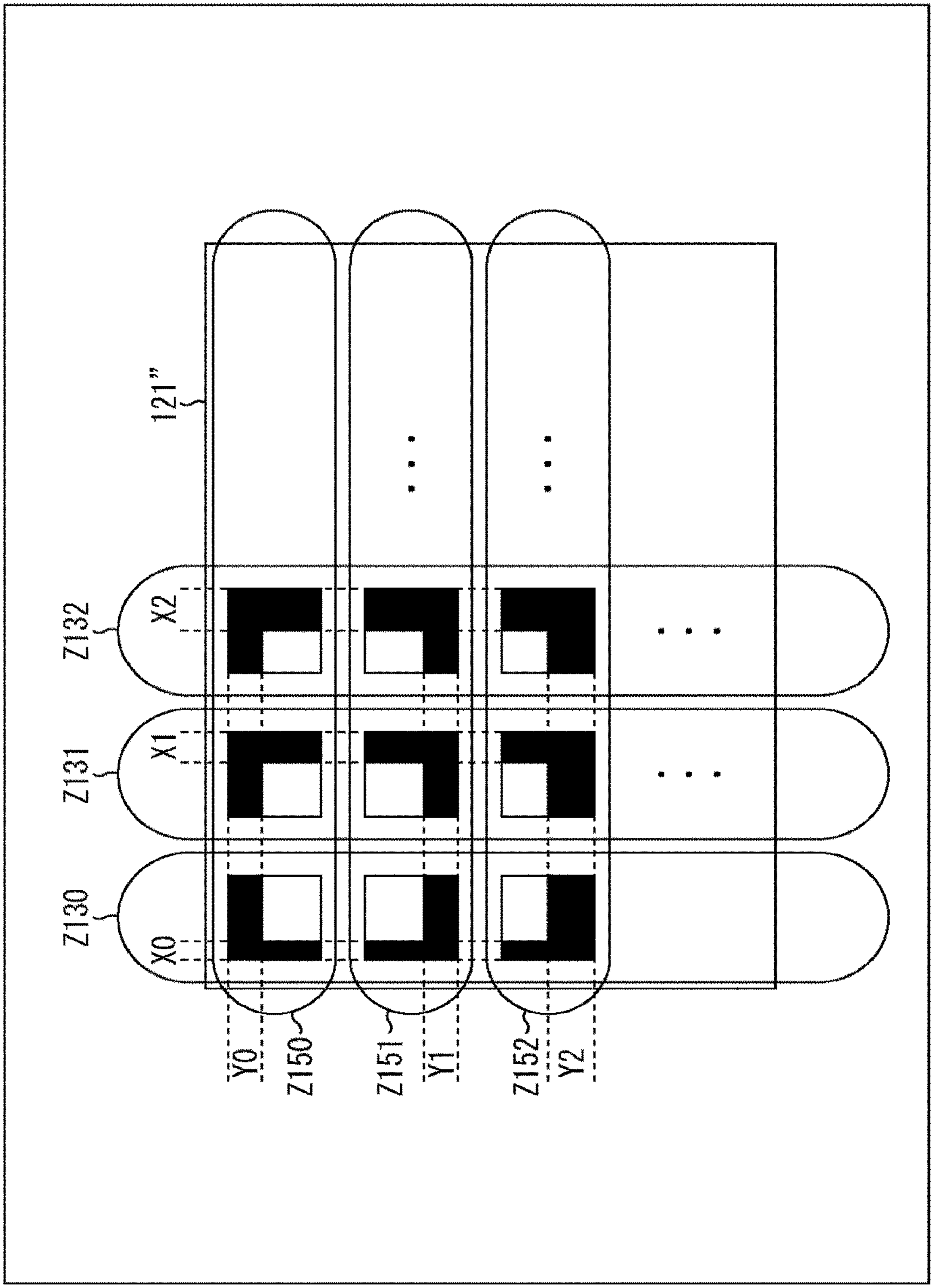
FIG. 18 is a diagram illustrating a modification.

For example, in the case of an imaging element 121" of FIG. 18, the horizontal band type light-shielding film 121*b* having the same width X0 is used for the pixels in the same column indicated by a range Z130, and the vertical band type light-shielding film 121*b* having the same height Y0 is used for the pixels in the same row indicated by a range Z150, and the L-shaped type light-shielding film 121*b* in which these are combined is set for the pixels 121*a* specified by each row and each column.

Similarly, the horizontal band type light-shielding film 121*b* having the same width X1 is used for the pixels in the same column indicated by a range Z131 adjacent to the range Z130, and the vertical band type light-shielding film 121*b* having the same height Y1 is used for the pixels in the same row indicated by a range Z151 adjacent to the range Z150, and the L-shaped type light-shielding film 121*b* in which these are combined is set for the pixels 121*a* specified by each row and each column.

Moreover, the horizontal band type light-shielding film having the same width X2 is used for the pixels in the same column indicated by a range Z132 adjacent to the range Z131, and the vertical band type light-shielding film having the same height Y2 is used for the pixels in the same row indicated by a range Z152 adjacent to the range Z151, and the L-shaped type light-shielding film 121*b* in which these are combined is set for the pixels 121*a* specified by each row and each column.

In this way, it is possible to set the range of the light-shielding film to a different value in the pixel unit while giving regularity in the horizontal width and position and the vertical height and position of the light-shielding film 121*b*, so that it is possible to suppress the randomness of the difference in the incident angle directivity. As a result, it becomes possible to reduce patterns of the coefficient set, and it becomes possible to reduce the processing load of calculation processing in the subsequent stage (for example, the restoration unit 124 and the like).

<Fourth Modification>

Variations in the shape of the light-shielding film 121*b* in pixel units are arbitrary, and are not limited to the above examples. For example, different incident angle directivity may be given (set) by setting the light-shielding film 121*b* as a triangle and making the range different, or different incident angle directivity may be given by setting the light-shielding film 121*b* as a circle and making the range different. Furthermore, for example, a light-shielding film or the like having a linear shape in an oblique direction may be used.

Furthermore, a variation (pattern) of the light-shielding film 121*b* may be set by a plurality of pixel units constituting a unit including a predetermined number of multiple pixels. This one unit may include any pixel. For example, the imaging element 121 may include a color filter, and the unit may include a pixel constituting a unit of color arrangement of the color filter. Furthermore, a pixel group in which pixels having different exposure times are combined may be used as a unit. Note that, it is desirable that the randomness of the pattern in the range shielded by the light-shielding film 121*b* in each pixel constituting the unit is high, in other words, the pixels constituting the unit respectively have different incident angle directivities.

Furthermore, the arrangement pattern of the light-shielding film 121*b* may be set between the units. For example, the width and position of the light-shielding film may be changed for each unit. Moreover, a pattern in a range shielded by the light-shielding film 121*b* may be set within a unit including a plurality of pixels classified in different categories or between units.

Although the light-shielding film has been described above, the description of this example can also be applied to a case where incident angle directivity is given by selectively using a plurality of photodiodes arranged in a pixel. That is, for example, by appropriately setting the division position (size and shape of each partial region), and the position, size, shape, and the like of each photodiode, or appropriately selecting the photodiode, an incident light directivity can be realized equivalent to the incident light directivity in a case where a part of the change in the range shielded by the light-shielding film 121*b* of the pixel 121*a* described above is made to have regularity. In this way, it is possible to reduce the randomness of the difference in the incident angle directivity of each pixel, and reduce the processing load outside the imaging element 121 such as the restoration unit 122.

Although the light-shielding film has been described above, the description of this example can also be applied to a case where incident angle directivity is given by selectively using a plurality of photodiodes arranged in a pixel. That is, by appropriately setting the division position (size and shape of each partial region), the position, size, shape, and the like of each photodiode, or appropriately selecting the photodiode, an incident light directivity can be realized equivalent to the incident light directivity by a light-shielding film having an arbitrary shape, for example, a triangle, a circle, a linear shape in an oblique direction, or the like.

Furthermore, for example, setting of the division position (size and shape of each partial region), setting of the position, size, shape, and the like of each photodiode, selection of the photodiode, and the like may be set for each unit similarly to the case of the light-shielding film 121*b* described above.

<Control of Photodiode>

In a case where a plurality of photodiodes arranged in a pixel as described above with reference to FIG. 5 is selectively used, the incident angle directivity of the output pixel value of the pixel output unit may be made to be variously changed by switching the presence/absence and degree of contribution to the output pixel value of each pixel output unit of the plurality of photodiodes 121*f*.

Figure 19:
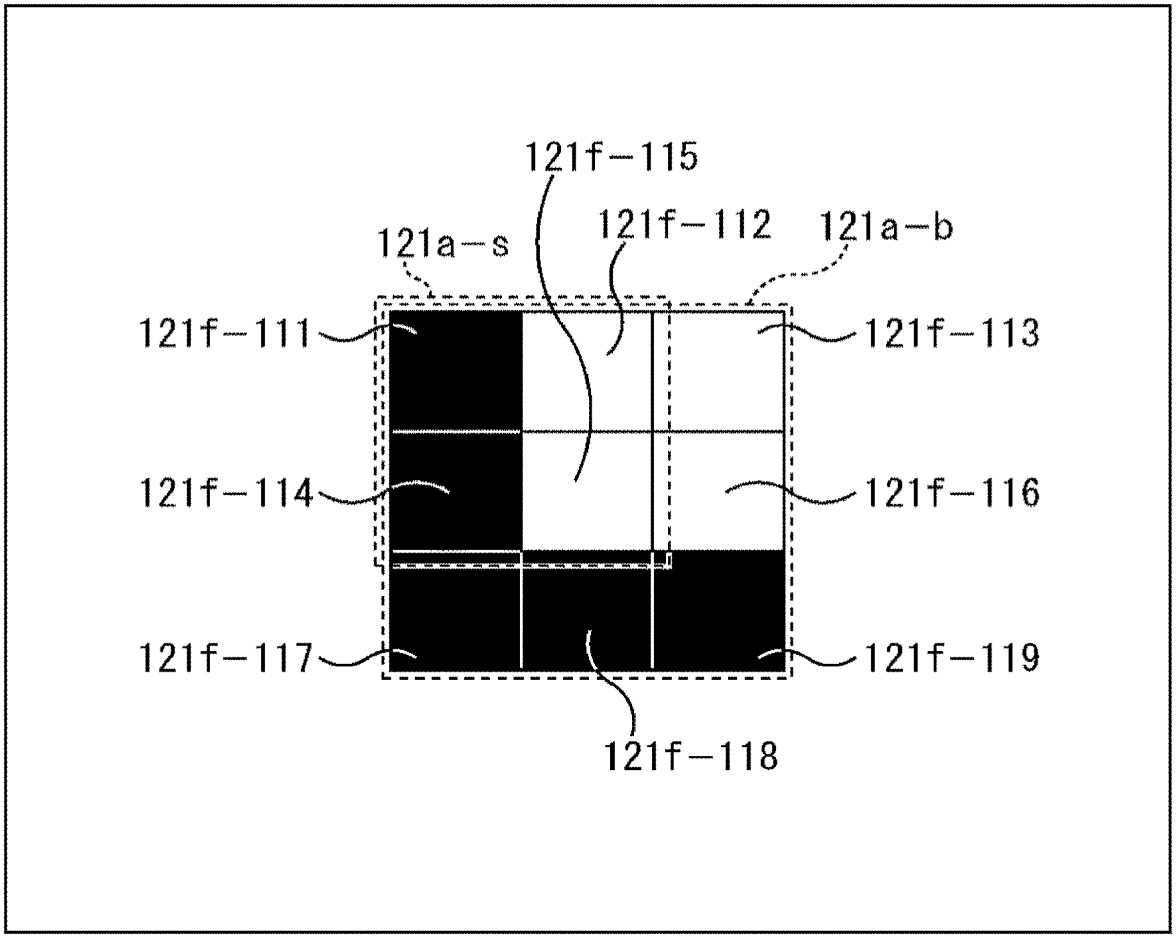
FIG. 19 is a diagram illustrating a modification.

For example, as illustrated in FIG. 19, it is assumed that nine (vertical three×horizontal three) photodiodes 121*f* of photodiodes 121*f*-111 to 121*f*-119 are arranged in the pixel 121*a*. In this case, the pixel 121*a* may be used as a pixel 121*a-b* including the photodiodes 121*f*-111 to 121*f*-119, or may be used as a pixel 121*a-s* including the photodiodes 121*f*-111, 121*f*-112, 121*f*-114, and 121*f*-115.

For example, in a case where the pixel 121*a* is the pixel 121*a-b*, the incident angle directivity of the output pixel value is controlled by controlling the presence/absence and degree of contribution to the output pixel value of the pixel 121*a* of the photodiodes 121*f*-111 to 121*f*-119. On the other hand, in a case where the pixel 121*a* is the pixel 121*a-s*, the incident angle directivity of the output pixel value is controlled by controlling the presence/absence and degree of contribution to the output pixel value of the pixel 121*a* of the photodiodes 121*f*-111, 121*f*-112, 121*f*-114, and 121*f*-115. In this case, the other photodiodes 121*f* (photodiodes 121*f*-113, 121*f*-116, 121*f*-117 to 121*f*-119) are caused not to contribute to the output pixel value.

That is, for example, in a case where the incident angle directivities of the output pixel values are different from each other between a plurality of the pixels 121*a-b*, the presence/absence and degree of contribution to the output pixel value of at least one of the photodiodes 121*f*-111 to 121*f*-119 is different. On the other hand, for example, in a case where the incident angle directivities of the output pixel values are different from each other between a plurality of the pixels 121*a-s*, the presence/absence and degree of contribution to the output pixel value of at least one of the photodiode 121*f*-111, 121*f*-112, 121*f*-114, or 121*f*-115 is different, and the other photodiodes 121*f*-113, 121*f*-116, and 121*f*-117 to 121*f*-119 do not contribute to the output pixel value commonly between these pixels.

Note that, whether the pixel 121*a* is the pixel 121*a-b* or the pixel 121*a-s* can be set for each pixel. Furthermore, this setting may be made to be performed for each unit (a plurality of pixels).

Figure 20:
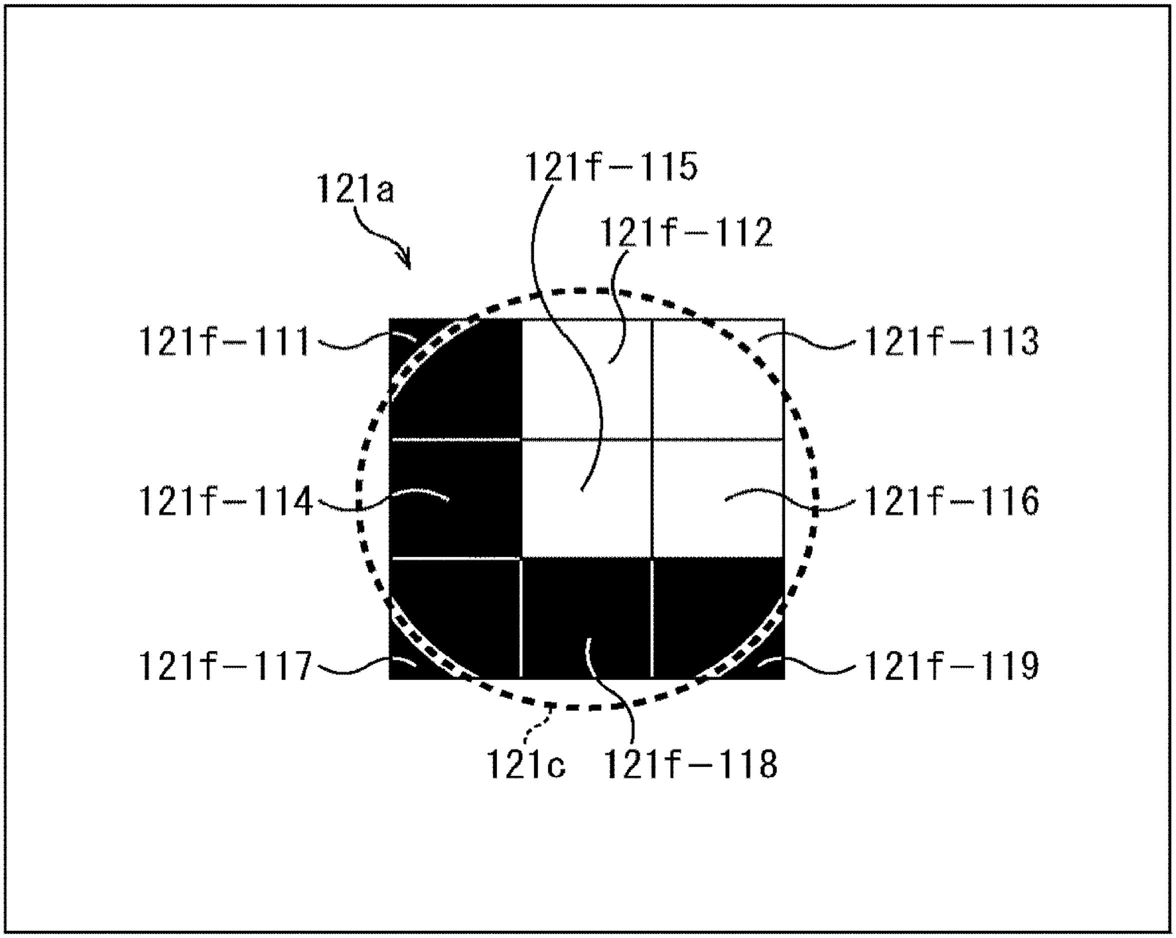
FIG. 20 is a diagram illustrating a modification.

Furthermore, as described above, one on-chip lens is formed in each pixel (each pixel output unit) of the imaging element 121. That is, in a case where the pixel 121*a* is configured as in the example illustrated in FIG. 19, one on-chip lens 121*c* is provided for the photodiodes 121*f*-111 to 121*f*-119, as illustrated in FIG. 20. Thus, as described with reference to FIG. 19, in the case where the pixel 121*a* is the pixel 121*a-b*, and also in the case where the pixel 121*a* is the pixel 121*a-s*, one pixel (one pixel output unit) and one on-chip lens 121*c* correspond to each other one to one.

<Resolution Control of Detection Image>

The imaging element 121 has been described above. In the imaging apparatus 100 of FIG. 1, the imaging element 121 as described above is used. As described above, the imaging element 121 has incident angle directivity for each pixel (pixel output unit). For example, as illustrated in FIG. 21, the incident angle directivity is formed by shielding a part of the pixel 121*a* (pixel output unit) by the light-shielding film 121*b*.

In the conventional imaging element, it has not been possible to control the resolution of the detection image. That is, the detection signals of all the pixels (pixel output units) of the imaging element have been read, and the detection image has been generated by using all the read detection signals. Then, it has not been disclosed how the detection image is processed to convert the resolution. Patent Document 1 neither describes nor suggests such a fact.

Thus, for example, to reduce the resolution of the captured image, the resolution had to be reduced after the conversion of the detection image into the captured image. That is, even in the case of reducing the resolution, reading of the detection image from the imaging element 121 and conversion from the detection image to the captured image (image processing) had to be performed in a high-resolution state. There has, therefore, been a possibility that the load increases unnecessarily, and power consumption may increase unnecessarily.

Figure 21:
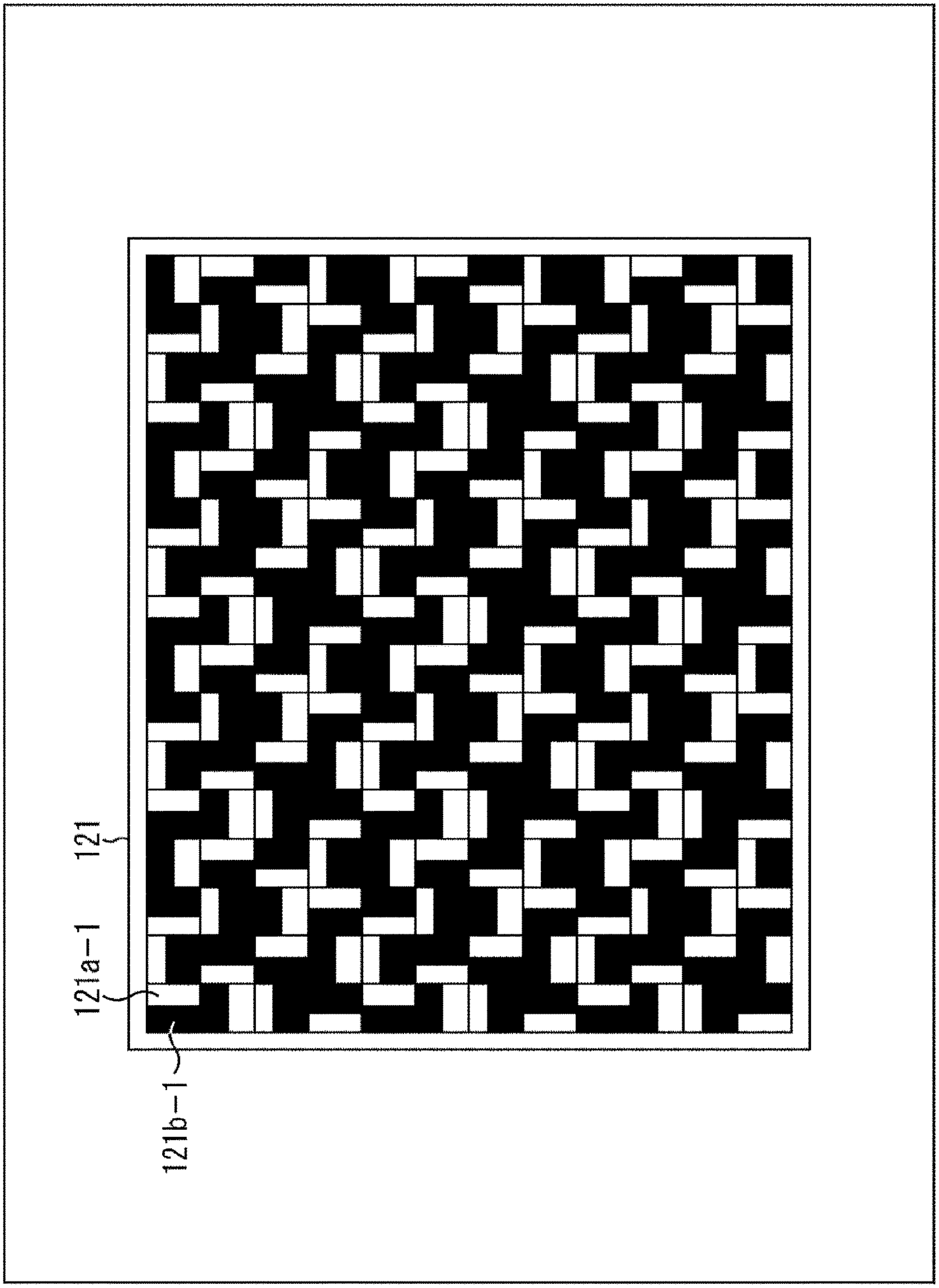
FIG. 21 is a diagram illustrating an example of a mask pattern by a light-shielding film.

On the other hand, in the imaging apparatus 100, the imaging element 121 has an incident angle directivity for each pixel (pixel output unit) as illustrated in FIG. 21, so that the detection signal can be selected for each pixel (pixel output unit). The read control unit 122 controls such reading of the detection image from the imaging element 121, and selects a detection signal to be included in the detection image among detection signals that are detection results of the incident light obtained in respective pixel output units of the imaging element 121, so that the resolution of the detection image can be controlled. Thus, for example, the resolution of the detection image can be reduced more than the resolution of the imaging element 121. That is, an increase in unnecessary power consumption can be suppressed.

<All-Pixel Mode>

Figure 22:
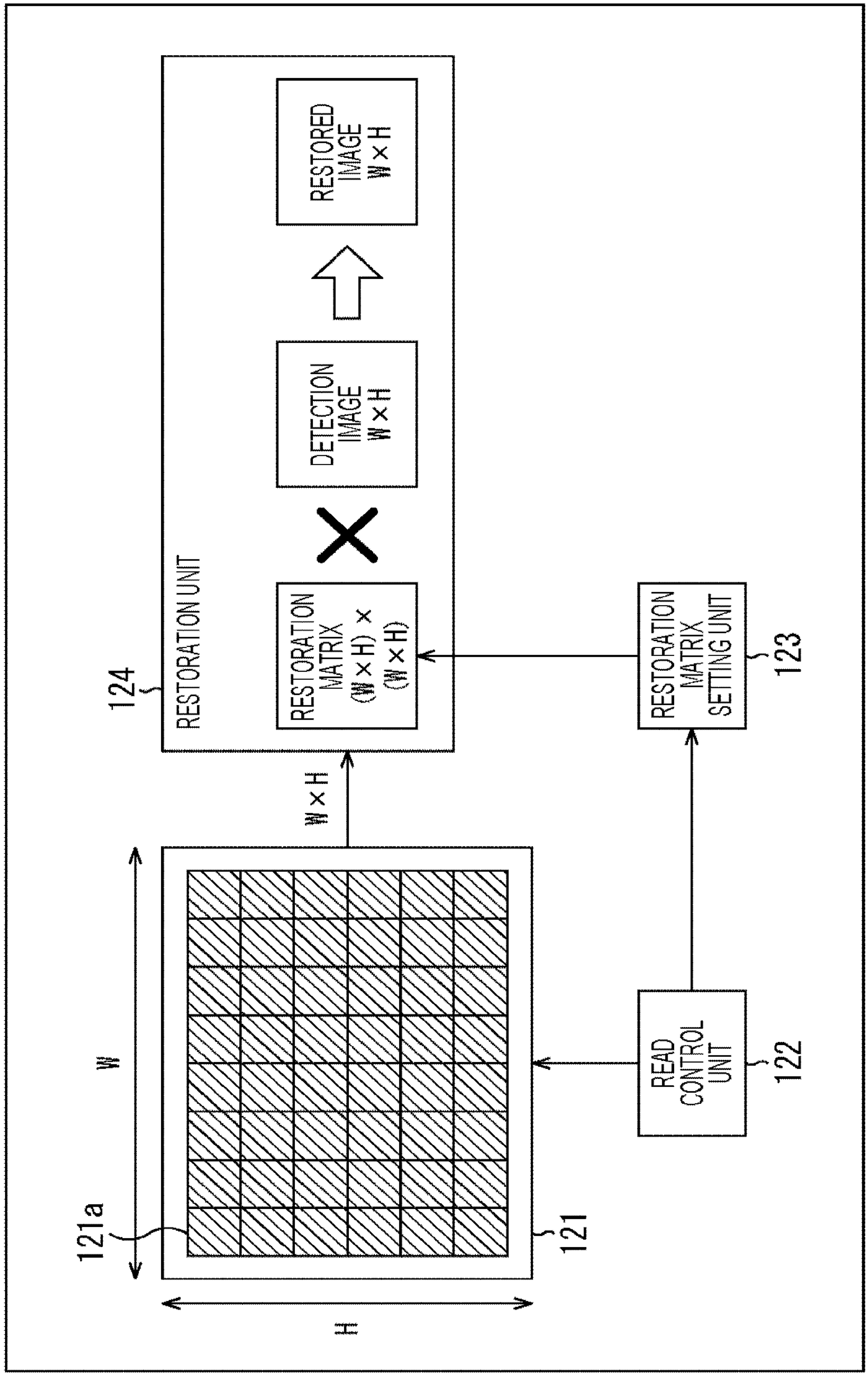
FIG. 22 is a diagram for explaining an outline of a method of reading from all pixels.

Next, control by the read control unit 122 will be described. As illustrated in FIG. 22, the imaging apparatus 100 can read detection signals of all the pixels of the imaging element 121, use all the detection signals as a detection image, and convert the detection image into a restored image. Such an operation mode is referred to as an all-pixel mode.

In FIG. 22, each quadrangle in the imaging element 121 indicates a pixel 121*a* (pixel unit output), and the state of the pixel array is illustrated in the imaging element 121 as a schematic diagram. Note that, in FIG. 22, a pixel array is illustrated of eight pixels in the horizontal direction and six pixels in the vertical direction, but the number of pixels of the imaging element 121 is arbitrary. In this specification, it is assumed that the imaging element 121 includes a pixel array of W pixels in the horizontal direction and H pixels in the vertical direction.

In the case of the all-pixel mode, the read control unit 122 supplies a read control signal to the imaging element 121, and causes the detection signals to be read from all the pixels of the imaging element 121. That is, a detection image with a resolution (W×H) is read from the imaging element 121. In FIG. 22, the diagonal line pattern of the pixel 121*a* indicates the pixel 121*a* from which the detection signal is read. That is, in the case of the all-pixel mode, the detection signals are read from all the pixels in the pixel array of the imaging element 121.

Furthermore, the read control unit 122 also supplies the read control signal to the restoration matrix setting unit 123. When a restored image with the resolution (W×H) is to be generated, the restoration matrix setting unit 123 sets a restoration matrix including vertical (W×H)×horizontal (W×H) coefficients corresponding to the detection image with the resolution (W×H) and the restored image with the resolution (W×H) in accordance with the read control signal.

In a case where the restored image is generated in the restoration unit 124, the restoration unit 124 acquires the detection image with the resolution (W×H) read from the imaging element 121, acquires the restoration matrix including the vertical (W×H)×horizontal (W×H) coefficients set in the restoration matrix setting unit 123, and uses them to generate the restored image with the resolution (W×H).

This detection image is obtained by the imaging element 121 and is information having features described above with reference to FIGS. 1 to 20. That is, the detection image is a detection image including detection signals obtained in the respective pixel output units, the detection signals being obtained by imaging a subject by an imaging element including a plurality of pixel output units that receives incident light entering without passing through either an imaging lens or a pinhole, and each outputs one detection signal indicating an output pixel value modulated by an incident angle of the incident light.

Then, also the restoration matrix is the restoration matrix described above with reference to FIGS. 1 to 20, and has the features described above. That is, this restoration matrix is a matrix including coefficients used when the restored image is restored from the detection image. The restoration unit 124 restores a restored image from the detection image by using such a restoration matrix.

<Pixel Arbitrary Thinning Mode>

Figure 23:
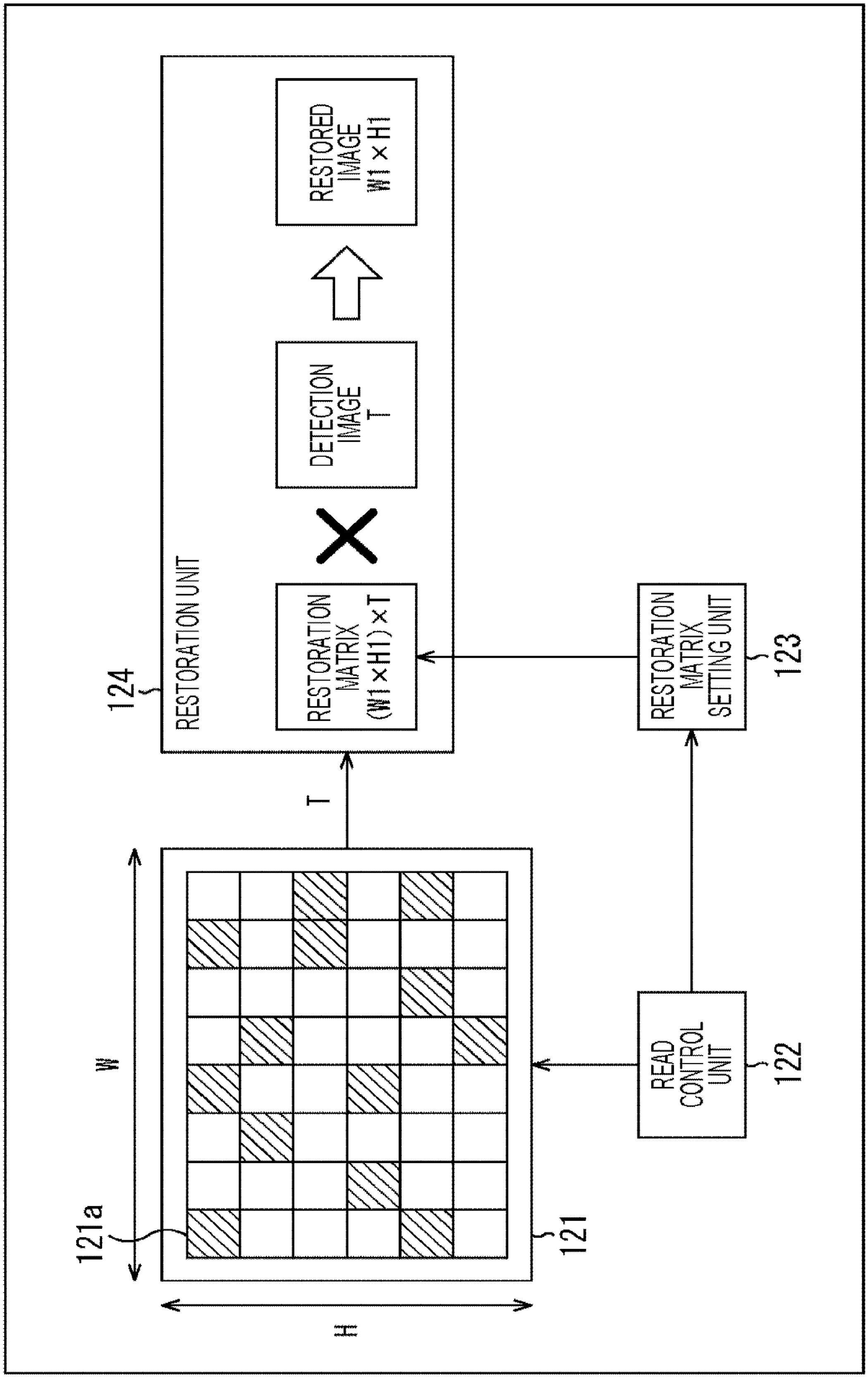
FIG. 23 is a diagram for explaining an outline of a method of reading from some arbitrary pixels.

Furthermore, as illustrated in FIG. 23, the imaging apparatus 100 can read detection signals of some arbitrary pixels of the imaging element 121, use the read detection signals of some arbitrary pixels as a detection image, and convert the detection image into a restored image. Such an operation mode is referred to as a pixel arbitrary thinning mode.

Also in FIG. 23, the pixel array in the imaging element 121 is illustrated similarly to the case of FIG. 22.

In the case of the pixel arbitrary thinning mode, the read control unit 122 supplies a read control signal to the imaging element 121, selects some of the pixels 121*a* (pixel output units) at arbitrary positions from the pixel array (plurality of pixel output units) of the imaging element 121, and causes the detection signals to be read from the selected pixels 121*a* (pixels with diagonal line pattern in the figure). The read control unit 122 can select an arbitrary number of pixels. For example, T pixels can be selected. That is, a detection image including T detection signals is read from the imaging element 121.

Note that, the read control unit 122 may supply a read control signal to the imaging element 121, cause the detection signals to be read from all the pixels 121*a* of the pixel array of the imaging element 121, and select detection signals read from some arbitrary pixels among the read detection signals, as detection signals to be included in a detection image.

Of course, the pixel 121*a* selected in FIG. 23 is an example, and the selected pixel 121*a* is not limited to this example. Which pixel (the detection signal thereof) is selected (from which pixel the detection signal is read, or from which pixel the read detection signal is selected) may be determined in advance. Furthermore, a plurality of candidates for setting which pixel is selected (pixel selection setting) may be prepared in advance, and the read control unit 122 may perform selection from the plurality of candidates. In that case, the read control unit 122 may perform the selection on the basis of an arbitrary condition, for example, an imaging operation mode, frame rate, resolution setting, subject distance, brightness, time, position, user instruction, or the like.

Note that, the pixel selection setting candidates may be stored in an arbitrary processing unit or the like of the imaging apparatus 100, such as a memory (not illustrated) in the read control unit 122, or a storage unit 113. In that case, the candidates may be made to be stored at the time of factory shipment of the imaging apparatus 100, or may be made to be stored (or updated) after the factory shipment. Of course, the pixel selection setting candidates may be prepared outside the imaging apparatus 100, and the read control unit 122 may perform selection from the external candidates.

Furthermore, the read control unit 122 may be made to arbitrarily set which pixel (the detection signal thereof) is selected. In that case, for example, an initial value (initial setting) of the pixel selection setting may be prepared, and the read control unit 122 may update the initial setting on the basis of an arbitrary condition (for example, an imaging operation mode, frame rate, resolution setting, subject distance, brightness, time, position, user instruction, or the like). Furthermore, for example, the read control unit 122 may set pixels to be selected, on the basis of arbitrary information, or randomly.

Furthermore, the read control unit 122 supplies the read control signal supplied to the imaging element 121 also to the restoration matrix setting unit 123. When a restored image with a resolution (W1×H1) is to be generated, the restoration matrix setting unit 123 sets a restoration matrix including vertical (W1×H1)×horizontal T coefficients corresponding to the detection image including T detection signals and the restored image with the resolution (W1×H1) in accordance with the read control signal.

In a case where the restored image is generated in the restoration unit 124, the restoration unit 124 acquires the detection image including T detection signals from the imaging element 121 or the read control unit 122, acquires the restoration matrix including the vertical (W1×H1)× horizontal T coefficients set in the restoration matrix setting unit 123, and uses them to generate the restored image with the resolution (W1×H1).

<Pixel Regularity Thinning Mode>

Figure 24:
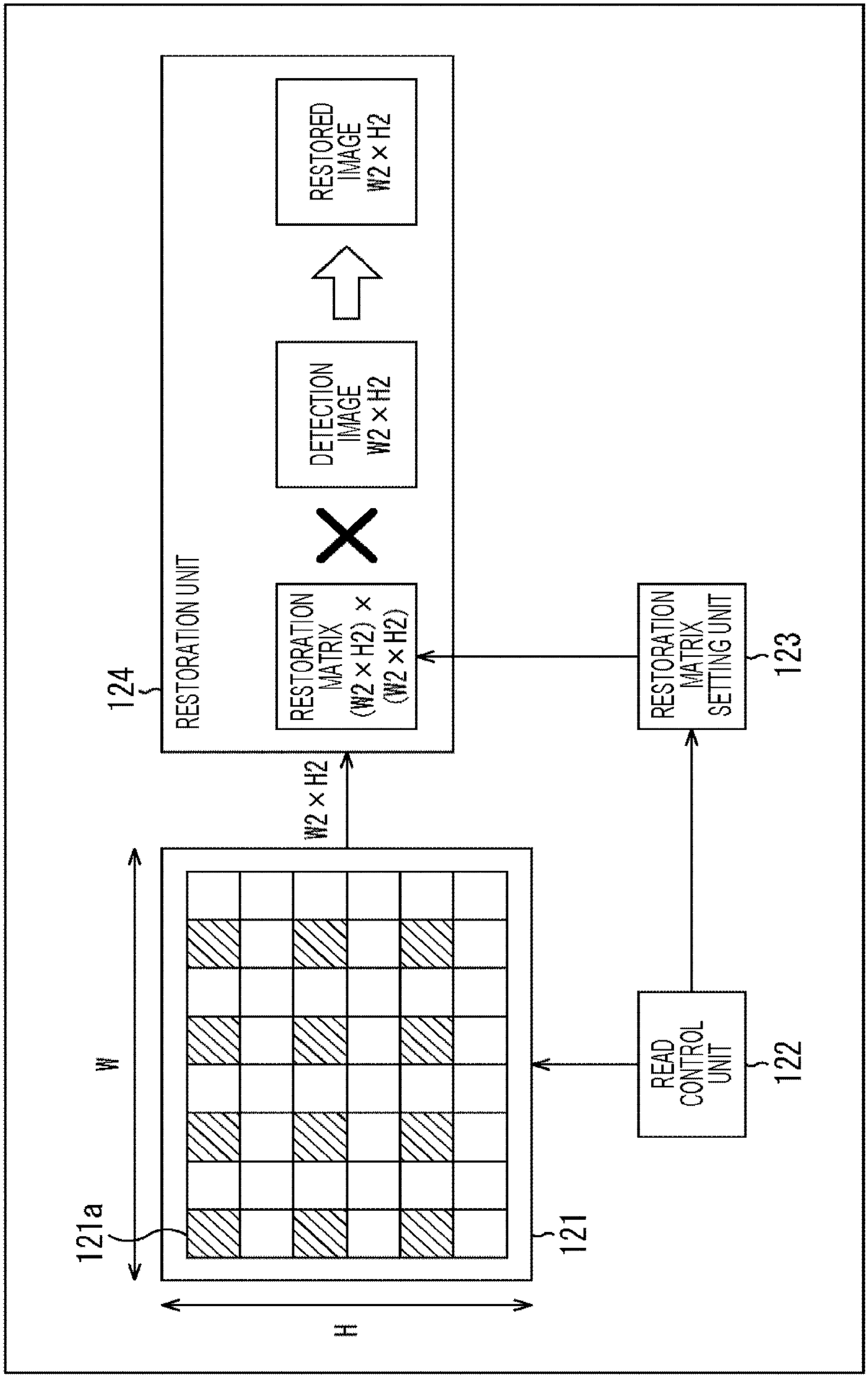
FIG. 24 is a diagram for explaining an outline of a method of regularly reading from some pixels.

Furthermore, as illustrated in FIG. 24, the imaging apparatus 100 can read detection signals of some pixels in a positional relationship having a predetermined regularity of the imaging element 121, use the read detection signals of some pixels in the positional relationship having a predetermined regularity as a detection image, and convert the detection image into a restored image. Such an operation mode is referred to as a pixel regularity thinning mode.

Also in FIG. 24, the pixel array in the imaging element 121 is illustrated similarly to the case of FIG. 22.

In the case of the pixel regularity thinning mode, the read control unit 122 supplies a read control signal to the imaging element 121, selects some of the pixels 121*a* (pixel output units) at positions in the positional relationship having the predetermined regularity from the pixel array (plurality of pixel output units) of the imaging element 121, and causes the detection signals to be read from the selected pixels 121*a* (pixels with diagonal line pattern in the figure). The read control unit 122 can select an arbitrary number of pixels. For example, horizontal W2×vertical H2 pixels can be selected. That is, a detection image with a resolution (W2×H2) is read from the imaging element 121.

Note that, the read control unit 122 may supply a read control signal to the imaging element 121, cause the detection signals to be read from all the pixels 121*a* of the pixel array of the imaging element 121, and select detection signals read from some pixels in the positional relationship having the predetermined regularity among the read detection signals, as detection signals to be included in a detection image.

In FIG. 24, the pixel 121*a* is selected every other pixel, but this selection is an example, and the selected pixel 121*a* is not limited to this example. Similarly to the case of the pixel arbitrary thinning mode, which pixel is selected may be determined in advance, or the read control unit 122 may perform selection from a plurality of candidates, or the read control unit 122 may perform setting arbitrarily.

Furthermore, the read control unit 122 supplies the read control signal supplied to the imaging element 121 also to the restoration matrix setting unit 123. When a restored image with the resolution (W2×H2) is to be generated, the restoration matrix setting unit 123 sets a restoration matrix including vertical (W2×H2)×horizontal (W2×H2) coefficients corresponding to the detection image with the resolution (W2×H2) and the restored image with the resolution (W2×H2) in accordance with the read control signal.

In a case where the restored image is generated in the restoration unit 124, the restoration unit 124 acquires the detection image with the resolution (W2×H2) from the imaging element 121 or the read control unit 122, acquires the restoration matrix including the vertical (W2×H2)× horizontal (W2×H2) coefficients set in the restoration matrix setting unit 123, and uses them to generate the restored image with the resolution (W2×H2).

<Area Drive Mode>

Figure 25:
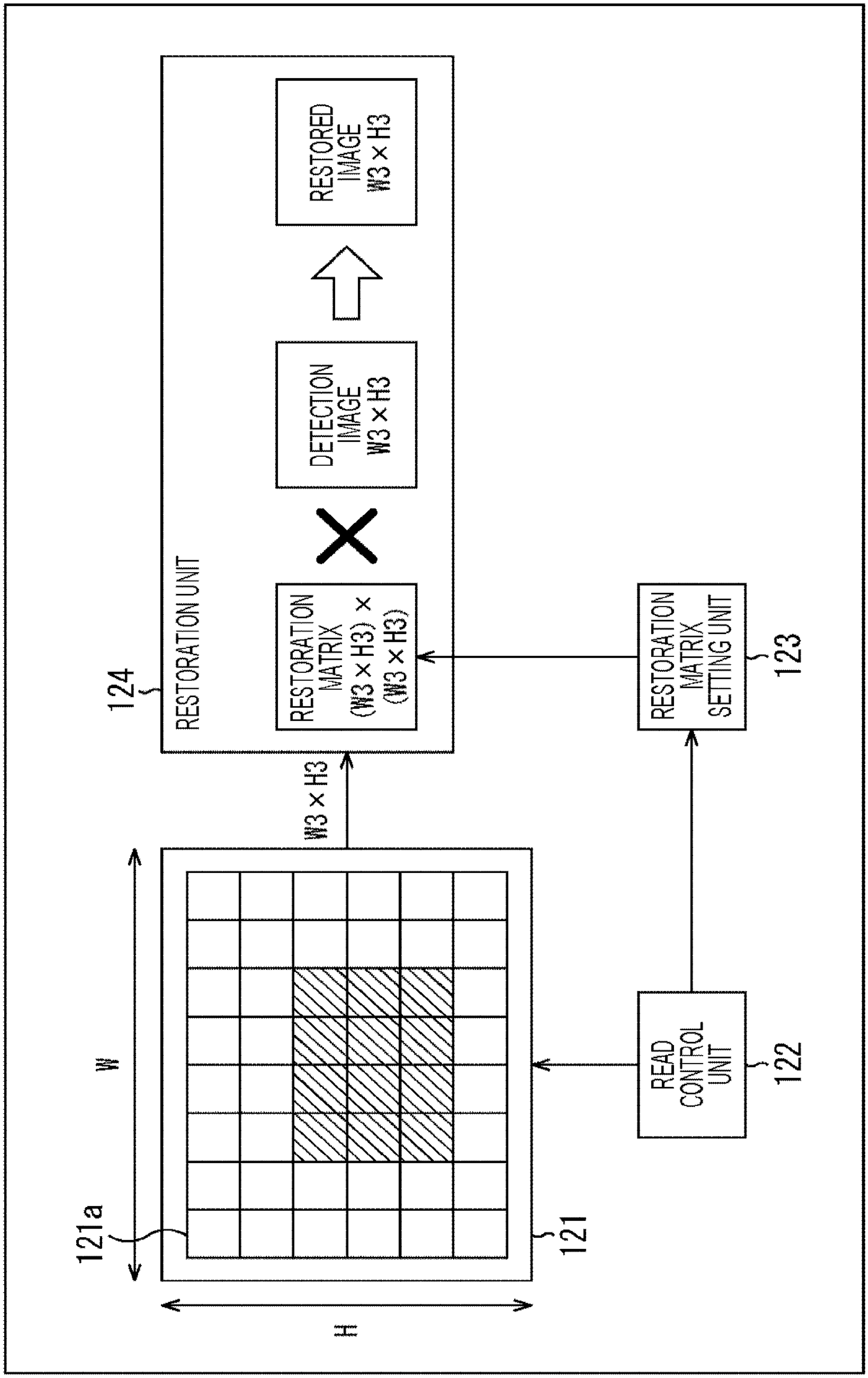
FIG. 25 is a diagram for explaining an outline of a method of reading from pixels in a partial region.

Furthermore, as illustrated in FIG. 25, the imaging apparatus 100 can read detection signals of pixels formed in one partial region of a region (pixel region) in which the pixel array of the imaging element 121 is formed, use the read detection signals of the pixels in the partial region as a detection image, and convert the detection image into a restored image. Such an operation mode is referred to as an area drive mode.

Also in FIG. 25, the pixel array in the imaging element 121 is illustrated similarly to the case of FIG. 22.

In the case of the area drive mode, the read control unit 122 supplies a read control signal to the imaging element 121, selects the pixels 121*a* (pixel output units) formed in one partial region of the pixel region of the imaging element 121, and causes the detection signals to be read from the selected pixels 121*a* (pixels with the diagonal line pattern in the figure). The read control unit 122 can select an arbitrary number of pixels. For example, horizontal W3×vertical H3 pixels can be selected. That is, a detection image with a resolution (W3×H3) is read from the imaging element 121.

Note that, the read control unit 122 may supply a read control signal to the imaging element 121, cause the detection signals to be read from all the pixels 121*a* of the pixel array of the imaging element 121, and select detection signals read from the pixels 121*a* formed in the predetermined partial region of the pixel region among the read detection signals, as detection signals to be included in a detection image.

In FIG. 25, a total of 12 pixels of 4 pixels in the horizontal direction and 3 pixels in the vertical direction are selected, but this selection is an example, and the selected pixel 121*a* is not limited to this example. Similarly to the case of the pixel arbitrary thinning mode, which pixel is selected may be determined in advance, or the read control unit 122 may perform selection from a plurality of candidates, or the read control unit 122 may perform setting arbitrarily.

Furthermore, the read control unit 122 supplies the read control signal supplied to the imaging element 121 also to the restoration matrix setting unit 123. When a restored image of the resolution (W3×H3) is to be generated, the restoration matrix setting unit 123 sets a restoration matrix including vertical (W3×H3)×horizontal (W3×H3) coefficients corresponding to the detection image with the resolution (W3×H3) and the restored image with the resolution (W3×H3) in accordance with the read control signal.

In a case where the restored image is generated in the restoration unit 124, the restoration unit 124 acquires the detection image with the resolution (W3×H3) from the imaging element 121 or the read control unit 122, acquires the restoration matrix including the vertical (W3×H3)× horizontal (W3×H3) coefficients set in the restoration matrix setting unit 123, and uses them to generate the restored image with the resolution (W3×H3).

<Pixel Addition Mode>

Figure 26:
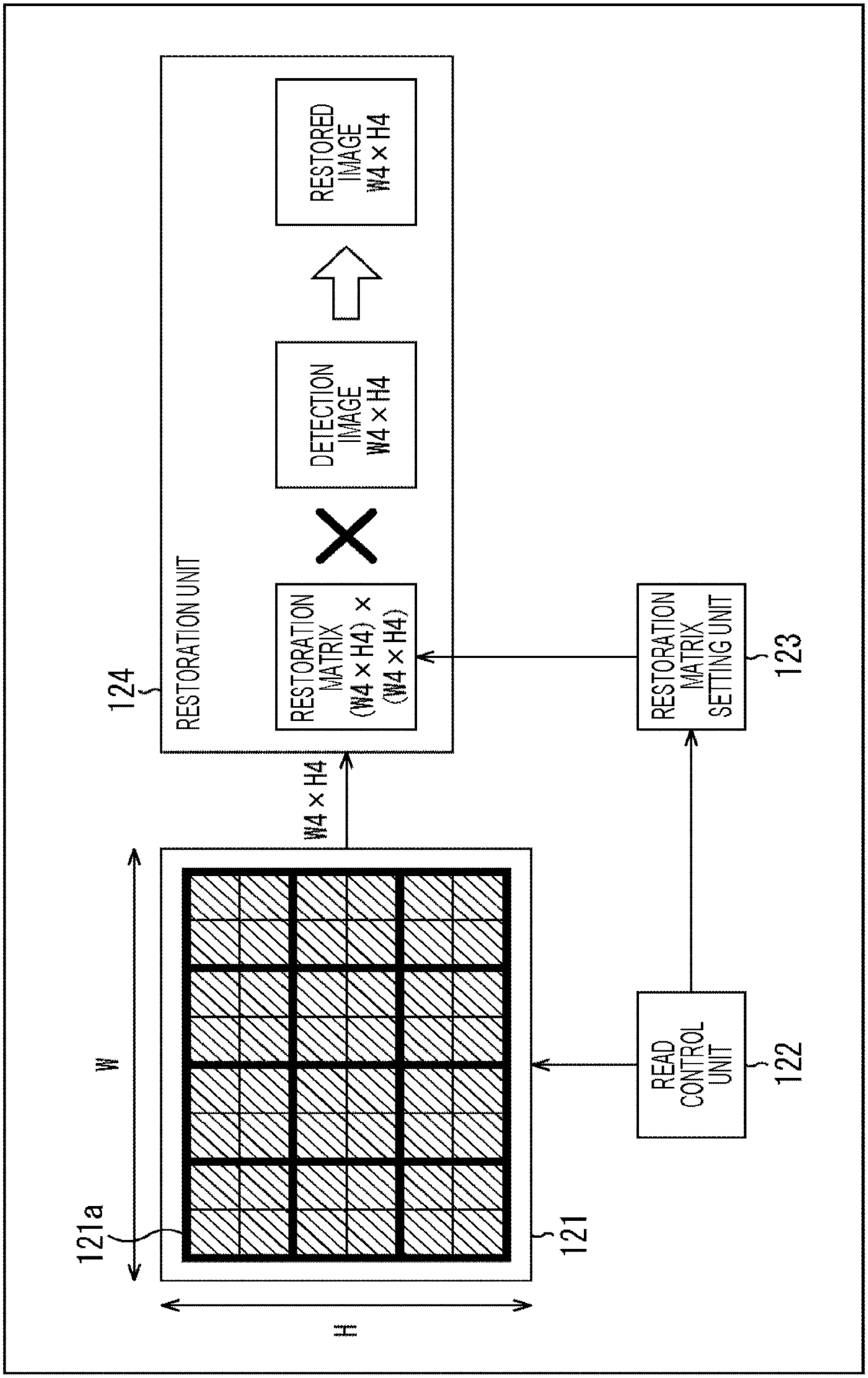
FIG. 26 is a diagram for explaining an outline of a method of performing pixel addition.

Furthermore, as illustrated in FIG. 26, the imaging apparatus 100 can read the detection signals of all the pixels 121*a* of the imaging element 121, and add the read detection signals of respective pixels together for each predetermined number. Such an operation mode is referred to as a pixel addition mode.

Also in FIG. 26, the pixel array in the imaging element 121 is illustrated similarly to the case of FIG. 22.

In the case of the pixel addition mode, the read control unit 122 supplies a read control signal to the imaging element 121, causes the detection signals to be read from all the pixels 121*a* of the pixel array of the imaging element 121, and adds the read detection signals of respective pixels together for each predetermined number. The addition can be performed for each arbitrary number of pixels. That is, the resolution of the detection image after the addition is arbitrary. For example, the read control unit 122 can convert the detection image with the resolution (W×H) read from the imaging element 121 into a detection image with a resolution (W4×H4).

In FIG. 26, detection signals are added together for each two vertical pixels×two horizontal pixels. This is an example, and the method of adding the detection signals together (how many detection signals in what relationship pixels are added together) is arbitrary, and is not limited to this example. The method of adding the detection signals together (pixel addition setting) may be determined in advance. Furthermore, a plurality of pixel addition setting candidates may be prepared in advance, and the read control unit 122 may perform selection from the plurality of candidates. In that case, the read control unit 122 may perform selection on the basis of an arbitrary condition, for example, an imaging operation mode, frame rate, resolution setting, subject distance, brightness, time, position, user instruction, or the like.

Note that, the pixel addition setting candidates may be stored in an arbitrary processing unit or the like of the imaging apparatus 100, such as a memory (not illustrated) in the read control unit 122, or a storage unit 113. In that case, the pixel addition setting candidates may be made to be stored at the time of factory shipment of the imaging apparatus 100, or may be made to be stored (or updated) after the factory shipment. Of course, the pixel addition setting candidates may be prepared outside the imaging apparatus 100, and the read control unit 122 may perform selection from the external candidates.

Furthermore, the read control unit 122 may be made to arbitrarily set the method of adding the detection signals together. In that case, for example, an initial value (initial setting) of the pixel addition setting may be prepared in advance, and the read control unit 122 may update the initial setting on the basis of an arbitrary condition (for example, an imaging operation mode, frame rate, resolution setting, subject distance, brightness, time, position, user instruction, or the like). Furthermore, for example, the read control unit 122 may set which pixels' detection signals are added together, on the basis of arbitrary information, or randomly.

Furthermore, the read control unit 122 also supplies the read control signal to the restoration matrix setting unit 123. When a restored image of the resolution (W4×H4) is to be generated, the restoration matrix setting unit 123 sets a restoration matrix including vertical (W4×H4)×horizontal (W4×H4) coefficients corresponding to the detection image with the resolution (W4×H4) and the restored image with the resolution (W4×H4) in accordance with the read control signal.

In a case where the restored image is generated in the restoration unit 124, the restoration unit 124 acquires the detection image with the resolution (W4×H4) converted by the read control unit 122, acquires the restoration matrix including the vertical (W4×H4))×horizontal (W4×H4) coefficients set in the restoration matrix setting unit 123, and uses them to generate the restored image with the resolution (W4×H4).

<Comparison Between Modes>

An example of comparison between modes is illustrated in a table of FIG. 27. In a case where the operation mode (reading method) is the all-pixel mode, the imaging apparatus 100 can obtain a detection image including detection signals of all the pixels of the imaging element 121. That is, the imaging apparatus 100 can obtain a restored image with a higher resolution than in other modes.

In a case where the operation mode is the pixel arbitrary thinning mode, the imaging apparatus 100 can obtain a detection image with a lower resolution than in the case of the all-pixel mode. Thus, loads of the imaging element 121, conversion processing to a restored image, and the like can be suppressed, and an increase in power consumption can be suppressed. Furthermore, since it is possible to set which pixels' detection signals are included in the detection image, the imaging apparatus 100 can arbitrarily set (control) the resolution of the detection image within a range less than or equal to the resolution of the detection image of the case of the all-pixel mode. Moreover, since the detection signals can be read from some pixels of the imaging element 121, the operation from imaging in the imaging element 121 to reading of the detection signal can be made faster than in the case of the all-pixel mode. For example, in a case where a moving image is obtained by the imaging element 121, the frame rate of the moving image can be made higher than in the case of the all-pixel mode.

In a case where the operation mode is the pixel regularity thinning mode, the imaging apparatus 100 can obtain an effect similar to that in the pixel arbitrary thinning mode. Note that, in general, design of the pixel regularity thinning mode is easier than that of the pixel arbitrary thinning mode. Conversely, in general, the degree of design freedom of the pixel arbitrary thinning mode is higher than that of the pixel regularity thinning mode.

In a case where the operation mode is the area drive mode, the imaging apparatus 100 can obtain an effect similar to that in the pixel arbitrary thinning mode. Note that, in general, design of the area drive mode is easier than that of the pixel regularity thinning mode. Furthermore, in general, the degree of design freedom of the pixel arbitrary thinning mode is higher than that of the area drive mode.

In a case where the operation mode is the pixel addition mode, the imaging apparatus 100 can obtain a detection image with a lower resolution than in the case of the all-pixel mode. Thus, loads such as conversion processing to a restored image, and the like can be reduced, and an increase in power consumption can be suppressed. Furthermore, since it is possible to set the method of adding the detection signals together, the imaging apparatus 100 can arbitrarily set (control) the resolution of the detection image within a range less than or equal to the resolution of the detection image of the case of the all-pixel mode. Moreover, the operation from imaging in the imaging element 121 to reading of the detection signal can be made faster than in the case of the all-pixel mode. For example, in a case where a moving image is obtained by the imaging element 121, the frame rate of the moving image can be made higher than in the case of the all-pixel mode. Furthermore, in the case of this mode, the detection signals of a plurality of pixels are added together, so that the S/N ratio of the detection image can be improved as compared with the cases of the other modes. That is, a reduction in the image quality of the restored image can be suppressed.

<Angle of View Setting>

Note that, in a case where the resolution of the detection image is reduced as in the cases of the pixel arbitrary thinning mode, pixel regularity thinning mode, area drive mode, and pixel addition mode, the incident angle directivity of the entire detection image after resolution reduction may be made to be equivalent to the incident angle directivity of the entire detection image before the resolution reduction, in other words, the detection image of the all-pixel mode.

The fact that the incident angle directivities are equivalent to each other means that the same range of the subject surface can be imaged, in other words, the angles of view are equivalent to each other. For example, as illustrated in the upper side of FIG. 28, it is assumed that a range 312 is imaged when the imaging element 121 images a subject surface 311 with an angle of view 313. In a case where only the horizontal direction in the figure is considered, the centroid of the incident angle directivity of each pixel of the imaging element 121 is distributed in the range of the angle of view 313. In other words, the angle range of the centroid of the incident angle directivity of each pixel of the imaging element 121 is the angle of view 313. That is, in a case where pixels are selected so that incident angle directivities are made to be equivalent to each other, the selection of the pixels (detection signals thereof) is performed so that the angle ranges of the centroid of the incident angle directivity of each pixel before and after resolution reduction are equivalent to each other.

When a target resolution of the range 312 is determined, the size of a resolution 314 of the angle of view is determined. The resolution 314 is, in other words, an angular difference between the centroids of the incident angle directivities of the respective pixels. That is, when the resolution is reduced, it is necessary to increase the angular difference between the centroids of the incident angle directivities of the respective pixels.

Figure 28:
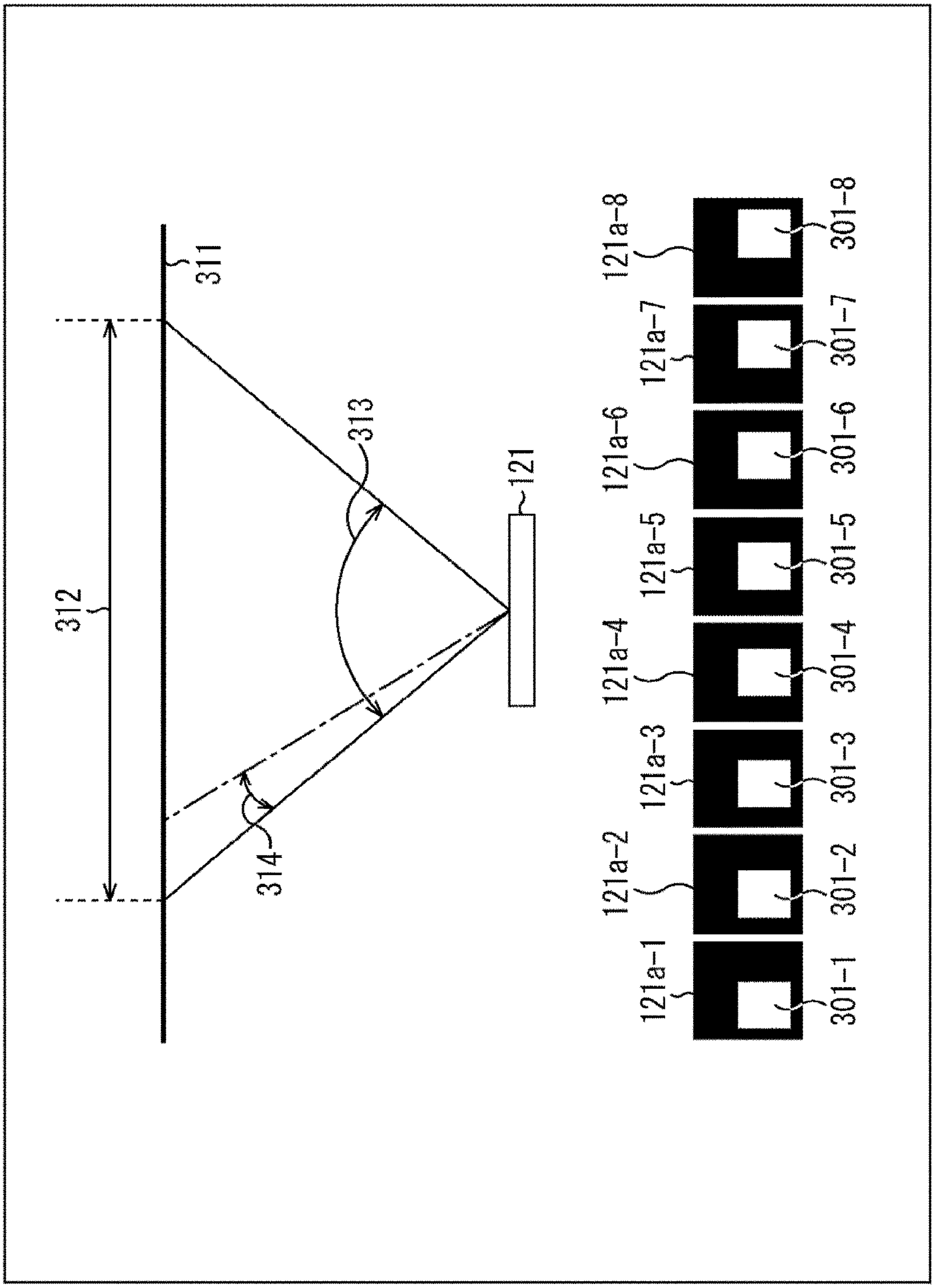
FIG. 28 is a diagram for explaining a method of making directivities equivalent to each other.

This can also be said from the fact that the number of pixels for realizing the angle of view 313 is reduced. For example, as illustrated in the lower side of FIG. 28, it is assumed that the angle of view 313 is realized by pixels (pixels 121*a*-1 to 121*a*-8) in which openings are formed at eight positions in the horizontal direction. An opening 301-1 is formed on the light incident surface of the pixel 121*a*-1. Similarly, openings 301-2 to 301-8 are formed on the light incident surfaces of the pixels 121*a*-2 to 121*a*-8, respectively. As illustrated in FIG. 28, the positions of the openings 301-1 to 301-8 in the respective pixels are shifted from each other in the horizontal direction from left to right, and the opening 301-1 is formed on the leftmost side in the pixel, and the opening 301-8 is formed on the rightmost side in the pixel. For example, when the pixel 121*a*-1, pixel 121*a*-3, pixel 121*a*-5, and pixel 121*a*-7 are to be selected from the pixels, the angular difference between the centroids of the incident angle directivities of the respective pixels is approximately doubled, and it is possible to reduce the resolution while maintaining the angle of view 313 substantially equivalent.

That is, the resolution is reduced so that the angle of view 313 is maintained, by increasing the angular difference between the centroids of the incident angle directivities represented by the respective pixel output units of the detection image, whereby the incident angle directivities of the detection image before and after reducing the resolution can be made equivalent to each other.

In the above, the description has been given for the horizontal direction; however, the similar applies to the vertical direction. That is, for all directions, the resolution is reduced so that the angle of view is maintained, by increasing the angular difference between the centroids of the incident angle directivities represented by the respective pixel output units of the detection image, whereby the incident angle directivities of the detection image before and after reducing the resolution can be made equivalent to each other.

In this way, it is possible to reduce the resolution without reducing the angle of view (field of view (FOV)) of the restored image. That is, it is possible to reduce the resolution without changing the content of the restored image.

To do such a thing in the pixel arbitrary thinning mode, the read control unit 122 is only required to select pixel output units so that the whole of the pixel output units selected has an incident angle directivity equivalent to an incident angle directivity of all pixel output units of the imaging element 121.

To do such a thing in the pixel regularity thinning mode, it is necessary that the entire pixel output unit group of the imaging element 121 in a positional relationship having a predetermined regularity is designed to have an incident angle directivity equivalent to an incident angle directivity of all pixel output units of the imaging element 121. The read control unit 122 is only required to select the pixel output unit group designed as such.

To do such a thing in the area drive mode, it is necessary that the entire pixel output unit group formed in a predetermined partial region of the pixel region of the imaging element 121 is designed to have an incident angle directivity equivalent to an incident angle directivity of all pixel output units of the imaging element 121. The read control unit 122 is only required to select the pixel output unit group of the partial region designed as such.

To do such a thing in the pixel addition mode, it is necessary that the pixel output units of the imaging element 121 are designed to have an equivalent incident angle directivity before and after the addition of the pixel output unit. Then, the read control unit 122 is only required to add the pixel output units together by a method of addition in accordance with the design.

<Method of Pixel Addition>

Note that, in the pixel addition mode, the read control unit 122 may add together detection signals of pixel output units having incident angle directivities similar to each other.

The incident angle directivity included in the detection signal after the addition is an addition result of the incident angle directivities of the respective pixel output units whose detection signals are added together. Thus, in general, the incident angle directivity included in the detection signal after the addition becomes weaker as the difference increases between the incident angle directivities of the respective pixel output units whose detection signals are added together. That is, since the difference in the incident angle directivity between the pixel unit outputs is reduced, there is a possibility that the restoration performance is reduced, and the subjective image quality of the restored image is reduced. In other words, as the difference decreases between the incident angle directivities of the respective pixel output units whose detection signals are added together, reduction of the directivity can be suppressed more.

That is, in the pixel addition mode, the read control unit 122 adds together detection signals of pixel output units having incident angle directivities more similar to each other, whereby the reduction in the subjective image quality of the restored image can be suppressed.

In other words, in the combination of pixel output units whose detection signals are added together by the read control unit 122 in the pixel addition mode, the imaging element 121 is designed so that the mutual incident angle directivities are more similar to each other, whereby the reduction in the subjective image quality of the restored image can be suppressed.

Furthermore, in the pixel addition mode, the read control unit 122 may add together the detection signals of pixel output units that are close to each other.

In consideration without the incident angle directivity, a light source position of incident light detected in a pixel output unit depends on a position of the pixel output unit. Thus, for example, the pixel output units having the closer physical positions can detect incident light from the light source at the closer position. That is, a possibility increases that the same target is being imaged. Thus, by addition of the detection signals, it can be suppressed that a plurality of target images is mixed, and a reduction can be suppressed in the image quality of the restored image.

That is, in the pixel addition mode, the read control unit 122 adds together detection signals of pixel output units that are closer to each other, whereby the reduction in the subjective image quality of the restored image can be suppressed.

In other words, in the combination of pixel output units whose detection signals are added together by the read control unit 122 in the pixel addition mode, the imaging element 121 is designed so that the pixel output units are closer to each other, whereby the reduction in the subjective image quality of the restored image can be suppressed.

<Mode Selection>

In the above, as an example of the operation mode of the resolution control, descriptions have been given of the all-pixel mode, the pixel arbitrary thinning mode, the pixel regularity thinning mode, the area drive mode, and the pixel addition mode; however, the operation mode of the resolution control is arbitrary, and is not limited to the example.

Furthermore, the read control unit 122 may be made to select any of a plurality of operation modes. For example, the above-described all-pixel mode, pixel arbitrary thinning mode, pixel regularity thinning mode, area drive mode, and pixel addition mode are prepared as candidates, and the read control unit 122 may select and apply one of the modes, and perform control of resolution in the selected operation mode.

In this way, the imaging apparatus 100 can easily obtain detection images (or restored images) with more various specifications simply by switching the operation modes of the resolution control of the read control unit 122.

Note that, the basis for this mode selection is arbitrary. For example, the selection may be made on the basis of the imaging operation mode, or the mode may be designated by the user. The mode switching timing is also arbitrary. Of course, the candidate operation mode is arbitrary.

<Restoration Matrix>

The restoration matrix setting unit 123 sets a restoration matrix corresponding to the detection image and the restored image whose resolution is controlled as described above. The method of setting the restoration matrix is arbitrary. For example, the restoration matrix may be determined in advance, may be selected by the restoration matrix setting unit 123 from a plurality of candidates, or may be arbitrarily set by the restoration matrix setting unit 123.

<Design of Restoration Matrix>

The method of designing the restoration matrix is arbitrary. For example, design may be made on the basis of a physical model. The captured image (that is the same as the restored image) is an image that is configured by values of pixels on which a subject image is formed, and can be visually recognized by the user. In the imaging element 121, this captured image is converted into a detection image by parameters such as the incident angle directivity of each pixel and the subject distance.

That is, in the case of the all-pixel mode, as illustrated in A of FIG. 29, a matrix of a detection image 331 can be represented by a product of an imaging matrix 332 (A) and a matrix of a restored image 333.

However, in this determinant, the matrix of the detection image 331 is a matrix in which the detection signals of each column of the detection image 331 with the resolution (W×H) is rearranged into one column, and is a vertical (W×H) by horizontal one matrix. Furthermore, the matrix of the restored image 333 is a matrix in which the detection signals of each column of the restored image 333 with the resolution (W×H) is rearranged into one column, and is a vertical (W×H) by horizontal one matrix. The imaging matrix 332 (A) includes vertical (W×H)×horizontal (W×H) coefficients. A value of each coefficient is determined by the incident angle directivity of each pixel of the imaging element 121, the subject distance, and the like.

In other words, restoration processing in the case of the all-pixel mode can be represented by a determinant as illustrated in B of FIG. 29. That is, as illustrated in B of FIG. 29, the matrix of the restored image 333 can be represented by a product of a restoration matrix 334 and the detection image 331. In this determinant, the matrix of the detection image 331 is a vertical (W×H) by horizontal one matrix. Furthermore, the matrix of the restored image 333 is a vertical (W×H) by horizontal one matrix. The restoration matrix 334 is an inverse matrix (Ainv) of the imaging matrix 332 (A), and includes vertical (W×H)×horizontal (W×H) coefficients.

As described above, in the case of the all-pixel mode, the imaging matrix 332 may be designed on the basis of the incident angle directivity of each pixel of the imaging element 121, the subject distance, and the like, and the inverse matrix may be used as the restoration matrix 334.

In the other modes, a similar determinant is basically established, but resolutions of the detection image and the restored image are different from those in the all-pixel mode, so that it is necessary to set the number of rows and the number of columns of the imaging matrix 332 and the restoration matrix 334 depending of the resolutions.

<Case of all-Pixel Mode>

Figure 30:
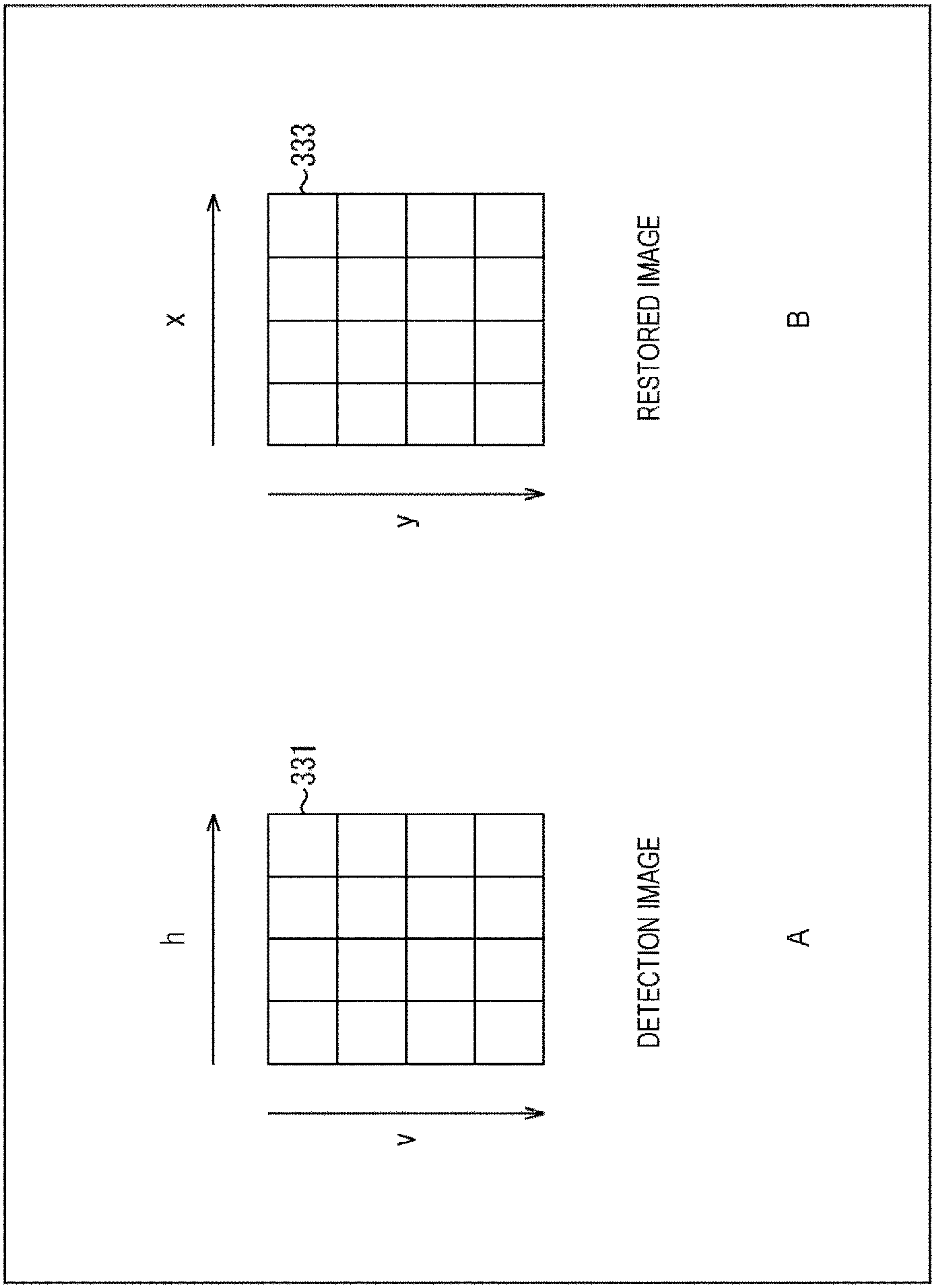
FIG. 30 is a diagram for explaining a restoration matrix of the method of reading from all pixels.

A more specific example will be described of the case of the all-pixel mode. As illustrated in A of FIG. 30, it is assumed that the detection image 331 includes 4×4 pixel output units, and as illustrated in B of FIG. 30, it is assumed that the restored image 333 includes 4×4 pixels.

Figure 31:
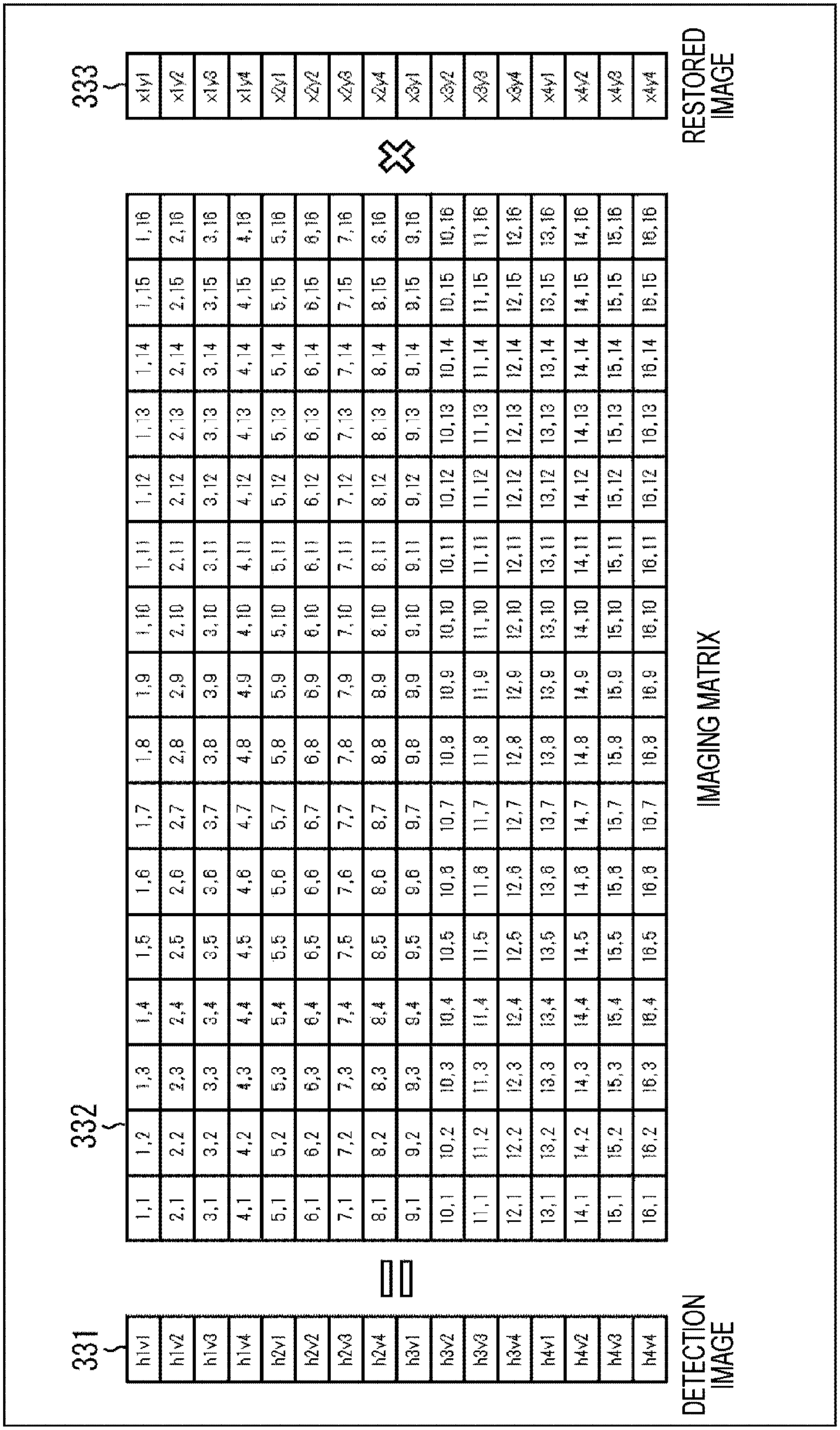
FIG. 31 is a diagram for explaining the restoration matrix of the method of reading from all pixels.

In the case of the all-pixel mode, in the determinant illustrated in A of FIG. 29, the detection image 331 and the restored image 333 are each represented by a 16×1 matrix as illustrated in FIG. 31. Thus, the imaging matrix 332 is a 16×16 matrix. Thus, the restoration matrix is also a 16×16 matrix.

<Case of Pixel Arbitrary Thinning Mode>

Figure 32:
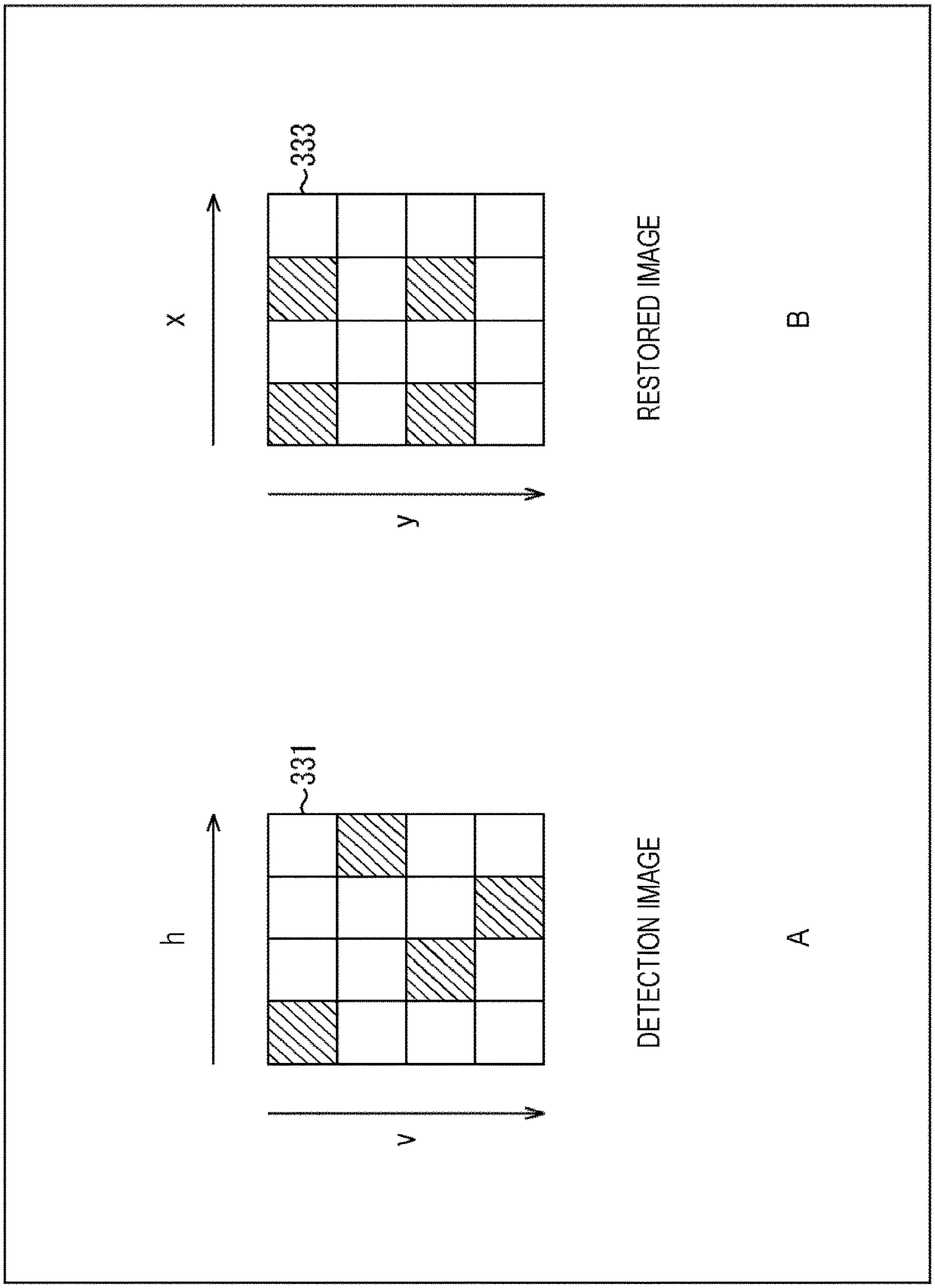
FIG. 32 is a diagram for explaining a restoration matrix of the method of reading from some arbitrary pixels.

Next, a case will be described of the pixel arbitrary thinning mode. For example, as illustrated in A of FIG. 32, it is assumed that four pixel output units with a diagonal line pattern are selected from the detection image 331 including 4×4 pixel output units. Furthermore, as illustrated in B of FIG. 32, it is assumed that four pixels are evenly arranged in the restored image 333.

Figure 33:
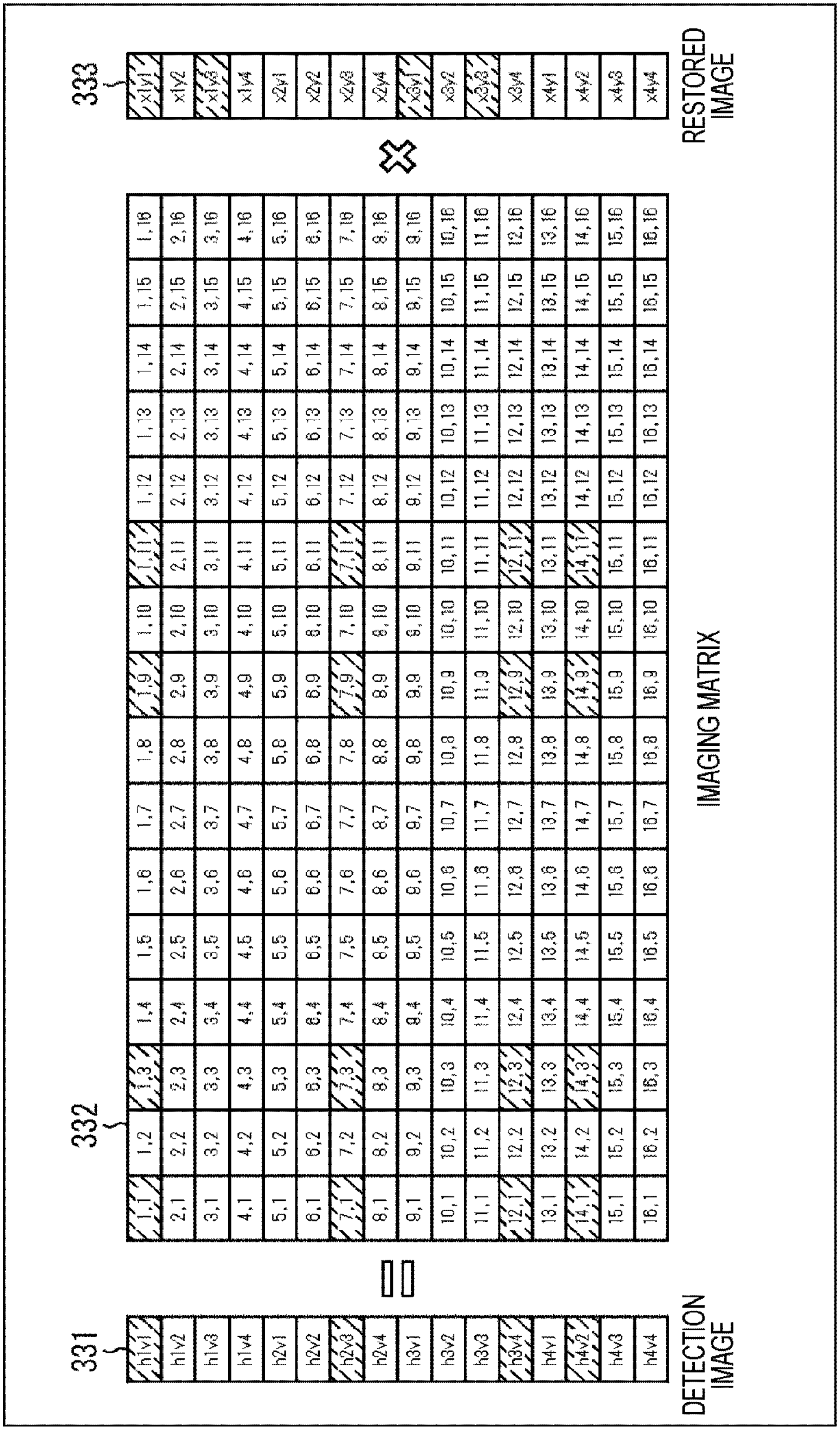
FIG. 33 is a diagram for explaining the restoration matrix of the method of reading from some arbitrary pixels.

The imaging matrix in the pixel arbitrary thinning mode can be designed on the basis of the imaging matrix in the all-pixel mode. For example, it is only required to extract corresponding coefficients, in each matrix of the determinant of the all-pixel mode of FIG. 31. That is, a detection signal of each pixel output unit with the diagonal line pattern of the detection image 331 illustrated in A of FIG. 32 corresponds to a coefficient indicated by the diagonal line pattern of the matrix of the detection image 331 in the case of the all-pixel mode, as illustrated in FIG. 33. Furthermore, a pixel value of each pixel with the diagonal line pattern of the restored image 333 illustrated in B of FIG. 32 corresponds to a coefficient indicated by the diagonal line pattern of the matrix of the restored image 333 in the case of the all-pixel mode, as illustrated in FIG. 33.

Thus, as illustrated in FIG. 33, the imaging matrix 332 in the case of the pixel arbitrary thinning mode corresponds to coefficients (coefficients indicated by the diagonal line pattern) at positions corresponding to coefficients indicated by the diagonal line pattern of the matrix of the detection image 331 and coefficients indicated by the diagonal line pattern of the matrix of the restored image 333, of the imaging matrix in the case of the all-pixel mode. Thus, by extracting (selecting and reading) these coefficients, the imaging matrix 332 in the pixel arbitrary thinning mode can be generated. That is, in the case of FIG. 33, the 4×4 imaging matrix 332 is obtained.

<Case of Pixel Regularity Thinning Mode>

Figure 34:
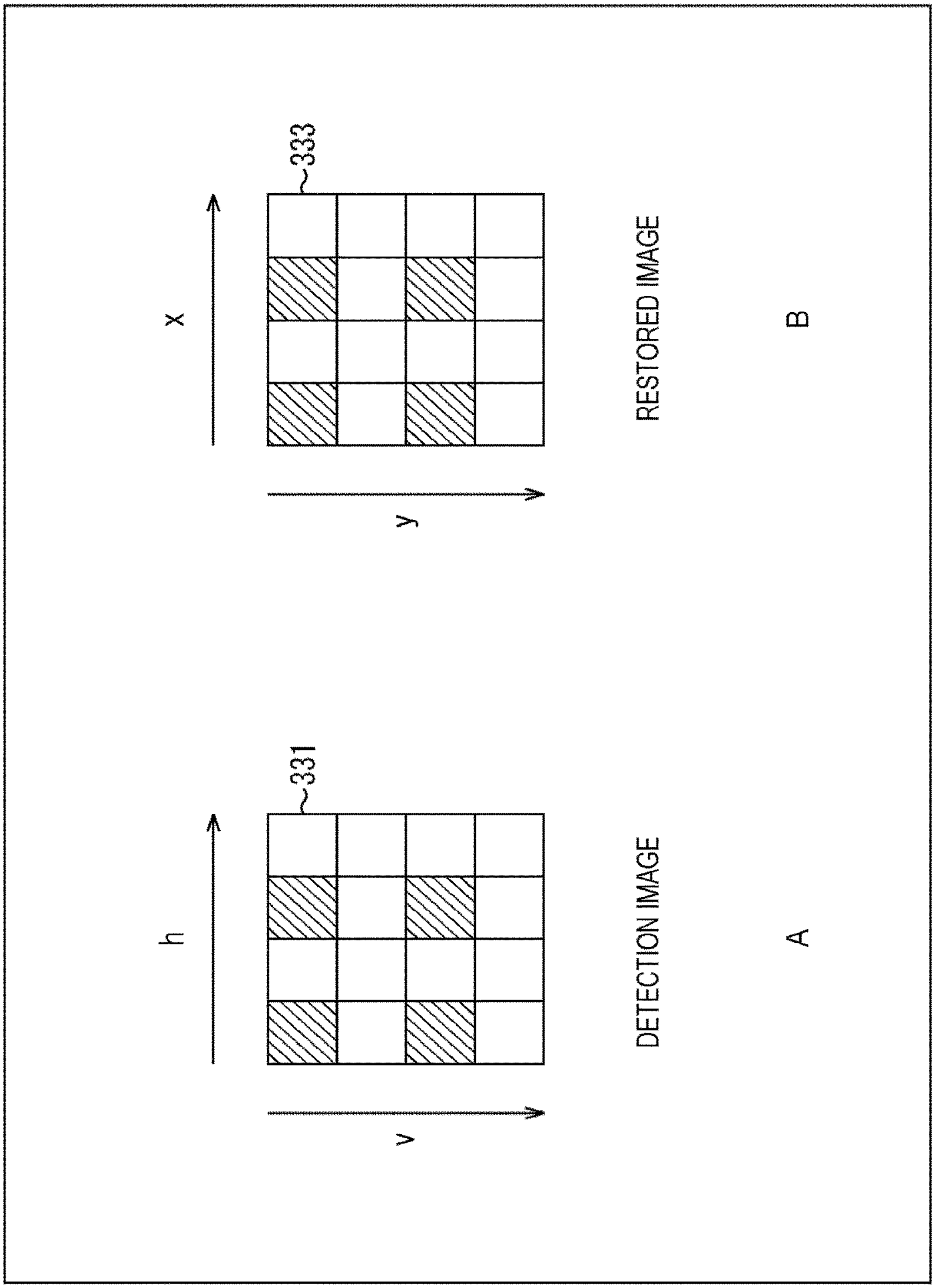
FIG. 34 is a diagram for explaining a restoration matrix of the method of regularly reading from some pixels.

Next, a case will be described of the pixel regularity thinning mode. Also in the case of the pixel regularity thinning mode, the imaging matrix can be designed with a method similar to that in the pixel arbitrary thinning mode basically. For example, as illustrated in A of FIG. 34, it is assumed that four pixel output units (diagonal line pattern) are selected at equal intervals from the detection image 331 including 4×4 pixel output units. Furthermore, as illustrated in B of FIG. 34, it is assumed that four pixels are evenly arranged in the restored image 333.

Figure 35:
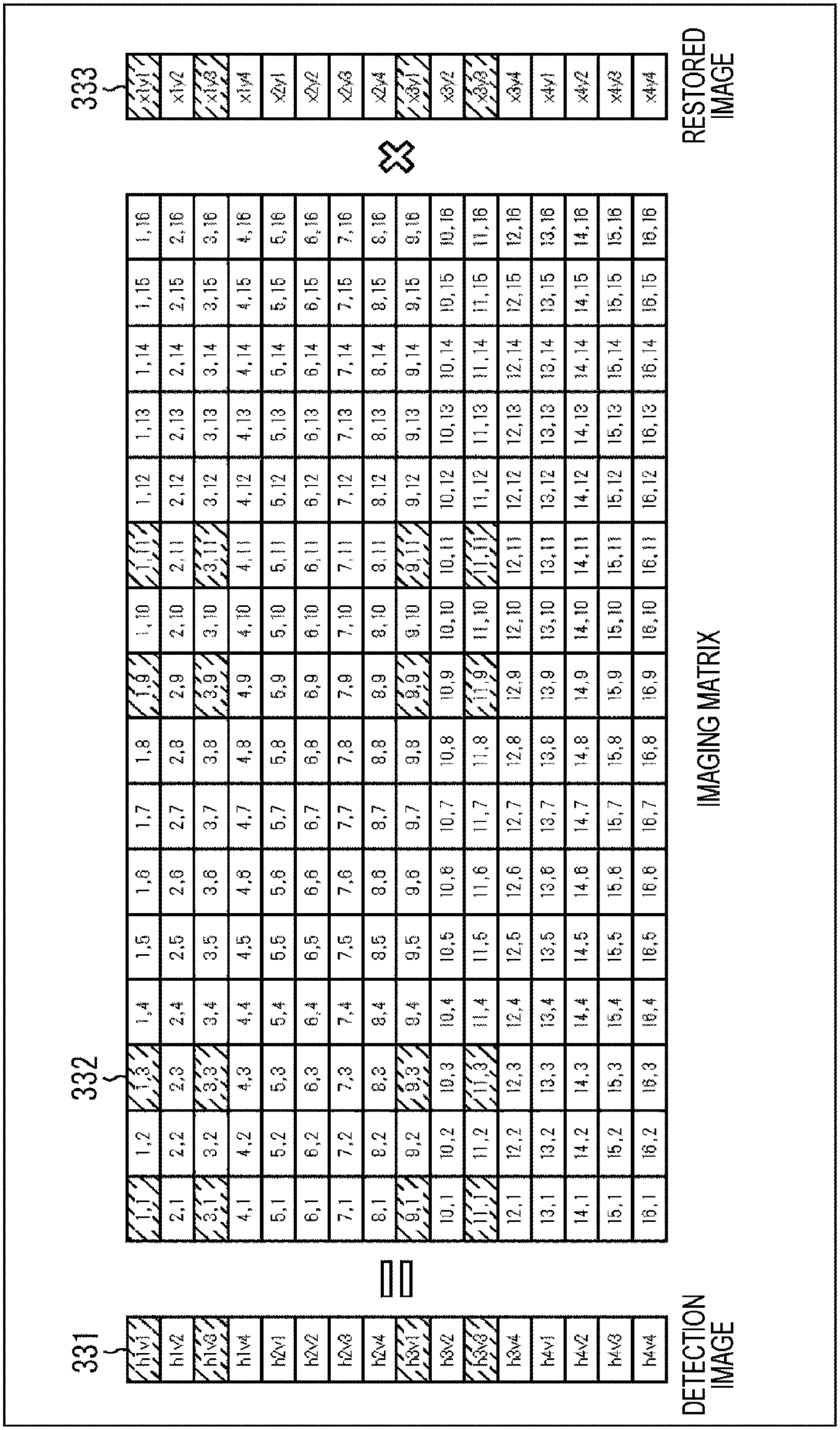
FIG. 35 is a diagram for explaining the restoration matrix of the method of regularly reading from some pixels.

That is, also in this case, it is only required to extract corresponding coefficients, in each matrix of the determinant of the all-pixel mode of FIG. 31. In FIG. 35, coefficients indicated by the diagonal line pattern of the matrix of the detection image 331 correspond to detection signals of respective pixel output units with the diagonal line pattern of the detection image 331 illustrated in A of FIG. 34. Furthermore, in FIG. 35, coefficients indicated by the diagonal line pattern of the matrix of the restored image 333 correspond to pixel values of respective pixels with the diagonal line pattern of the restored image 333 illustrated in B of FIG. 34. As illustrated in FIG. 35, the imaging matrix 332 in the case of the pixel regularity thinning mode corresponds to coefficients of positions corresponding to these coefficients (coefficients indicated by the diagonal line pattern). Thus, by extracting (selecting and reading) these coefficients, the imaging matrix 332 in the pixel regularity thinning mode can be generated. That is, in the case of FIG. 35, the 4×4 imaging matrix 332 is obtained.

<Case of Area Drive Mode>

Figure 36:
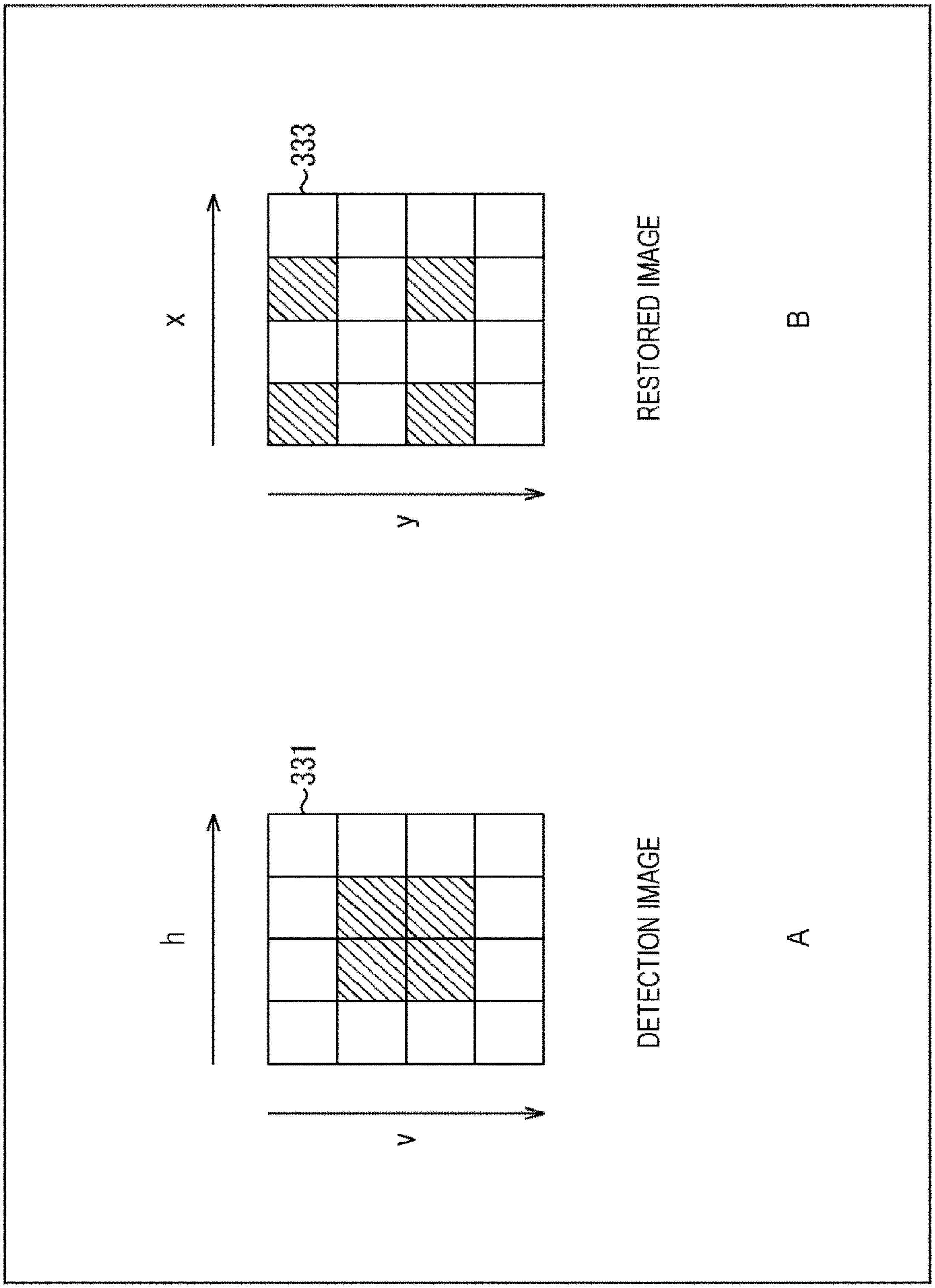
FIG. 36 is a diagram for explaining a restoration matrix of the method of reading from pixels in a partial region.

Next, a case will be described of the area drive mode. Also in the area drive mode, the imaging matrix can be designed with a method similar to that in the pixel arbitrary thinning mode basically. For example, as illustrated in A of FIG. 36, it is assumed that 2×2 pixel output units (diagonal line pattern) at the center are selected from the detection image 331 including 4×4 pixel output units. Furthermore, as illustrated in B of FIG. 36, it is assumed that four pixels are evenly arranged in the restored image 333.

Figure 37:
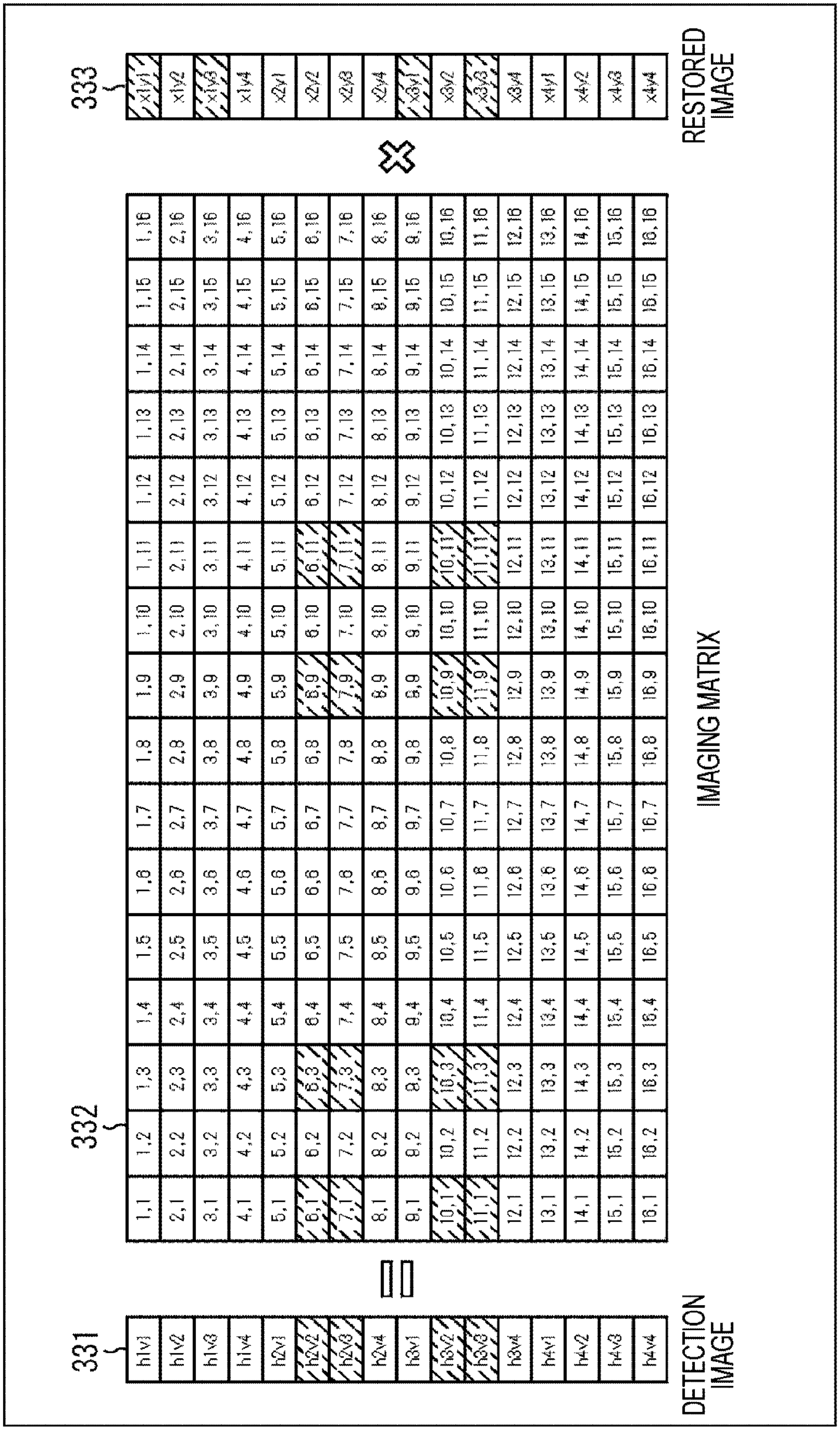
FIG. 37 is a diagram for explaining the restoration matrix of the method of reading from pixels in a partial region.

That is, also in this case, it is only required to extract corresponding coefficients, in each matrix of the determinant of the all-pixel mode of FIG. 31. In FIG. 37, coefficients indicated by the diagonal line pattern of the matrix of the detection image 331 correspond to detection signals of respective pixel output units with the diagonal line pattern of the detection image 331 illustrated in A of FIG. 36. Furthermore, in FIG. 37, coefficients indicated by the diagonal line pattern of the matrix of the restored image 333 correspond to pixel values of respective pixels with the diagonal line pattern of the restored image 333 illustrated in B of FIG. 36. As illustrated in FIG. 37, the imaging matrix 332 in the case of the area drive mode corresponds to coefficients of positions corresponding to these coefficients (coefficients indicated by the diagonal line pattern). Thus, by extracting (selecting and reading) these coefficients, the imaging matrix 332 in the area drive mode can be generated. That is, in the case of FIG. 37, the 4×4 imaging matrix 332 is obtained.

<Case of Pixel Addition Mode>

Figure 38:
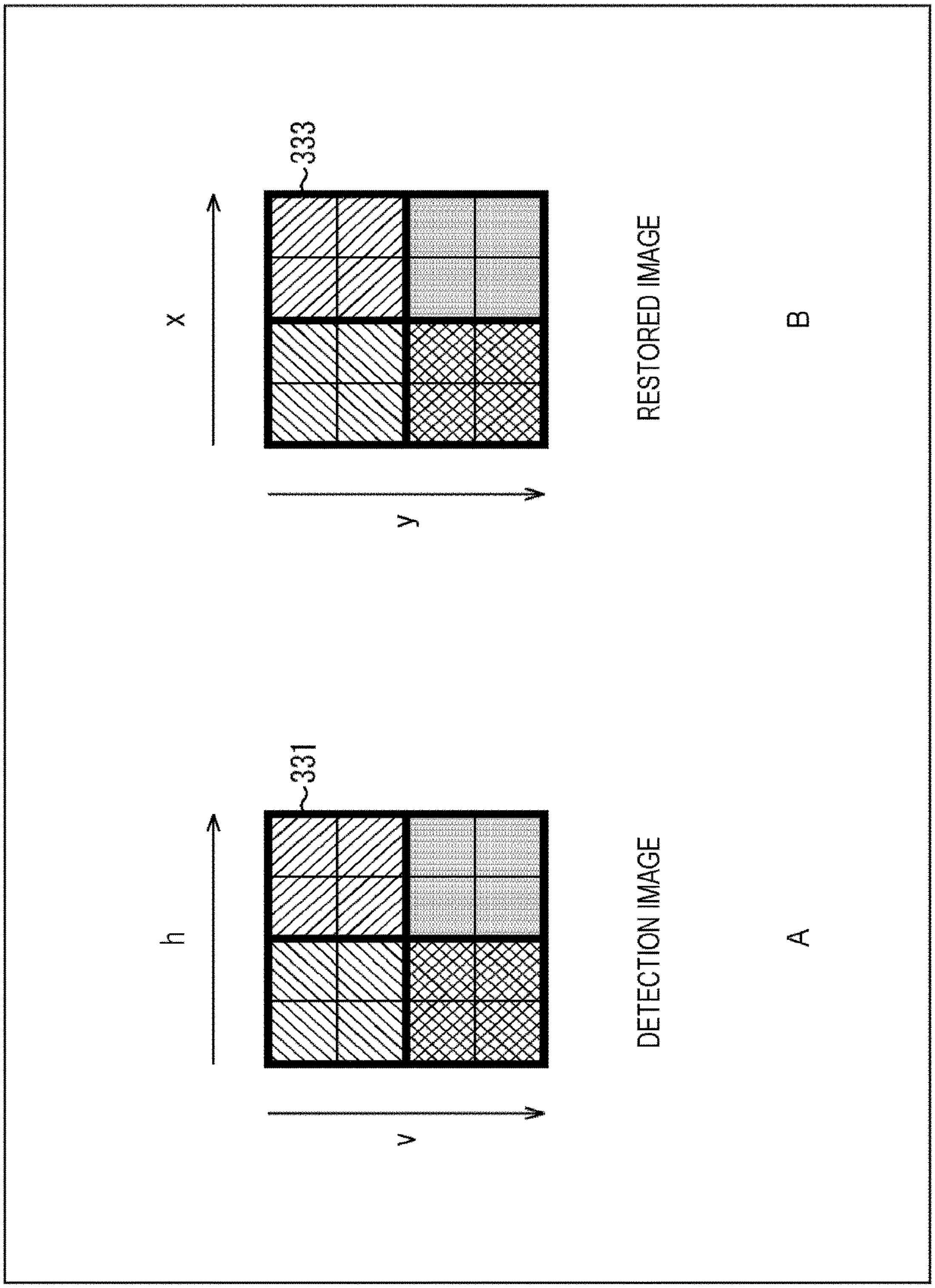
FIG. 38 is a diagram for explaining a restoration matrix of the method of performing pixel addition.

Next, a case will be described of the pixel addition mode. Also in the pixel addition mode, the imaging matrix can be designed with a method similar to that in the pixel arbitrary thinning mode basically. For example, as illustrated in A of FIG. 38, it is assumed that detection signals of the detection image 331 including 4×4 pixel output units are added together for each 2×2 pixel output units. In this case, as illustrated in B of FIG. 38, also in the restored image 333, a pixel value is obtained equivalent to a pixel value in which values of 4×4 pixels are added together for each 2×2 pixels.

Figure 39:
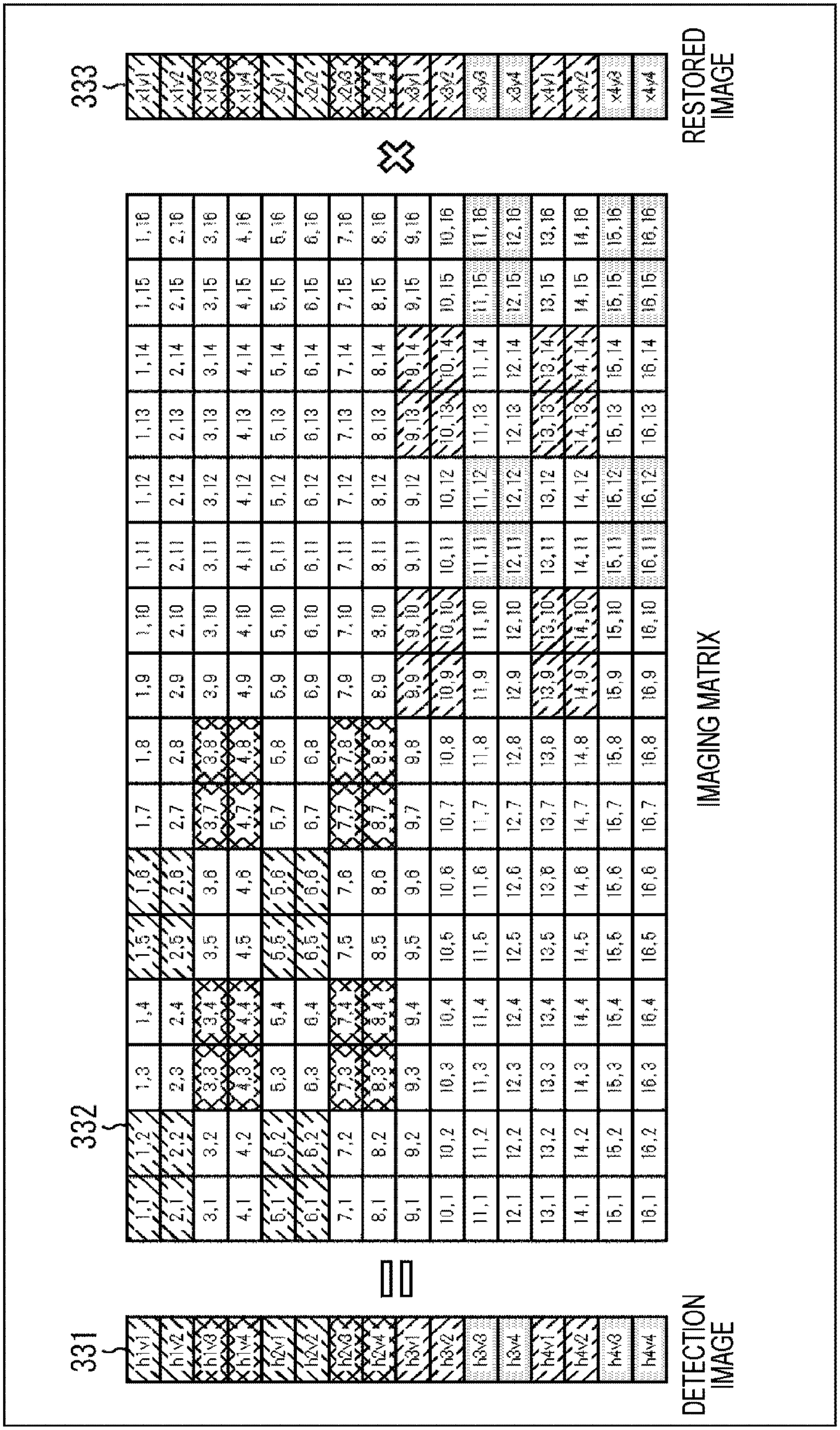
FIG. 39 is a diagram for explaining the restoration matrix of the method of performing pixel addition.

That is, also in this case, it is only required to extract corresponding coefficients, in each matrix of the determinant of the all-pixel mode of FIG. 31. In FIG. 39, coefficients indicated by the upper right lower left diagonal line pattern of the matrix of the detection image 331 correspond to detection signals of respective pixel output units with the upper right lower left diagonal line pattern of the detection image 331 illustrated in A of FIG. 38. Similarly, coefficients indicated by the upper left lower right diagonal line pattern of the matrix of the detection image 331 of FIG. 39 correspond to detection signals of respective pixel output units with the upper left lower right diagonal line pattern of the detection image 331 in A of FIG. 38. Furthermore, coefficients indicated by the cross-hatched pattern of the matrix of the detection image 331 of FIG. 39 correspond to detection signals of respective pixel output units with the cross-hatched pattern of the detection image 331 in A of FIG. 38. Furthermore, coefficients indicated by gray of the matrix of the detection image 331 of FIG. 39 correspond to detection signals of respective pixel output units with gray of the detection image 331 in A of FIG. 38.

The similar applies to the restored image 333. In FIG. 39, coefficients indicated by the upper right lower left diagonal line pattern of the matrix of the restored image 333 correspond to pixel values of respective pixels with the upper right lower left diagonal line pattern of the restored image 333 illustrated in B of FIG. 38. Similarly, coefficients indicated by the upper left lower right diagonal line pattern of the matrix of the restored image 333 of FIG. 39 correspond to pixel values of respective pixels with the upper left lower right diagonal line pattern of the restored image 333 in B of FIG. 38. Furthermore, coefficients indicated by the cross-hatched pattern of the matrix of the restored image 333 of FIG. 39 correspond to pixel values of respective pixels with the cross-hatched pattern of the restored image 333 in B of FIG. 38. Furthermore, coefficients indicated by gray of the matrix of the restored image 333 of FIG. 39 correspond to pixel values of respective pixels with gray of the restored image 333 in B of FIG. 38.

As illustrated in FIG. 39, the imaging matrix 332 in the case of the pixel addition mode corresponds to coefficients of positions corresponding to these coefficients (coefficients indicated by a pattern or color). Thus, by extracting these coefficients (for example, calculating an average value of coefficients having the same pattern), the imaging matrix 332 in the pixel addition mode can be generated.

<Inverse Matrix of Imaging Matrix>

As described above, the restoration matrix can be obtained as an inverse matrix of the imaging matrix. That is, as illustrated in the upper right part of FIG. 40, in a case where a restored image of N×N pixels is obtained from a detection image Pic of N pixels×N pixels, a relationship illustrated in the left part of FIG. 40 is established by a vector X having pixel values of respective pixels of the restored image of N×N rows and one column as elements, a vector Y having pixel values of respective pixels of the detection image of N×N rows and one column as elements, and an N×N by N×N matrix A including coefficient sets.

Figure 40:
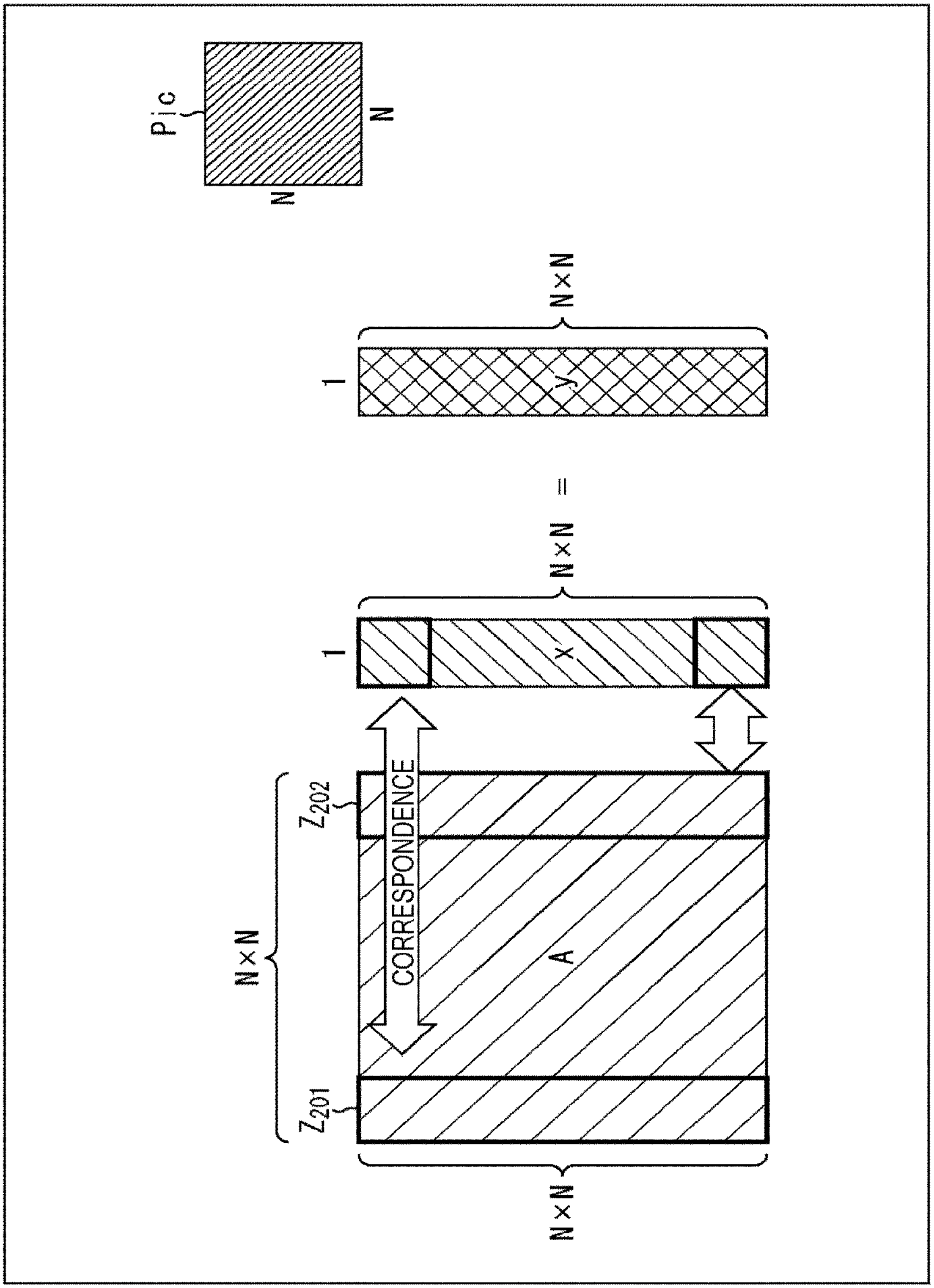
FIG. 40 is a diagram illustrating a reason why the amount of calculation and the memory capacity are reduced by providing rules for a light-shielding range in each of the horizontal direction and the vertical direction.

In other words, in FIG. 40, it is illustrated that a result of multiplying elements of the N×N by N×N matrix A (imaging matrix) including coefficient sets and the vector X of N×N rows and one column representing the restored image together is the vector Y of N×N rows and one column representing the detection image, and simultaneous equations are configured from this relationship.

Note that, in FIG. 40, it is illustrated that each element in the first column indicated by a range Z201 of the matrix A corresponds to the element of the first row of the vector X, and each element in the N×Nth column indicated by a range Z202 of the matrix A corresponds to the element of the N×Nth row of the vector X.

In other words, a restored image is obtained by obtaining each element of the vector X by solving simultaneous equations based on the determinant illustrated in FIG. 40. Furthermore, in a case where a pinhole is used, and in a case where a focusing function, such as an imaging lens, is used for causing incident light entering from the same direction to enter both pixel output units adjacent to each other, a relationship between a position of each pixel and an incident angle of light is uniquely determined, so that the matrix A becomes a diagonal matrix that is a square matrix in which diagonal components ((i, i) elements) are all 1 and components other than the diagonal components are all 0. Conversely, in a case where neither a pinhole nor an imaging lens is used as in the imaging element 121 of FIG. 2, the relationship between the position of each pixel and the incident angle of light is not uniquely determined, so that the matrix A does not become a diagonal matrix.

Figure 41:
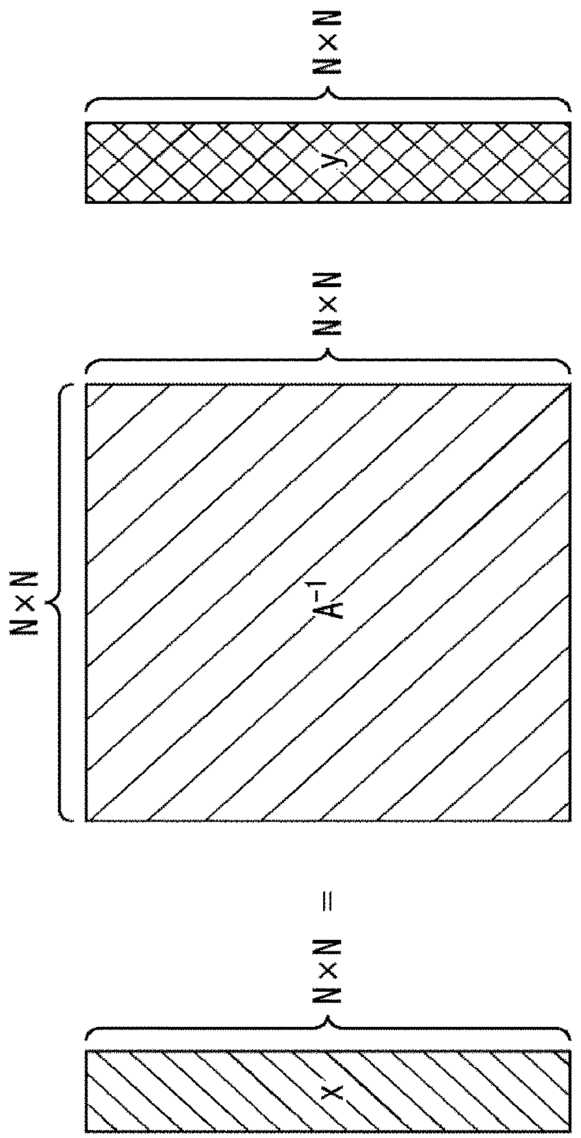
FIG. 41 is a diagram illustrating the reason why the amount of calculation and the memory capacity are reduced by providing rules for the light-shielding range in each of the horizontal direction and the vertical direction.

By the way, in general, the determinant of FIG. 40 is transformed as illustrated in FIG. 41 by multiplying both sides by an inverse matrix $A^{-1}$ (restoration matrix) of the matrix A from the left, and the elements of the vector X representing the restored image is obtained by multiplying the vector Y representing the detection image by the inverse matrix $A^{-1}$ from the right.

However, sometimes it is not possible to solve the simultaneous equations for any of reasons, such as that the real matrix A cannot be obtained accurately, cannot be measured accurately, cannot be solved in a case where the basis vector of the matrix A is close to linearly dependent, and noise is included in the elements of the detection image, or combination thereof.

Thus, considering a configuration robust against various errors, the following equation (7) using the concept of the regularized least squares method is adopted.

[Math. 1]

$$\hat{x}=\min\|A\hat{x}-y\|^2+\|\gamma\hat{x}\|^2 \tag{7}$$

Here, in the equation (7), x with "^" at the top represents the vector X, A represents the matrix A, Y represents the vector Y, γ represents a parameter, and ||A|| represents an L2 norm (square root of sum of squares). Here, the first term is a norm when the difference between both sides of FIG. 40 is minimized, and the second term is a regularization term.

When this equation (7) is solved for x, it is expressed by the following equation (8).

[Math. 2]

$$\hat{x}=(A^tA+\gamma I)^{-1}A^ty \tag{8}$$

However, as illustrated in FIG. 31, for example, since the imaging matrix A is enormous in size, calculation time and a large capacity memory for calculation are required.

Figure 42:
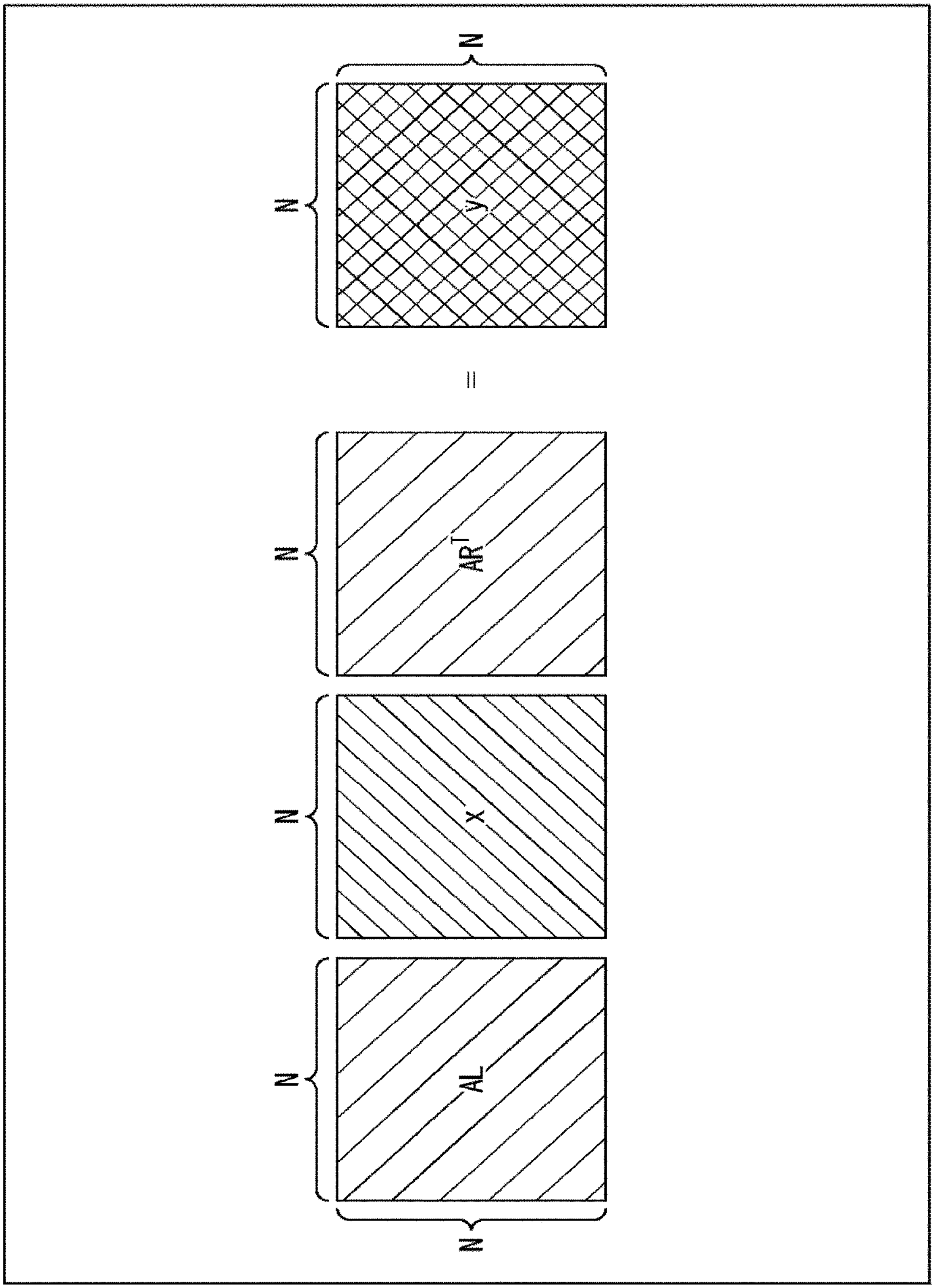
FIG. 42 is a diagram illustrating the reason why the amount of calculation and the memory capacity are reduced by providing rules for the light-shielding range in each of the horizontal direction and the vertical direction.

Thus, considering that, for example, as illustrated in FIG. 42, the matrix A is decomposed into an N by N matrix AL and an N by N matrix $AR^T$, and a result of multiplying an N by N matrix X representing a restored image by the decomposed matrices respectively from the preceding stage and the subsequent stage becomes an N by N matrix Y representing the detection image. Therefore, for the matrix A with the number of elements (N×N)×(N×N), the matrices AL and $AR^T$ with the number of elements (N×N) are obtained, so that the number of elements can be reduced to 1/(N×N). As a result, it is only necessary to use two matrices AL and $AR^T$ having the number of elements (N×N), so that the amount of calculation and the memory capacity can be reduced.

Here, $A^T$ is a transposed matrix of the matrix A, γ is the parameter, and I is a unit matrix. In the equation (8), the matrix in parentheses is set as the matrix AL, and the inverse matrix of the transposed matrix of the matrix A is set as the matrix $AR^T$. The determinant illustrated in FIG. 42 is realized.

Figure 43:
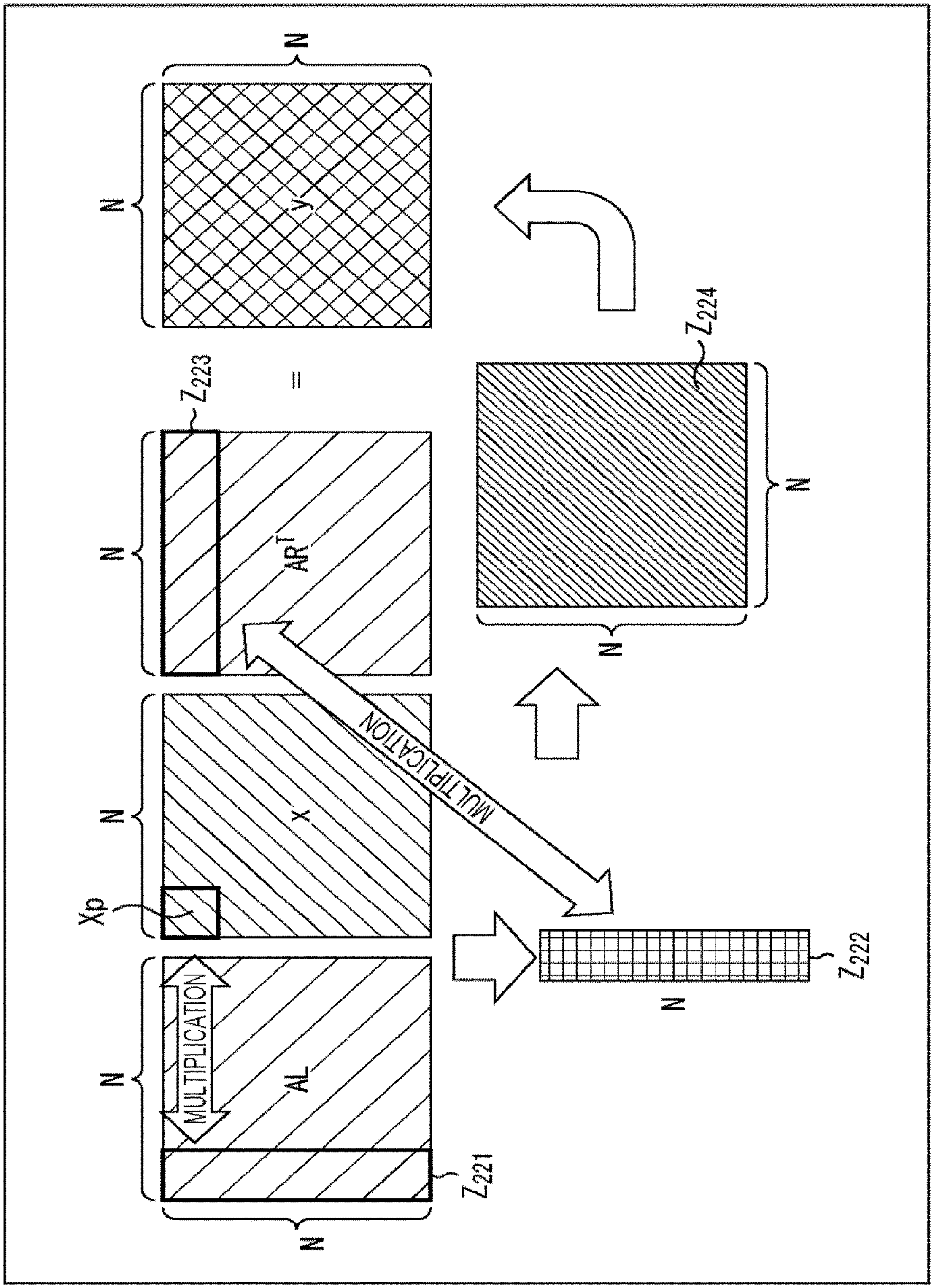
FIG. 43 is a diagram illustrating the reason why the amount of calculation and the memory capacity are reduced by providing rules for the light-shielding range in each of the horizontal direction and the vertical direction.

In the calculation as illustrated in FIG. 42 in this way, as illustrated in FIG. 43, elements Z222 are obtained by multiplying a target element Xp in the matrix X by each of elements Z221 of a corresponding column of the matrix AL. Moreover, by multiplying the elements Z222 and elements in a row corresponding to the target element Xp of the matrix $AR^T$, a two-dimensional response Z224 corresponding to the target element Xp is obtained. Then, the two-dimensional responses Z224 corresponding to all the elements of the matrix X are integrated together, whereby the matrix Y is obtained.

Thus, to the elements Z221 corresponding to respective rows of the matrix AL, a coefficient set is given corresponding to the incident angle directivity of the horizontal band type pixel 121*a* set to the same width for each column of the imaging element 121 illustrated in FIG. 18.

Similarly, to elements Z223 of each row of the matrix $AR^T$, a coefficient set is given corresponding to the incident angle directivity of the vertical band type pixel 121*a* set to the same height set for each row of the imaging element 121 illustrated in FIG. 18.

As a result, since it becomes possible to reduce the size of the matrix used when the restored image is restored on the basis of the detection image, the amount of calculation is reduced, whereby it becomes possible to improve the processing speed and reduce the power consumption related to the calculation. Furthermore, since the size of the matrix can be reduced, it becomes possible to reduce the memory capacity used for the calculation, and reduce the apparatus cost.

Note that, the example of FIG. 18 illustrates an example in which the range shielded from light in the pixel unit (range in which light can be received) is changed while the predetermined regularity is given in the horizontal direction and the vertical direction; however, in the technology of the present disclosure, a range shielded from light in the pixel unit (range in which light can be received) as described above is not randomly set completely, but randomly set to some extent is also considered as being randomly set. In other words, in the present disclosure, not only a case where the range shielded from light in the pixel unit (range in which light can be received) is randomly set completely, but also a case where the range is randomly set to some extent (for example, a case where a range having regularity is partially included, but the other range has randomness, among all the pixels), or a case where regularity does not seem to exist to some extent (a case of an arrangement in which it cannot be confirmed that arrangement is performed in accordance with the rule described with reference to FIG. 18, among all the pixels), is also considered to be random.

Although the light-shielding film has been described above, the description of this example can also be applied to a case where incident angle directivity is given by selectively using a plurality of photodiodes arranged in a pixel. That is, for example, by appropriately setting the division position (size and shape of each partial region), and the position, size, shape, and the like of each photodiode, or appropriately selecting the photodiode, an incident light directivity can be realized equivalent to the incident light directivity in a case where a part of the change in the range shielded by the light-shielding film 121*b* of the pixel 121*a* described above is made to have regularity. In this way, it is possible to reduce the randomness of the difference in the incident angle directivity of each pixel, and reduce the processing load outside the imaging element 121 such as the restoration unit 122.

<Flow of Imaging Processing>

Figure 44:
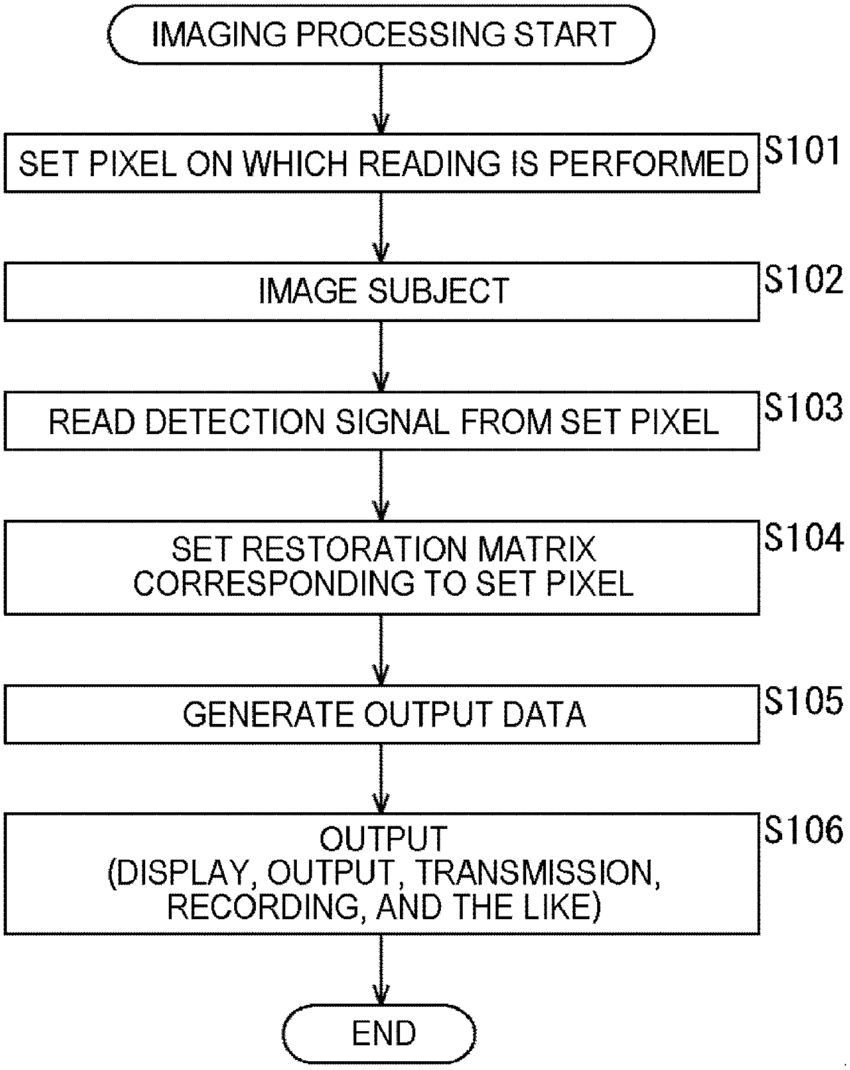
FIG. 44 is a flowchart illustrating an example of a flow of imaging processing.

An example will be described of a flow of imaging processing executed by the imaging apparatus 100 as described above, with reference to a flowchart of FIG. 44.

When the imaging processing is started, in step S101, the read control unit 122 sets pixels from which detection signals are read, of the imaging element 121. For example, the read control unit 122 sets the pixels from which the detection signals are read, by selecting the above-described operation mode.

In step S102, the imaging element 121 images a subject.

In step S103, the read control unit 122 reads the detection signals (detection image) obtained by the imaging in step S102 from the pixels set in step S101.

In step S104, the restoration matrix setting unit 123 sets a restoration matrix corresponding to the pixels set in step S101.

In step S105, the restoration unit 124 or the associating unit 125 generates output data by using the detection image read in step S103 and the restoration matrix set in step S104.

For example, the restoration unit 124 converts the detection image into a restored image by using restoration coefficients. The restoration unit 124 sets data of the restored image as the output data. Furthermore, for example, the associating unit 125 sets the output data by associating data of the restoration coefficients with the data of the detection image.

In step S107, the output data is output. This output includes any method. For example, this output may include image display, data output and printing to another apparatus, storage on a storage medium, transmission to a communication partner, recording on the recording medium 116, and the like.

First, a case will be described in which a Raw image (that may be a restored image subjected to synchronization processing, color separation processing, and the like (for example, demosaic processing and the like)) is output. For example, in a case where the output is "display", the restoration unit 124 supplies data of the Raw image, and the like to the output unit 112. The output unit 112 displays the Raw image on an image display device (for example, a liquid crystal display (LCD) or the like), or projects the Raw image from a projector. Furthermore, for example, in a case where the output is "output", the restoration unit 124 supplies the data of the Raw image, and the like to the output unit 112. The output unit 112 outputs the data of the Raw image, and the like from the external output terminal to another apparatus. Moreover, for example, in a case where the output is "storage", the restoration unit 124 supplies the data of the Raw image, and the like to the storage unit 113. The storage unit 113 stores the data of the Raw image, and the like in a storage medium included in the storage unit 113. Furthermore, for example, in a case where the output is "transmission", the restoration unit 124 supplies the data of the Raw image, and the like to the communication unit 114. The communication unit 114 communicates with another apparatus by using a predetermined communication method, and transmits the data of the Raw image, and the like to the communication partner. Moreover, for example, in a case where the output is "recording", the restoration unit 124 supplies the data of the Raw image, and the like to the recording/reproducing unit 115. The recording/reproducing unit 115 records the data of the Raw image, and the like on the recording medium 116 mounted to the recording/reproducing unit 115.

Next, a description will be given of a case where the data of the detection image, image restoration coefficients, and the like associated with each other are output. For example, in a case where the output is "display", the associating unit 125 supplies the data of the detection image, image restoration coefficients, and the like associated with each other, to the output unit 112. The output unit 112 displays information such as images and characters regarding the data of the detection image, image restoration coefficients, and the like on an image display device (for example, a liquid crystal display (LCD) or the like), or projects the information from a projector. Furthermore, for example, in a case where the output is "output", the associating unit 125 supplies the data of the detection image, image restoration coefficients, and the like associated with each other to the output unit 112. The output unit 112 outputs the data of the detection image, image restoration coefficients, and the like associated with each other from the external output terminal to another apparatus. Moreover, for example, in a case where the output is "storage", the associating unit 125 supplies the data of the detection image, image restoration coefficients, and the like associated with each other to the storage unit 113. The storage unit 113 stores the data of the detection image, image restoration coefficients, and the like associated with each other in the storage medium included in the storage unit 113. Furthermore, for example, in a case where the output is "transmission", the associating unit 125 supplies the data of the detection image, image restoration coefficients, and the like associated with each other to the communication unit 114. The communication unit 114 communicates with another apparatus by using a predetermined communication method, and transmits the data of the detection image, image restoration coefficients, and the like associated with each other to the communication partner. Moreover, for example, in a case where the output is "recording", the associating unit 125 supplies the data of the detection image, image restoration coefficients, and the like associated with each other to the recording/reproducing unit 115. The recording/reproducing unit 115 records the data of the detection image, image restoration coefficients, and the like associated with each other on the recording medium 116 mounted to the recording/reproducing unit 115.

When the output data is output, the imaging processing ends. By performing the imaging processing as described above, the resolution of the detection image can be controlled.

<Color Image>

Figure 45:
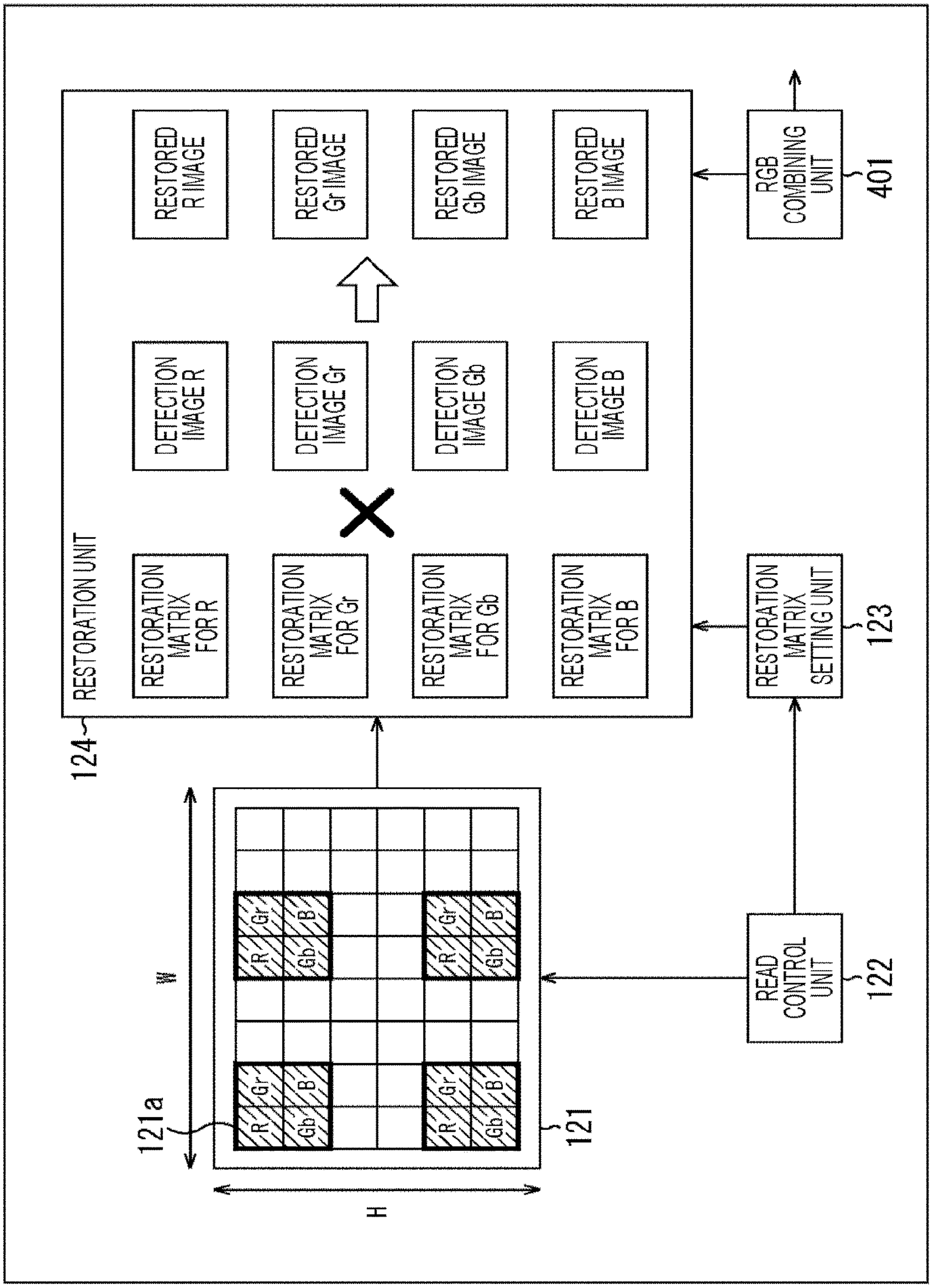
FIG. 45 is a diagram for explaining an outline of a reading method in the case of a color image.

The present technology can also be applied to a color image. In that case, as illustrated in FIG. 45, it is only required to perform processing similar to the above-described case for each color component. That is, the detection image is read for each color component, the restoration matrix is calculated for each color component, and by using them, the restored image is generated for each color component. In that case, for example, an RGB combining unit 401 may be provided, and the restored images of respective color components may be combined by the RGB combining unit 401 to obtain a restored image of a color image.

2. Second Embodiment

<Image Processing Apparatus>

Figure 46:
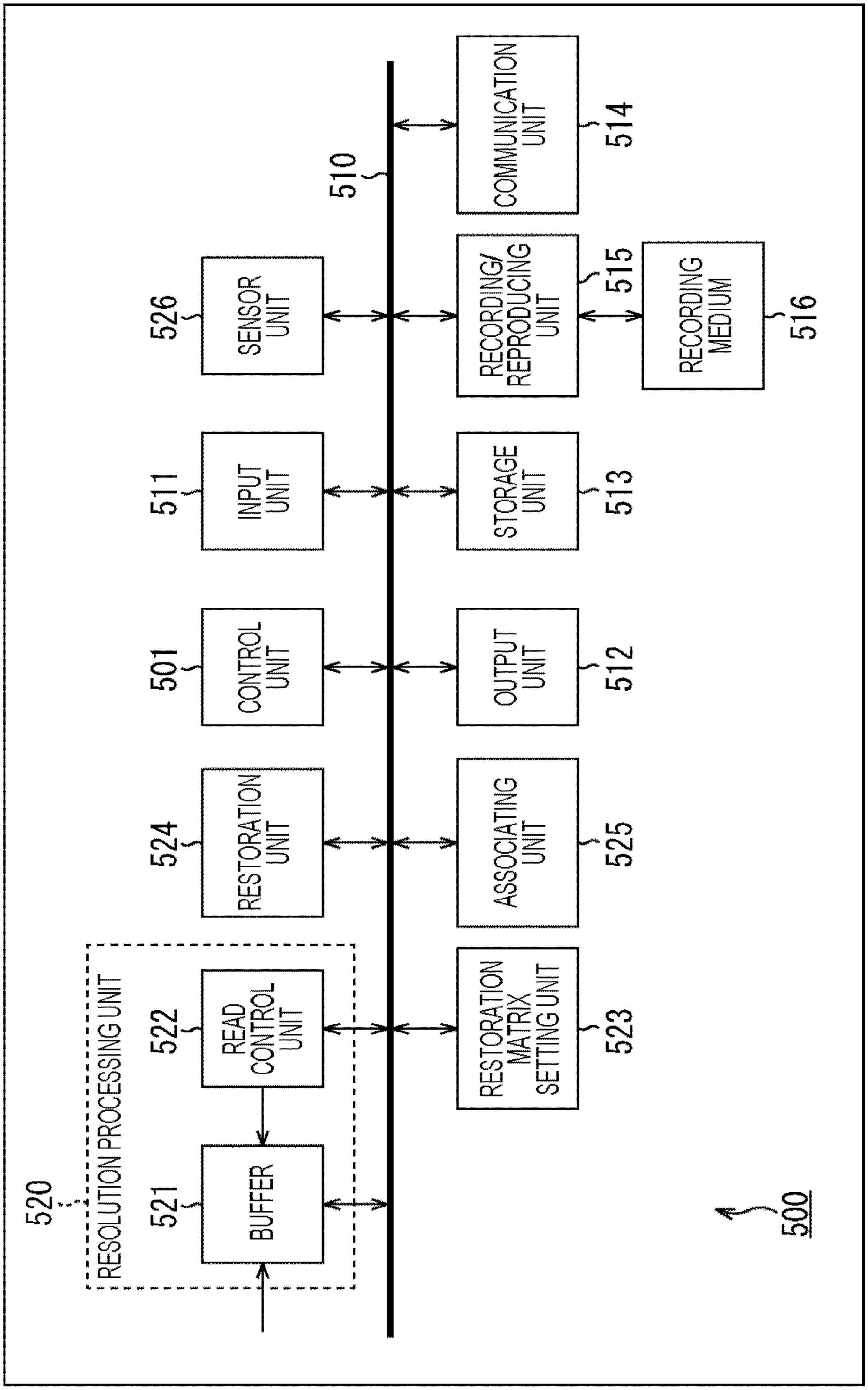
FIG. 46 is a block diagram illustrating a main configuration example of an image processing apparatus.

The present technology can be applied to any apparatus other than the imaging apparatus 100 described above. For example, the present technology can be applied to an image processing apparatus 500. FIG. 46 is a diagram illustrating a main configuration example of an image processing apparatus that is an embodiment of an image processing apparatus to which the present technology is applied. The image processing apparatus 500 illustrated in FIG. 46 is an apparatus that controls a resolution of an input detection image.

As illustrated in FIG. 46, the image processing apparatus 500 includes a control unit 501, an input unit 511, an output unit 512, a storage unit 513, a communication unit 514, and a recording/reproducing unit 515. Furthermore, the image processing apparatus 500 includes a buffer 521, a read control unit 522, a restoration matrix setting unit 523, a restoration unit 524, an associating unit 525, and a sensor unit 526. The processing units and the like are connected to each other via a bus 510, and can exchange information, commands, and the like with each other.

Note that, the buffer 521 and the read control unit 522 may be integrated together as a resolution processing unit 520. The resolution processing unit 520 may be realized by any physical configuration. For example, the resolution processing unit 520 may be realized as a processor as a system LSI or the like. Furthermore, the resolution processing unit 520 may be realized as, for example, a module using a plurality of processors and the like, a unit using a plurality of modules and the like, or a set obtained by further adding other functions to a unit, and the like (in other words, a partial configuration of the apparatus). Furthermore, the resolution processing unit 520 may be realized as an apparatus.

The control unit 501 is configured to perform processing related to control of the processing units and the like in the image processing apparatus 500. For example, the control unit 501 includes a CPU, a ROM, a RAM, and the like, and performs the above-described processing by executing a program by using the CPU and the like.

The input unit 511 is configured to perform processing related to input of information. For example, the input unit 511 includes input devices such as an operation button, a dial, a switch, a touch panel, a remote controller, and a sensor, and an external input terminal. For example, the input unit 511 accepts an instruction (information corresponding to input operation) from the outside such as the user with these input devices. Furthermore, for example, the input unit 511 acquires arbitrary information (program, command, data, and the like) supplied from an external apparatus via the external input terminal. Furthermore, for example, the input unit 511 supplies the accepted information (acquired information) to other processing units and the like via the bus 510.

Note that, the sensor included in the input unit 511 may be any sensor as long as it can accept the instruction from the outside such as the user, for example, an acceleration sensor or the like. Furthermore, the input device included in the input unit 511 is arbitrary, and the number of them is also arbitrary. The input unit 511 may include a plurality of types of input devices. For example, the input unit 511 may include some of the examples described above, or may include the whole. Furthermore, the input unit 511 may include an input device other than the examples described above. Moreover, for example, the input unit 511 may acquire control information regarding the input unit 511 (input device or the like) supplied via the bus 510, and operate on the basis of the control information.

The output unit 512 is configured to perform processing related to output of information. For example, the output unit 512 includes an image display device such as a monitor, an image projection device such as a projector, a sound output device such as a speaker, an external output terminal, and the like. For example, the output unit 512 outputs information supplied from other processing units and the like via the bus 510 by using those output devices and the like. For example, the output unit 512 displays a captured image (restored image described later) on a monitor, projects a captured image (restored image described later) from a projector, outputs sound (for example, sound corresponding to an input operation, a processing result, or the like), or outputs arbitrary information (program, command, data, and the like) is output to the outside (another device).

Note that, the output device and the like included in the output unit 512 are arbitrary, and the number of them is also arbitrary. The output unit 512 may include a plurality of types of output devices and the like. For example, the output unit 512 may include some of the examples described above, or may include the whole. Furthermore, the output unit 512 may include an output device and the like other than the examples described above. Moreover, for example, the output unit 512 may acquire control information regarding the output unit 512 (output device or the like) supplied via the bus 510, and operate on the basis of the control information.

The storage unit 513 is configured to perform processing related to storage of information. For example, the storage unit 513 includes an arbitrary storage medium such as a hard disk or a semiconductor memory. For example, the storage unit 513 stores information (program, command, data, and the like) supplied from other processing units and the like via the bus 510 in the storage medium. Furthermore, the storage unit 513 may store arbitrary information (program, command, data, and the like) at the time of shipment. Furthermore, the storage unit 513 reads information stored in the storage medium at an arbitrary timing or in response to a request from other processing units and the like, and supplies the read information to the other processing units and the like via the bus 510.

Note that, the storage medium included in the storage unit 513 is arbitrary, and the number of them is also arbitrary. The storage unit 513 may include a plurality of types of storage media. For example, the storage unit 513 may include some of the examples of the storage medium described above, or may include the whole. Furthermore, the storage unit 513 may include a storage medium and the like other than the examples described above. Furthermore, for example, the storage unit 513 may acquire control information regarding the storage unit 513 supplied via the bus 510, and operate on the basis of the control information.

The communication unit 514 is configured to perform processing related to communication with other apparatuses. For example, the communication unit 514 includes a communication device that performs communication for exchanging information such as programs and data with an external apparatus via a predetermined communication medium (for example, an arbitrary network such as the Internet). For example, the communication unit 514 communicates with another apparatus, and supplies information (program, command, data, and the like) supplied from other processing units and the like via the bus 510 to the other apparatus that is a communication partner. Furthermore, for example, the communication unit 514 communicates with another apparatus, acquires information supplied from the other apparatus that is a communication partner, and supplies the information to the other processing units and the like via the bus 510.

The communication device included in the communication unit 514 may be any communication device. For example, the communication device may be a network interface. A communication method and a communication standard are arbitrary. For example, the communication unit 514 may be made to perform wired communication, wireless communication, or both. Furthermore, for example, the communication unit 514 may acquire control information regarding the communication unit 514 (communication device or the like) supplied via the bus 510, and operate on the basis of the control information.

The recording/reproducing unit 515 is configured to perform processing related to recording and reproduction of information using a recording medium 516 mounted to the recording/reproducing unit 515. For example, the recording/reproducing unit 515 reads information (program, command, data, and the like) recorded on the recording medium 516 mounted to the recording/reproducing unit 515, and supplies the information to other processing units and the like via the bus 510. Furthermore, for example, the recording/reproducing unit 515 acquires information supplied from other processing units and the like via the bus 510, and writes (records) the information in the recording medium 516 mounted to the recording/reproducing unit 515. Note that, for example, the recording/reproducing unit 515 may acquire control information regarding the recording/reproducing unit 515 supplied via the bus 510, and operate on the basis of the control information.

Note that, the recording medium 516 may be any recording medium. For example, the recording medium may be a magnetic disk, an optical disk, a magneto-optical disk, a semiconductor memory, or the like.

The buffer 521 includes a predetermined storage area. For example, the buffer 521 is driven in accordance with control of the read control unit 522. For example, the buffer 521 stores data of a detection image input from the outside (in other words, a detection image captured by another apparatus or the like) in the storage area.

The detection image is obtained by an imaging element similar to the above-described imaging element 121 of another apparatus, and is information having the features described above with reference to FIGS. 1 to 20. That is, the detection image is a detection image including detection signals obtained in the respective pixel output units, the detection signals being obtained by imaging a subject by an imaging element including a plurality of pixel output units that receives incident light entering without passing through either an imaging lens or a pinhole, and each outputs one detection signal indicating an output pixel value modulated by an incident angle of the incident light.

Furthermore, the buffer 521 reads stored data of the detection image, and the like, and supplies the data to other processing units, and the like via the bus 510.

The read control unit 522 is configured to perform processing related to data read control from the buffer 521, and control a resolution of the detection image. For example, the read control unit 522 controls reading of the detection image from the buffer 521, and controls the resolution of the detection image by thinning out some of the detection signals included in the detection image.

For example, the read control unit 522 selects and reads detection signals of all the pixel output units of a detection image stored in the buffer 521, thereby being able to obtain a detection image including all those detection signals, in other words, "detection image read from the buffer 521".

Furthermore, for example, the read control unit 522 selects and reads detection signals of some of the pixel output units of a detection image stored in the buffer 521, thereby being able to obtain a detection image including all those detection signals, in other words, "detection image read from the buffer 521 and reduced in resolution".

For example, the read control unit 522 selects and reads detection signals of some arbitrary pixel output units of a detection image stored in the buffer 521, thereby being able to obtain a detection image including all those detection signals, in other words, "detection image read from the buffer 521 and reduced in resolution". Furthermore, for example, the read control unit 522 may select and read detection signals of all the pixel output units of a detection image stored in the buffer 521, and generate a detection image including detection signals of some pixel output units at arbitrary positions among the detection signals.

For example, the read control unit 522 selects and reads detection signals of some pixel output units in a positional relationship having a predetermined regularity of a detection image stored in the buffer 521, thereby being able to obtain a detection image including all those detection signals, in other words, "detection image read from the buffer 521 and reduced in resolution". Furthermore, for example, the read control unit 522 may select and read detection signals of all the pixel output units of a detection image stored in the buffer 521, and generate a detection image including detection signals of some pixel output units in a positional relationship having a predetermined regularity among the detection signals.

For example, the read control unit 522 selects and reads detection signals of some pixel output units formed in one partial region of a detection image stored in the buffer 521, thereby being able to obtain a detection image including all those detection signals, in other words, "detection image read from the buffer 521 and reduced in resolution". Furthermore, for example, the read control unit 522 may select and read detection signals of all the pixel output units of a detection image stored in the buffer 521, and generate a detection image including detection signals of some pixel output units formed in one partial region of the read detection image among the detection signals.

For example, the read control unit 522 may read detection signals from all the pixel output units of a detection image stored in the buffer 521, add the read detection signals of the respective pixel output units together for each predetermined number, and set a detection signal group after the addition as "detection image read from the buffer 521 and reduced in resolution".

Selecting a detection signal to be adopted as the detection image also means selecting a non-adopted detection signal. That is, the read control unit 522 controls the resolution of the detection image by selecting the detection signal. For example, the read control unit 522 controls the resolution of the detection image by causing the detection signals to be thinned out and read from the buffer 521, thinning out the detection signals read from the buffer 521, or adding the detection signals read from the buffer 521 together for each predetermined number.

In a case where thinning out or addition of the detection signals included in the detection image is performed in the read control unit 522, the read control unit 522 supplies data (detection signals and the like) regarding the detection image after the processing via the bus 510 to other processing units and the like (for example, the restoration matrix setting unit 523, the restoration unit 524, the associating unit 525, and the like).

The restoration matrix setting unit 523 is configured to perform processing related to setting of a restoration matrix. The detection image can be converted into the restored image by performing the predetermined calculation. Although details will be described later, the predetermined calculation is to multiply detection signals included in the detection image by predetermined coefficients and add them together. That is, the detection image can be converted into the restored image by performing a predetermined matrix operation. In this specification, a matrix including the above-described coefficients used for the matrix operation is referred to as a restoration matrix.

For example, the restoration matrix setting unit 523 sets a restoration matrix corresponding to the detection image whose resolution is controlled by the read control unit 522. This restoration matrix is the restoration matrix described above with reference to FIGS. 1 to 20, and has the features described above. That is, this restoration matrix is a matrix including coefficients used when the restored image is restored from the detection image. For example, the restoration matrix setting unit 523 supplies the set restoration matrix to other processing units and the like (for example, the restoration unit 524, the associating unit 525, and the like) via the bus 510.

Note that, in the predetermined matrix operation for converting the detection image into the restored image, the detection image may be converted into the restored image having an arbitrary resolution. In that case, the restoration matrix setting unit 523 is only required to set a restoration matrix having the number of rows and the number of columns according to the resolution of the detection image and a target resolution of the restored image.

Note that, for example, the restoration matrix setting unit 523 may acquire control information regarding the restoration matrix setting unit 523 supplied via the bus 510, and operate on the basis of the control information.

The restoration unit 524 is configured to perform processing related to generation of the restored image. For example, the restoration unit 524 generates the restored image from data (detection signals and the like) regarding the detection image read from the buffer 521 by performing the predetermined calculation. Furthermore, the restoration unit 524 supplies data (pixel values and the like) regarding the generated restored image to other processing units and the like via the bus 510.

Note that, a detection image in which a plurality of color components is mixed is stored in the buffer 521, and a Raw image in which the plurality of color components is mixed may be obtained by performing the predetermined calculation on the detection image by the restoration unit 524. Then, the restoration unit 524 may supply the Raw image in which the plurality of color components is mixed as a restored image to other processing units and the like, or may perform synchronization processing, color separation processing, or the like (for example, demosaic processing or the like) on the Raw image, and supply the image subjected to the processing as a restored image to the other processing units and the like. Of course, a monochrome detection image or a detection image for each color is obtained in the buffer 521, and synchronization processing, color separation processing, or the like (for example, demosaic processing or the like) may be unnecessary.

Furthermore, the restoration unit 524 may perform, on a restored image, arbitrary image processing, for example, gamma correction (γ correction), white balance adjustment, or the like, and supply data regarding a restored image after image processing to other processing units and the like. Moreover, the restoration unit 524 may convert the format of data of the restored image or compress the data with a predetermined compression method, for example, JPEG, GIF, or the like, and supply the data after the conversion (compression) to other processing units and the like.

Note that, for example, the restoration unit 524 may acquire control information regarding the restoration unit 524 supplied via the bus 510, and operate on the basis of the control information.

<Flow of Image Processing>

Figure 47:
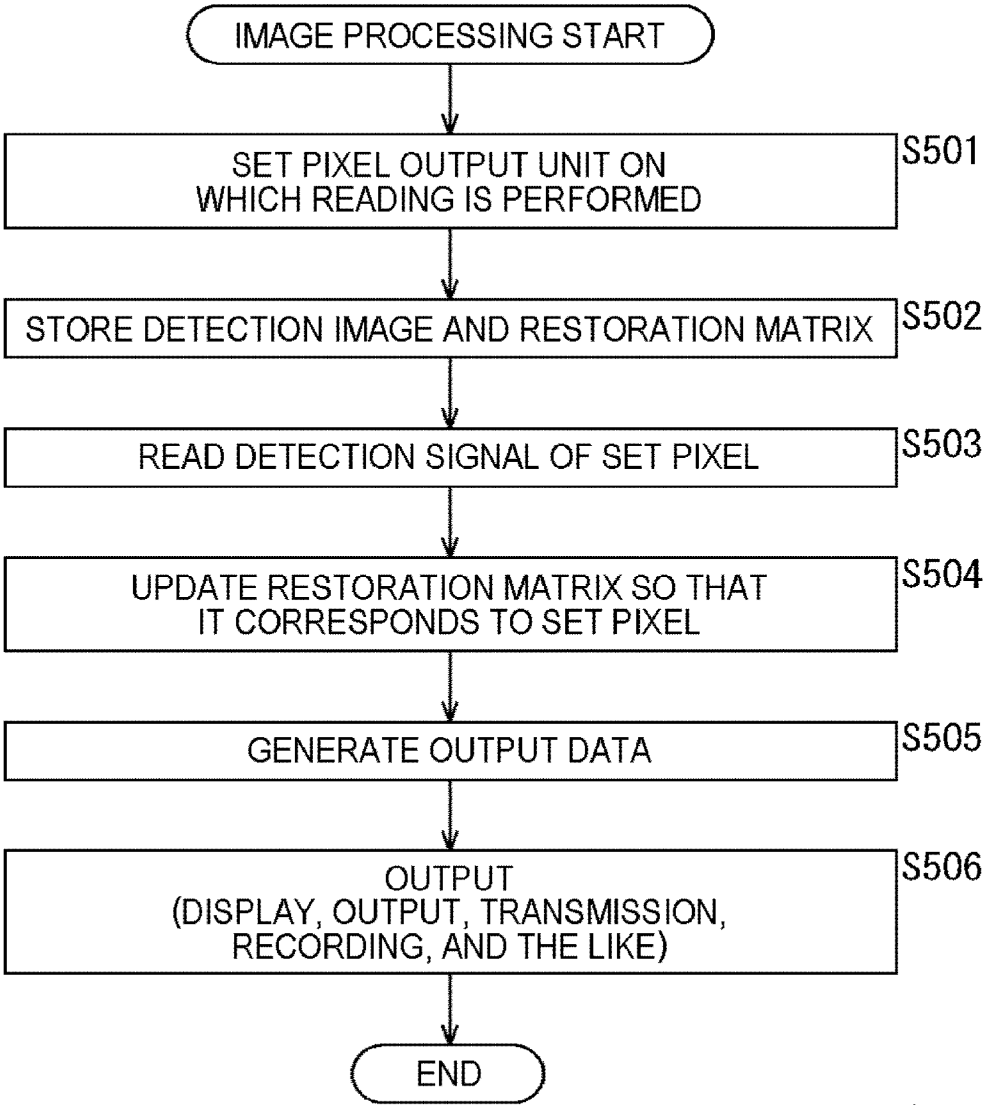
FIG. 47 is a flowchart illustrating an example of a flow of image processing.

An example will be described of a flow of image processing executed by the image processing apparatus 500 in this case, with reference to a flowchart of FIG. 47.

When the image processing is started, in step S501, the read control unit 522 sets pixel output units from which detection signals are read, of a detection image stored in the buffer 521. For example, the read control unit 522 sets the pixels from which the detection signals are read, by selecting the above-described operation mode.

In step S502, the buffer 521 stores a detection image and a restoration matrix corresponding to the detection image.

In step S503, the read control unit 522 reads the detection signals of the pixels set in step S501 from the buffer 521.

In step S504, the restoration matrix setting unit 523 updates the restoration matrix corresponding to the detection image stored in the buffer 521 so that the restoration matrix corresponds to the pixels set in step S501.

In step S505, the restoration unit 524 or the associating unit 525 generates output data by using the detection image read in step S503 and the restoration matrix set in step S504.

For example, the restoration unit 524 converts the detection image into a restored image by using restoration coefficients. The restoration unit 524 sets data of the restored image as the output data. Furthermore, for example, the associating unit 525 sets the output data by associating data of the restoration coefficients with the data of the detection image.

In step S506, the output data is output. This output includes any method. For example, this output may include image display, data output and printing to another apparatus, storage on a storage medium, transmission to a communication partner, recording on the recording medium 116, and the like.

First, a case will be described in which a Raw image (that may be a restored image subjected to synchronization processing, color separation processing, and the like (for example, demosaic processing and the like)) is output. For example, in a case where the output is "display", the restoration unit 524 supplies the data of the Raw image, and the like to the output unit 512. The output unit 512 displays the Raw image on an image display device (for example, an LCD or the like), or projects the Raw image from a projector. Furthermore, for example, in a case where the output is "output", the restoration unit 524 supplies the data of the Raw image, and the like to the output unit 512. The output unit 512 outputs the data of the Raw image, and the like from the external output terminal to another apparatus. Moreover, for example, in a case where the output is "storage", the restoration unit 524 supplies the data of the Raw image, and the like to the storage unit 513. The storage unit 513 stores the data of the Raw image, and the like in a storage medium included in the storage unit 513. Furthermore, for example, in a case where the output is "transmission", the restoration unit 524 supplies the data of the Raw image, and the like to the communication unit 514. The communication unit 514 communicates with another apparatus by using a predetermined communication method, and transmits the data of the Raw image, and the like to the communication partner. Moreover, for example, in a case where the output is "recording", the restoration unit 524 supplies the data of the Raw image, and the like to the recording/reproducing unit 515. The recording/reproducing unit 515 records the data of the Raw image, and the like on the recording medium 516 mounted to the recording/reproducing unit 515.

Next, a description will be given of a case where the data of the detection image, image restoration coefficients, and the like associated with each other are output. For example, in a case where the output is "display", the associating unit 525 supplies the data of the detection image, image restoration coefficients, and the like associated with each other, to the output unit 512. The output unit 512 displays information such as images and characters regarding the data of the detection image, image restoration coefficients, and the like on an image display device (for example, an LCD or the like) or the like), or projects the information from a projector. Furthermore, for example, in a case where the output is "output", the associating unit 525 supplies the data of the detection image, image restoration coefficients, and the like associated with each other to the output unit 512. The output unit 512 outputs the data of the detection image, image restoration coefficients, and the like associated with each other from the external output terminal to another apparatus. Moreover, for example, in a case where the output is "storage", the associating unit 525 supplies the data of the detection image, image restoration coefficients, and the like associated with each other to the storage unit 513. The storage unit 513 stores the data of the detection image, image restoration coefficients, and the like associated with each other in the storage medium included in the storage unit 513. Furthermore, for example, in a case where the output is "transmission", the associating unit 525 supplies the data of the detection image, image restoration coefficients, and the like associated with each other to the communication unit 514. The communication unit 514 communicates with another apparatus by using a predetermined communication method, and transmits the data of the detection image, image restoration coefficients, and the like associated with each other to the communication partner. Moreover, for example, in a case where the output is "recording", the associating unit 525 supplies the data of the detection image, image restoration coefficients, and the like associated with each other to the recording/reproducing unit 515. The recording/reproducing unit 515 records the data of the detection image, image restoration coefficients, and the like associated with each other on the recording medium 516 mounted to the recording/reproducing unit 515.

When the output data is output, the image processing ends. By performing the image processing as described above, the resolution of the detection image can be controlled.

3. Third Embodiment

<Other Configuration Examples of Imaging Elements>

Although the example of the imaging element 121 has been described above, the imaging element 121 is only required to include a plurality of pixel output units that receives incident light entering without passing through either an imaging lens or a pinhole, and each outputs one detection signal indicating an output pixel value modulated by an incident angle of the incident light, and the configuration is arbitrary.

For example, by using a random black-and-white pattern mask or an optical interference mask as a modulation element, the light incident on the imaging surface of the imaging element 121 may be modulated depending on the monochrome pattern or light interference.

Figure 48:
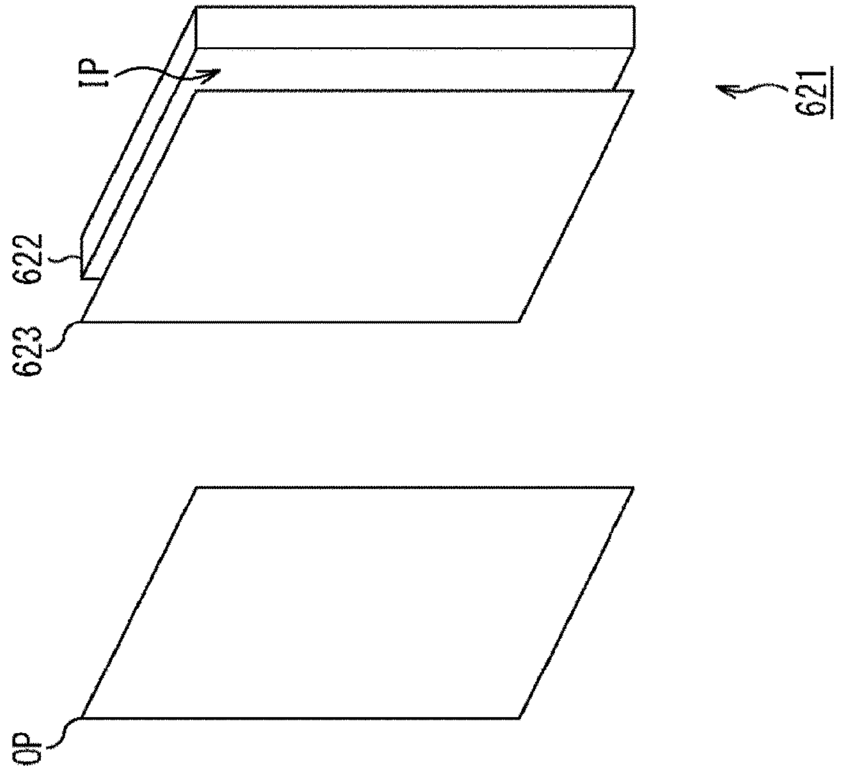
FIG. 48 is a diagram illustrating a main configuration example of the imaging element.

FIG. 48 illustrates another configuration of the imaging element. An imaging element 621 is configured such that a mask 623 that is a modulation element is fixed to an imaging element 622 to have a predetermined interval with respect to an imaging surface IP of the imaging element 622, and light from a subject surface OP is modulated by the mask 623 and then enters the imaging surface IP of the imaging element 622.

Figure 49:
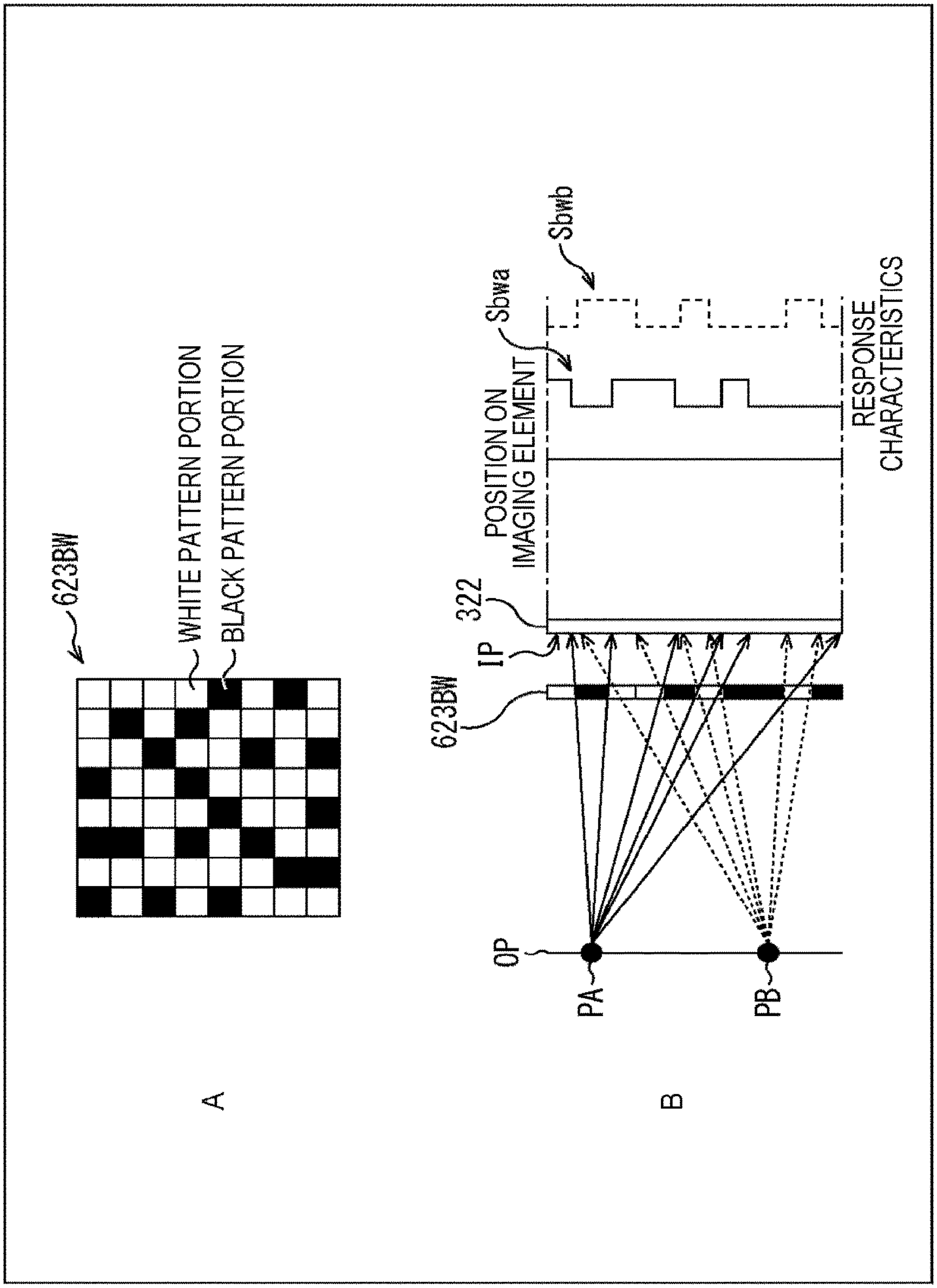
FIG. 49 is a diagram illustrating a case where a black-and-white pattern mask is used.

FIG. 49 illustrates a case where a black-and-white pattern mask is used. In A of FIG. 49, a black-and-white pattern mask is exemplified. A black-and-white pattern mask 623BW has a configuration in which a white pattern portion that transmits light and a black pattern portion that blocks light are randomly arranged, and the pattern size is set independently of the pixel size of the imaging element 622. In B of FIG. 49, an irradiation state with respect to the imaging surface IP is schematically illustrated, for light emitted from the point light source PA and light emitted from the point light source PB. Furthermore, in B of FIG. 49, an example is also schematically illustrated of a response of the imaging element in a case where the black-and-white pattern mask 623BW is used, individually for the light emitted from the point light source PA and the light emitted from the point light source PB. The light from the subject surface OP is modulated by the black-and-white pattern mask 623BW and then enters the imaging surface IP of the imaging element 622. Thus, the response of the imaging element corresponding to the light emitted from the point light source PA on the subject surface OP is Sbwa. Furthermore, the response of the imaging element corresponding to the light emitted from the point light source PB on the subject surface OP is Sbwb. Thus, pixel output information output from the imaging element 622 is information of one image obtained by combining the responses of the respective point light sources for each pixel output unit. In the case of this configuration, the incident angle directivity cannot be set independently for each pixel output unit, and the pixel output units at close positions have incident angle directivities close to each other.

Figure 50:
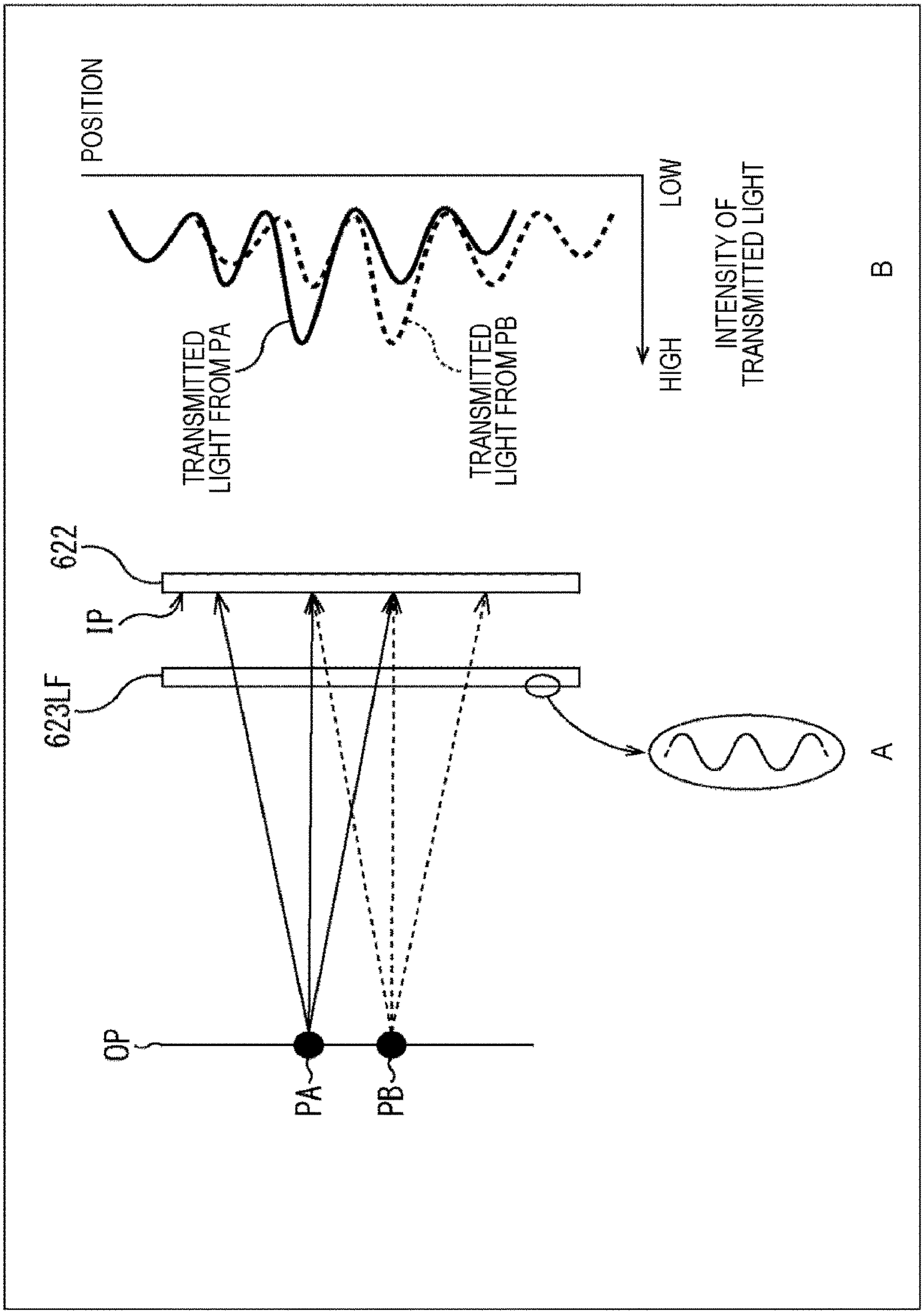
FIG. 50 is a diagram illustrating a case where an optical interference mask is used.

FIG. 50 illustrates a case where the optical interference mask is used. As illustrated in A of FIG. 50, the light emitted from the point light sources PA and PB on the subject surface OP is emitted to the imaging surface IP of the imaging element 622 through an optical interference mask 623LF. For example, the light incident surface of the optical interference mask 623LF is provided with unevenness of the order of the wavelength of light as illustrated in A of FIG. 50. Furthermore, the optical interference mask 623LF maximizes transmission of light of a specific wavelength emitted from the vertical direction. When a change increases in the incident angle (inclination with respect to the vertical direction) of the light of the specific wavelength emitted from the point light sources PA and PB on the subject surface OP with respect to the optical interference mask 623LF, an optical path length changes. Here, when the optical path length is an odd multiple of the half wavelength, the light is weakened, and when the optical path length is an even multiple of the half wavelength, the light is strengthened. In other words, the intensity of the transmitted light of the specific wavelength emitted from the point light sources PA and PB and transmitted through the optical interference mask 623LF is modulated depending on the incident angle with respect to the optical interference mask 623LF and enters the imaging surface IP of the imaging element 622, as illustrated in B of FIG. 50. Thus, the pixel output information output from each output pixel unit of the imaging element 622 is information obtained by combining the light intensities after the modulation of the respective point light sources transmitted through the optical interference mask 823LF. In the case of this configuration, the incident angle directivity cannot be set independently for each pixel output unit, and the pixel output units at close positions have incident angle directivities close to each other.

Figure 51:
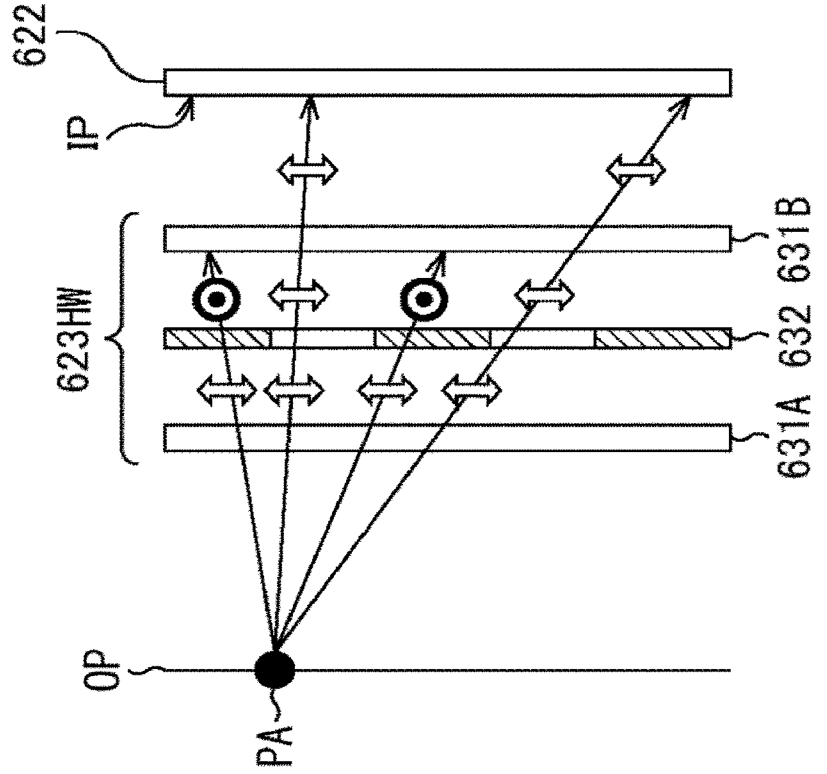
FIG. 51 is a diagram illustrating a modification of the imaging element.

Note that, an optical filter 623HW of FIG. 51 may be used instead of the optical filter 623BW. The optical filter 623HW includes a linearly polarizing element 631A and a linearly polarizing element 631B having the same polarization direction as each other, and a half-wave plate 632, and the half-wave plate 632 is sandwiched between the linearly polarizing element 631A and the linearly polarizing element 631B. The half-wave plate 632 is provided with a polarizing portion indicated by oblique lines instead of the black pattern portion of the optical filter 623BW, and the white pattern portion and the polarizing portion are randomly arranged.

The linearly polarizing element 631A transmits only a light component in a predetermined polarization direction out of substantially non-polarized light emitted from the point light source PA. Hereinafter, it is assumed that the linearly polarizing element 631A transmits only a light component whose polarization direction is parallel to the paper surface. As for the polarized light transmitted through the polarizing portion of the half-wave plate 632 out of the polarized light transmitted through the linearly polarizing element 631A, the polarization plane is rotated, whereby the polarization direction changes in a direction perpendicular to the paper surface. On the other hand, as for the polarized light transmitted through the white pattern portion of the half-wave plate 632 out of the polarized light transmitted through the linearly polarizing element 631A, the polarization direction remains unchanged in a direction parallel to the paper surface. Then, the linearly polarizing element 631B transmits the polarized light transmitted through the white pattern portion and hardly transmits the polarized light transmitted through the polarizing portion. Thus, the amount of light of the polarized light transmitted through the polarizing portion is reduced compared to the polarized light transmitted through the white pattern portion. Therefore, a shade pattern substantially similar to a case where the optical filter 623BW is used is generated on the light-receiving surface (imaging surface) IP of the imaging element 622.

However, in the cases of these configurations, since it is necessary to add another configuration such as a mask to the imaging element, the imaging element 121 of the configuration example described in the first embodiment can be further downsized.

As described above, in the present technology, the imaging element 121 may be configured as described with reference to FIG. 4, may be configured as described with reference to FIG. 5, may be configured as described with reference to FIGS. 48 and 49, or may be configured as described with reference to FIG. 50. That is, the imaging element 121 is only required to be an imaging element including a plurality of pixel output units that receives incident light entering without passing through either an imaging lens or a pinhole, and each outputs one detection signal indicating an output pixel value modulated by an incident angle of the incident light.

Furthermore, the present technology may be made to be applied to the imaging element 121 having the configuration described with reference to FIG. 4, or the configuration described with reference to FIG. 5. That is, the plurality of pixel output units of the imaging element 121 may have a configuration in which the incident angle directivity of the output pixel value indicating the directivity with respect to the incident angle of the incident light from the subject is settable independently for each of the pixel output units.

Furthermore, the present technology may be made to be applied to an imaging element having a configuration as described with reference to FIG. 4. That is, the plurality of pixel output units of the imaging element 121 may have a configuration in which the incident angle directivity indicating the directivity with respect to the incident angle of the incident light from the subject is settable independently for each of the pixel output units.

Furthermore, the present technology may be made to be applied to an imaging element having a configuration as described with reference to FIG. 5. That is, the plurality of pixel output units of the imaging element 121 may be made to be able to set the incident angle directivity of the output pixel value indicating the directivity with respect to the incident angle of the incident light from the subject independently for each pixel output unit, by making photo diodes (PDs) that contribute to output different from each other.

<Other Configuration Examples of Imaging Apparatus and Image Processing Apparatus>

In the above description, the imaging apparatus 100 includes the imaging element 121; however, the number of the imaging elements 121 included in the imaging apparatus 100 is arbitrary. The imaging apparatus 100 may include a single imaging element 121 or a plurality of the imaging elements 121. Furthermore, in a case where the imaging apparatus 100 includes the plurality of imaging elements 121, performances (for example, the number of pixels, shape, pixel structure, imaging characteristics, imaging method, and the like) of the plurality of imaging elements 121 may all be unified, or may include different one.

Furthermore, the imaging apparatus 100 may include a plurality of other processing units. For example, a plurality of the read control units 122 may be provided, and each may independently set the resolution of the detection image to perform reading. In this way, for example, detection images respectively having a plurality of resolutions can be obtained in parallel. Furthermore, a plurality of the restoration matrix setting units 123 may be provided accordingly.

Furthermore, in the above description, the image processing apparatus 500 includes the buffer 521; however, the number of the buffers 521 included in the image processing apparatus 500 is arbitrary. The image processing apparatus 500 may include a single buffer 521 or a plurality of the buffers 521. Furthermore, in a case where the image processing apparatus 500 includes the plurality of buffers 521, performances (for example, storage medium, capacity, reading speed, writing speed, and the like) of the plurality of buffers 521 may be unified, or may include different one.

Furthermore, the image processing apparatus 500 may include a plurality of other processing units. For example, a plurality of the read control units 522 may be provided, and each may independently set the resolution of the detection image to perform reading. In this way, for example, detection images respectively having a plurality of resolutions can be obtained in parallel. Furthermore, a plurality of the restoration matrix setting units 523 may be provided accordingly.

4. Others

Application Examples

The present technology can be applied to any apparatus as long as the apparatus has an imaging function. Furthermore, the present technology can be applied to any apparatus or system as long as the apparatus or system processes an image obtained by the imaging function. Furthermore, the present technology can be applied to an apparatus or system used for arbitrary fields, for example, traffic, medical care, security, agriculture, livestock industry, mining, beauty, factory, home appliances, weather, natural monitoring, and the like.

For example, the present technology can be applied to an apparatus or a system that handles images used for appreciation, such as a digital camera or a portable device with a camera function. Furthermore, the present technology can also be applied to an apparatus or a system that handles images used for applications such as security, surveillance, and observation, for example, a surveillance camera. Furthermore, the present technology can also be applied to an apparatus or a system that handles images used for applications, for example, person authentication, image analysis, distance measurement, and the like. Furthermore, the present technology can also be applied to an apparatus or a system that handles images used for control of a machine or the like, for example, automatic driving of an automobile, a robot, or the like.

<Software>

A series of the processing steps described above can be executed by hardware, and can be executed by software. Furthermore, some processing steps can be executed by hardware, and other processing steps can be executed by software. In a case where the series of processing steps is executed by software, a program constituting the software is installed.

The program can be installed, for example, from a recording medium. For example, in the case of the imaging apparatus 100 of FIG. 1, the recording medium includes the recording medium 116 on which the program is recorded, which is distributed to deliver the program to the user separately from the apparatus main body. In that case, for example, by mounting the recording medium 116 to the recording/reproducing unit 115, the program stored in the recording medium 116 can be read and installed in the storage unit 113. Furthermore, for example, in the case of the image processing apparatus 500 of FIG. 46, the recording medium includes the recording medium 516 on which the program is recorded, which is distributed to deliver the program to the user separately from the apparatus main body. In that case, for example, by mounting the recording medium 516 to the recording/reproducing unit 515, the program stored in the recording medium 516 can be read and installed in the storage unit 513.

Furthermore, the program can also be provided via a wired or wireless transmission medium such as a local area network, the Internet, or digital satellite broadcasting. For example, in the case of the imaging apparatus 100 of FIG. 1, the program can be received by the communication unit 114 and installed in the storage unit 113. Furthermore, for example, in the case of the image processing apparatus 500 of FIG. 46, the program can be received by the communication unit 514 and installed in the storage unit 513.

Besides, the program can be installed in advance in the storage unit, the ROM, and the like. For example, in the case of the imaging apparatus 100 of FIG. 1, the program can also be installed in advance in the storage unit 113, a ROM (not illustrated) in the control unit 101, and the like. Furthermore, for example, in the case of the image processing apparatus 500 of FIG. 46, the program can also be installed in advance in the storage unit 513, a ROM (not illustrated) in the control unit 501, and the like.

<Supplement>

The embodiment of the present technology is not limited to the embodiments described above, and various modifications are possible without departing from the gist of the present technology.

For example, the present technology can also be implemented as any configuration constituting an apparatus or system, for example, a processor as a system large scale integration (LSI) or the like, a module using a plurality of processors and the like, a unit using a plurality of modules and the like, a set in which other functions are further added to the unit, or the like (in other words, a configuration of a part of the apparatus).

Furthermore, each processing unit described above can be realized by an arbitrary configuration. For example, each processing unit described above may include a circuit, an LSI, a system LSI, a processor, a module, a unit, a set, a device, an apparatus, a system, and the like. Furthermore, a plurality of them may be combined together. At this time, for example, the same type of configurations may be combined together, such as a plurality of circuits, and a plurality of processors, or different types of configurations may be combined together, such as a circuit and an LSI.

Note that, in this specification, a system means a set of a plurality of constituents (apparatus, module (component), and the like), and it does not matter whether or not all of the constituents are in the same cabinet. Thus, a plurality of apparatuses that is accommodated in a separate cabinet and connected to each other via a network and one apparatus that accommodates a plurality of modules in one cabinet are both systems.

Furthermore, for example, the configuration described as one apparatus (or processing unit) may be divided and configured as a plurality of apparatuses (or processing units). Conversely, configurations described as a plurality of apparatuses (or processing units) in the above may be collectively configured as one apparatus (or processing unit). Furthermore, configurations other than those described above may be added to the configuration of each apparatus (or each processing unit), of course. Moreover, as long as the configuration and operation of the system as a whole are substantially the same, a part of the configuration of a certain apparatus (or processing unit) may be included in the configuration of another apparatus (or another processing unit).

Furthermore, for example, the present technology can adopt a configuration of cloud computing that shares one function in a plurality of apparatuses via a network to process in cooperation.

Furthermore, for example, the program described above can be executed in an arbitrary apparatus. In that case, it is sufficient that the apparatus has a necessary function (function block, or the like) and can obtain necessary information.

Furthermore, for example, each step described in the above flowchart can be executed by sharing in a plurality of apparatuses, other than being executed by one apparatus. Moreover, in a case where a plurality of pieces of processing is included in one step, the plurality of pieces of processing included in the one step can be executed by sharing in a plurality of apparatuses, other than being executed by one apparatus. In other words, a plurality of pieces of processing included in one step can be executed as processing of a plurality of steps. Conversely, processing described as a plurality of steps can be executed collectively as one step.

In the program executed by the computer, pieces of processing of steps describing the program may be executed in chronological order along with the order described in this specification, or in parallel, or may be individually executed at necessary timing such as when each step is called. That is, as long as inconsistency does not occur, the processing of each step may be executed in an order different from the order described above. Moreover, the processing of the step describing the program may be executed in parallel with processing of another program, or may be executed in combination with the processing of the other program.

As long as inconsistency does not occur, each of a plurality of the present technologies described in this specification can be implemented alone independently. Of course, it is also possible to implement by combining any of the plurality of present technologies. For example, a part or all of the present technology described in any of the embodiments can be implemented in combination with a part or all of the present technology described in other embodiments. Furthermore, a part or all of the present technology described above can be implemented in combination with another technology not described above.

The present technology can also adopt the following configurations.

(1) An imaging apparatus including:

an imaging element including a plurality of pixel output units that receives incident light entering without passing through either an imaging lens or a pinhole, and each outputs one detection signal indicating an output pixel value modulated by an incident angle of the incident light; and a read control unit that selectively reads the output pixel value of each of the pixel output units of the imaging element.

(2) The imaging apparatus according to (1), in which the read control unit selects some pixel unit outputs among the plurality of pixel output units of the imaging element, and reads output pixel values of the pixel output units selected.

(3) The imaging apparatus according to (2), in which the read control unit selects some pixel output units at arbitrary positions among the plurality of pixel output units of the imaging element.

(4) The imaging apparatus according to (3), in which the read control unit selects the pixel output units such that, regarding an incident angle directivity of the output pixel value indicating a directivity with respect to an incident angle of incident light from a subject, a whole of the pixel output units selected has the incident angle directivity equivalent to an incident angle directivity of all pixel output units of the imaging element.

(5) The imaging apparatus according to (2), in which the read control unit selects some pixel output units in a positional relationship having a predetermined regularity among the plurality of pixel output units of the imaging element.

(6) The imaging apparatus according to (5), in which regarding an incident angle directivity of the output pixel value indicating a directivity with respect to an incident angle of incident light from a subject, a whole of the some pixel output units of the imaging element in the positional relationship having the regularity selected by the read control unit has the incident angle directivity equivalent to an incident angle directivity of all pixel output units of the imaging element.

(7) The imaging apparatus according to (2), in which the read control unit selects a pixel output unit formed in one partial region of a region in which the plurality of pixel output units of the imaging element is formed.

(8) The imaging apparatus according to (7), in which a whole of pixel output units of the imaging element formed in the partial region selected by the read control unit has the incident angle directivity equivalent to an incident angle directivity of all pixel output units of the imaging element.

(9) The imaging apparatus according to (1), in which the read control unit reads the output pixel values from all pixel output units of the imaging element, and selects some of the output pixel values read.

(10) The imaging apparatus according to (1), in which the read control unit reads output pixel values of all pixel output units of the imaging element, and adds the read output pixel values together for each predetermined number.

(11) The imaging apparatus according to (10), in which the read control unit adds together output pixel values of pixel output units, the output pixel values having mutually similar incident angle directivities each indicating a directivity with respect to an incident angle of incident light from a subject.

(12) The imaging apparatus according to (10), in which the read control unit adds together output pixel values of pixel output units close to each other.

(13) The imaging apparatus according to any of (1) to (12), in which the plurality of pixel output units has a configuration in which an incident angle directivity of the output pixel value indicating a directivity with respect to an incident angle of incident light from a subject is settable independently for each of the pixel output units.

(14) The imaging apparatus according to any of (1) to (13), in which the plurality of pixel output units has a configuration in which an incident angle directivity indicating a directivity with respect to an incident angle of incident light from a subject is settable independently for each of the pixel output units.

(15) The imaging apparatus according to any of (1) to (14), in which the plurality of pixel output units has a configuration in which an incident angle directivity of the output pixel value indicating a directivity with respect to an incident angle of incident light from a subject is settable independently for each of the pixel output units by making photo diodes (PDs) that contribute to output different from each other.

(16) An imaging method including:

imaging a subject by an imaging element including a plurality of pixel output units that receives incident light entering without passing through either an imaging lens or a pinhole, and each outputs one detection signal indicating an output pixel value modulated by an incident angle of the incident light; and selectively reading the output pixel value of each of the pixel output units of the imaging element.

(17) An image processing apparatus including:

a resolution setting unit that sets a resolution; and a restoration matrix setting unit that sets a restoration matrix including coefficients used when a restored image is restored from output pixel values of a plurality of pixel output units, of an imaging element including the plurality of pixel output units that receives incident light entering without passing through either an imaging lens or a pinhole, and each outputs one detection signal indicating an output pixel value modulated by an incident angle of the incident light, depending on the resolution set by the resolution setting unit.

(18) The image processing apparatus according to (17), in which the resolution setting unit sets the resolution by selecting output pixel values of some of the pixel output units.

(19) The image processing apparatus according to (17), in which the resolution setting unit sets the resolution by adding the output pixel values of the pixel output units together for each predetermined number.

(20) An image processing method including:

setting a resolution; and setting a restoration matrix including coefficients used when a restored image is restored from output pixel values of a plurality of pixel output units, of an imaging element including the plurality of pixel output units that receives incident light entering without passing through either an imaging lens or a pinhole, and each outputs one detection signal indicating an output pixel value modulated by an incident angle of the incident light, depending on the resolution set.

REFERENCE SIGNS LIST

100 Imaging apparatus
120 Imaging unit
121 Imaging element
122 Read control unit
123 Restoration matrix setting unit
124 Restoration unit
125 Associating unit
126 Sensor unit
500 Image processing apparatus
520 Resolution processing unit
521 Buffer
522 Read control unit
523 Restoration matrix setting unit
524 Restoration unit
525 Associating unit
526 Sensor unit

The invention claimed is:

1. An imaging apparatus comprising:

an imaging element including a plurality of pixels, the plurality of pixels being configured to receive incident light entering without passing through either an imaging lens or a pinhole, and each of the pixels being configured to output one detection signal indicating an output pixel value modulated by an incident angle of the incident light; and read control circuitry configured to selectively read the output pixel value of each of the pixels of the imaging element, wherein each of the pixels has an independently settable incident angle directivity indicating a directivity with respect to the incident angle of the incident light from a subject.

2. The imaging apparatus according to claim 1, wherein the read control circuitry is configured to select some pixel outputs among the plurality of pixels of the imaging element, and read output pixel values of the selected pixels.

3. The imaging apparatus according to claim 2, wherein the read control circuitry is configured to select some pixels at arbitrary positions among the plurality of pixels of the imaging element.

4. The imaging apparatus according to claim 3, wherein the read control circuitry is configured to select the pixels such that, regarding the incident angle directivity of the output pixel value indicating the directivity with respect to the incident angle of the incident light from the subject, a whole of the pixels selected has the incident angle directivity equivalent to an incident angle directivity of all pixels of the imaging element.

5. The imaging apparatus according to claim 2, wherein the read control circuitry is configured to select some pixels in a positional relationship having a predetermined regularity among the plurality of pixels of the imaging element.

6. The imaging apparatus according to claim 5, wherein regarding the incident angle directivity of the output pixel value indicating the directivity with respect to the incident angle of the incident light from the subject, a whole of the some pixels of the imaging element in the positional relationship having the regularity selected by the read control circuitry has the incident angle directivity equivalent to an incident angle directivity of all pixels of the imaging element.

7. The imaging apparatus according to claim 2, wherein the read control circuitry is configured to select a pixel formed in one partial region of a region in which the plurality of pixels of the imaging element is formed.

8. The imaging apparatus according to claim 7, wherein regarding the incident angle directivity of the output pixel value indicating the directivity with respect to the incident angle of the incident light from the subject, a whole of pixels of the imaging element formed in the partial region selected by the read control circuitry has the incident angle directivity equivalent to an incident angle directivity of all pixels of the imaging element.

9. The imaging apparatus according to claim 1, wherein the read control circuitry is configured to read the output pixel values from all pixels of the imaging element, and select some of the read output pixel values.

10. The imaging apparatus according to claim 1, wherein the read control circuitry is configured to read output pixel values of all pixels of the imaging element, and add the read output pixel values together for each predetermined number.

11. The imaging apparatus according to claim 10, wherein the read control circuitry is configured to add together output pixel values of pixels, the output pixel values having common incident angle directivities each indicating the directivity with respect to the incident angle of the incident light from the subject.

12. The imaging apparatus according to claim 10, wherein the read control circuitry is configured to add together output pixel values of a region of pixels.

13. The imaging apparatus according to claim 1, wherein the plurality of pixels has a configuration in which the incident angle directivity of the output pixel value indicating the directivity with respect to the incident angle of the incident light from the subject is settable independently for each of the pixels.

14. The imaging apparatus according to claim 1, wherein the plurality of pixels has a configuration in which the incident angle directivity of the output pixel value indicating the directivity with respect to the incident angle of the incident light from the subject is settable independently for each of the pixels by making photo diodes (PDs) that contribute to output different from each other.

15. An imaging method comprising:

imaging a subject by an imaging element including a plurality of pixels, the plurality of pixels being configured to receive incident light entering without passing through either an imaging lens or a pinhole, and each of the pixels being configured to output one detection signal indicating an output pixel value modulated by an incident angle of the incident light; and selectively reading the output pixel value of each of the pixels of the imaging element, wherein each of the pixels has an independently settable incident angle directivity indicating a directivity with respect to the incident angle of the incident light from a subject.

16. An image processing apparatus comprising:

circuitry configured to:

set a resolution; and set a restoration matrix including coefficients used when a restored image is restored from output pixel values of a plurality of pixels, the plurality of pixels being included in an imaging element, the plurality of pixels being configured to receive incident light entering without passing through either an imaging lens or a pinhole, and each of the pixels being configured to output one detection signal indicating an output pixel value modulated by an incident angle of the incident light, depending on the set resolution, wherein each of the pixels has an independently settable incident angle directivity indicating a directivity with respect to the incident angle of the incident light from a subject.

17. The image processing apparatus according to claim 16, wherein the circuitry is configured to set the resolution by selecting output pixel values of some of the pixels.

18. The image processing apparatus according to claim 16, wherein the circuitry is configured to set the resolution by adding the output pixel values of the pixels together for each predetermined number.

19. An image processing method comprising:

setting a resolution; and setting a restoration matrix including coefficients used when a restored image is restored from output pixel values of a plurality of pixels, the plurality of pixels being included in an imaging element, the plurality of pixels being configured to receive incident light entering without passing through either an imaging lens or a pinhole, and each of the pixels being configured to output one detection signal indicating an output pixel value modulated by an incident angle of the incident light, depending on the set resolution, wherein each of the pixels has an independently settable incident angle directivity indicating a directivity with respect to the incident angle of the incident light from a subject.

* * * * *